US012798187B2

(12) United States Patent
Neill

(10) Patent No.: US 12,798,187 B2
(45) Date of Patent: Nov. 17, 2026

(54) METHODS AND APPARATUS FOR ADDITIVE MANUFACTURING BASED ON MULTI-AXIS BUILD PLATFORMS

(71) Applicant: Advanced Printed Electronic Solutions LLC, Fishkill, NY (US)

(72) Inventor: Richard Neill, Garrison, NY (US)

(73) Assignee: ADVANCED PRINTED ELECTRONIC SOLUTIONS LLC, New York, NY (US)

( * ) Notice: Subject to any disclaimer, the term of this patent is extended or adjusted under 35 U.S.C. 154(b) by 25 days.

(21) Appl. No.: 18/609,834

(22) Filed: Mar. 19, 2024

(65) Prior Publication Data

US 2024/0326331 A1 Oct. 3, 2024

Related U.S. Application Data

(60) Provisional application No. 63/455,083, filed on Mar. 28, 2023.

(51) Int. Cl.

*B29C 64/245* (2017.01)
*B29C 64/241* (2017.01)
*B29C 64/393* (2017.01)
*B33Y 30/00* (2015.01)
*B33Y 50/02* (2015.01)

(52) U.S. Cl.

CPC .......... *B29C 64/245* (2017.08); *B29C 64/241* (2017.08); *B29C 64/393* (2017.08); *B33Y 30/00* (2014.12); *B33Y 50/02* (2014.12)

(58) Field of Classification Search

CPC ... B29C 64/245; B29C 64/393; B29C 64/241; B29C 64/227; B33Y 10/00; B33Y 30/00; B33Y 50/02; B22F 10/30; B22F 10/85; B22F 12/22; B22F 12/226; B22F 12/30; B22F 12/33; B22F 12/37; B22F 12/90

See application file for complete search history.

(56) References Cited

U.S. PATENT DOCUMENTS 8,203,702 B1 * 6/2012 Kane .................. G02B 26/0833 356/139.05
2016/0031010 A1 2/2016 O'Neill et al.
(Continued)

FOREIGN PATENT DOCUMENTS

CN 108450007 A * 8/2018 ........... G01C 21/005
CN 109049703 A * 12/2018 ........... B29C 64/245

OTHER PUBLICATIONS

Du et al., InverseCSG: Automatic Conversion of 3D Models to CSG Trees. ACM Transactions on Graphics. Dec. 4, 2018;37(6):1-6.
(Continued)

*Primary Examiner* — JaMel M Nelson
(74) *Attorney, Agent, or Firm* — McCarter & English LLP

(57) ABSTRACT

A system and method for adding two-axis to a multi-axis additive manufacturing system. The system may include a build platform and a two-axis build portion rotationally coupled to the planar build portion about a first axis, the two-axis build platform further being configured to rotate about a second axis, the second axis being perpendicular to the first axis. The build platform may be used in connection with a predictive or a nonpredictive method of operation. In the predictive mode, a motion processor predicts a next-state machine control code for controlling a position of the two-axis build portion.

21 Claims, 37 Drawing Sheets

(56) References Cited

U.S. PATENT DOCUMENTS

| | | | | |
|---|---|---|---|---|
| 2018/0120817 | A1 | 5/2018 | Schwartz et al. | |
| 2020/0001522 | A1* | 1/2020 | Manuel | B29C 64/218 |
| 2020/0086580 | A1 | 3/2020 | Kohler et al. | |
| 2020/0254566 | A1 | 8/2020 | Mamrak et al. | |
| 2020/0329814 | A1 | 10/2020 | Wang et al. | |
| 2021/0129421 | A1* | 5/2021 | Rakshit | B29C 64/209 |
| 2022/0219392 | A1 | 7/2022 | Neill | |
| 2022/0219401 | A1 | 7/2022 | Neill | |
| 2022/0219402 | A1 | 7/2022 | Neill | |
| 2022/0314532 | A1* | 10/2022 | Sehrt | B29C 64/268 |
| 2022/0396347 | A1 | 12/2022 | Neill | |
| 2023/0350901 | A1 | 11/2023 | Neill | |
| 2024/0181716 | A1 | 6/2024 | Neill | |

OTHER PUBLICATIONS

Luo et al., Chopper: partitioning models into 3D-printable parts. ACM Transactions on Graphics. Nov. 1, 2012;31(6):1-9.
Savva et al., SHREC'17 Track, Large-Scale 3D Shape Retrieval from ShapeNet Core55. Eurographics Workshop on 3D Object Retrieval. 12 pages, (2017).
Sharma et al., CSGNet: Neural Shape Parser for Constructive Solid Geometry. arXiv:1712.8290. 9 pages, (2018).
Tangelder, A survey of content based 3D shape retrieval methods. Proceedings Shape Modeling Applications. 12 pages, Jun. 7-9, 2004.
Xiao et al., Process planning for five-axis support free additive manufacturing. Additive Manufacturing. 2020;36:101569, 14 pages.

* cited by examiner

HMM Linear Model Example Scenarios

581

582

583

METHODS AND APPARATUS FOR ADDITIVE MANUFACTURING BASED ON MULTI-AXIS BUILD PLATFORMS

CROSS REFERENCE TO RELATED APPLICATIONS

This application claims benefit of U.S. Provisional Patent Application Ser. No. 63/455,083 filed on Mar. 28, 2023, which is incorporated herein by reference in its entirety.

BACKGROUND OF THE DISCLOSURE

The subject matter disclosed herein relates to additive manufacturing methods and systems for fabrication of complex multi-dimensional objects, parts, assemblies, and structures.

Current additive manufacturing systems include fused filament fabrication (FFF)/fused deposition modeling (FDM), stereolithography (SLA), selective laser sintering (SLS), digital light projector (DLP) printers, paste or aerosol jet, and direct metal laser melting (DMLS) deposition technologies, one or more robotic actuators, and other tools for depositing multi-materials such as structural or functional thermoplastics, resins and metals, solid or flexible, conductive and insulating inks, pastes and other nano-particle materials; tools for sintering, aligning/measuring, ablation, milling, drilling, and component pick-and-place tools for placement of components such as electronic, electro-mechanical, or mechanical devices. All of these processes generally rely on planar build plate geometries as shown in FIG. 1A and FIG. 1B for example, which are suitable for common additive manufacturing systems. A typical additive manufacturing system includes a planar build plate 100 that lies in a plane of the X and Y axes. The system includes one or more extruders that deposit a layer of material and then either the build plate 100, or the extruder, moves in the Z direction and a subsequent layer of material is deposited. This process is repeated until the target object is formed.

Generally, the deposited material forms either the target object, or is support material for the target object. It should be appreciated that when the target object has features, such as overhangs or hollow areas for example, the printer system may deposit material for the purpose of providing a surface to deposit the material of the feature and support the feature. This support structure is subsequently removed by the operator during post-processing. It should be appreciated that the material deposited for the support structure increases the part cost (more material used) or extends the duration of the fabrication process.

The target objects are fabricated, layer-by-layer in the Z axis by the extruder in accordance with execution of program instructions (i.e. G-code). In some applications the material selection uses a heated build plate (sometimes referred to hotbed) for material adhesion during extrusion or tool operations. The selection of an extruder (and any other tools), the movement of the extruder, and control of the build plate temperature profile are typically performed on a computer using software. Typically, an additive manufacturing system uses a CAD/CAM system in conjunction with a slicer software module. The software inputs a CAD model of the target object and generates the machine control code instructions to the additive manufacturing system. This is code is typically represented in the G-code software language, however other software languages for additive manufacturing system control may be used.

Given the increasing utilization of additive manufacturing systems it is desirable to fabricate increasingly complex geometries, comprising multiple material characteristics with associated multiple operations and tools within the fabrication process. As a result, additive manufacturing systems that expand beyond a 3-axis (X,Y,Z) range of motion have been proposed to include to 4-to-9-axis systems. These multi-axis systems overcome some of the geometrical fabrication and support for multiple tool positioning limitations of the 3-axis based additive manufacturing systems.

While these 4-9 axis multi-axis systems are available, it is difficult to adapt traditional 3-axis systems 100, such as that shown in FIG. 1A for example, to include these additional axis' due to space, initial cost, and control constraints. These systems 100 typically include a planar build platform 102 and a tool head 104. The tool head includes a mechanism, such as an extruder for example, that deposits material on the build platform 102. In some applications, the extruder includes a heater that melts a polymer filament. In a typical embodiment, the build platform 102 is movable in a vertical or "Z" direction and the tool head 104 is movable in an "X" and "Y" directions. In some applications multiple extruders are present in order to accommodate multiple materials and/or enhance the additive manufacturing system to increase fabrication flexibility and/or speed through the use of multiple extruders.

Accordingly, while existing additive manufacturing systems are suitable for their intended purposes the need for improvement remains, particular in providing an additive manufacturing system having the features described herein.

BRIEF DESCRIPTION OF THE DISCLOSURE

In accordance with an embodiment, a replacement build platform for an additive manufacturing system having a structure for supporting a build platform is provided. The replacement build platform comprising: a frame configured to removably couple with the structure; and a two-axis build portion rotationally coupled to the frame about a first axis, the two-axis build platform further being configured to rotate about a second axis, the second axis being perpendicular to the first axis.

In addition to one or more of the features described herein, or as an alternative, further embodiments of the replacement build platform may include a planar build portion coupled to the frame adjacent the two-axis build portion.

In addition to one or more of the features described herein, or as an alternative, further embodiments of the replacement build platform may include the frame includes a first and a second arm; and the two-axis build portion includes: a shaft rotationally coupled between the first arm and second arm; a first motor configured to rotate the shaft about the first axis; a second motor coupled to the shaft; and a rotational build platform coupled to the second motor to rotate about the second axis.

In addition to one or more of the features described herein, or as an alternative, further embodiments of the replacement build platform may include the frame having a first arm having a first channel and a second arm having a second channel, the first channel and second channel being sized to receive the structure.

In addition to one or more of the features described herein, or as an alternative, further embodiments of the replacement build platform may include the frame having base that extends between the first arm and second arm.

In addition to one or more of the features described herein, or as an alternative, further embodiments of the replacement build platform may include the frame further having at least one clip portion coupled to the base, the at least one clip portion being configured to engage the frame and fixedly couple the frame to the structure.

In addition to one or more of the features described herein, or as an alternative, further embodiments of the replacement build platform may include a processor module operably coupled to the two-axis build portion, the processor module being configured to execute executable computer instructions for receiving at least one input and causing a rotation of the two-axis build portion about at least one of the first axis or the second axis.

In addition to one or more of the features described herein, or as an alternative, further embodiments of the replacement build platform may include the input being at least one distance measurement.

In addition to one or more of the features described herein, or as an alternative, further embodiments of the replacement build platform may include the processor module being further responsive to executable computer instructions for predicting the next state of a machine control code in response to receiving the at least one input.

In addition to one or more of the features described herein, or as an alternative, further embodiments of the replacement build platform may include the predicting of the next state of machine control code being based at least in part on a machine learning model.

In addition to one or more of the features described herein, or as an alternative, further embodiments of the replacement build platform may include the machine learning model being a Hidden Markov Model.

In addition to one or more of the features described herein, or as an alternative, further embodiments of the replacement build platform may include the predicting the next state of machine control code being based on determining an end condition has been achieved based at least in part on the at least one input.

In addition to one or more of the features described herein, or as an alternative, further embodiments of the replacement build platform may include the predicting the next state of machine control code determining a change in phase.

In addition to one or more of the features described herein, or as an alternative, further embodiments of the replacement build platform may include the change of phase being an initialization phase, a calibration phase, and a completion phase.

In addition to one or more of the features described herein, or as an alternative, further embodiments of the replacement build platform may include the planar portion having a pitch relief region, the pitch relief region defining a pitch clearance area.

According to another aspect of the disclosure a build platform for an additive manufacturing system is provided. The build platform comprising: a planar build portion; and a two-axis build portion rotationally coupled to the planar build portion about a first axis, the two-axis build platform further being configured to rotate about a second axis, the second axis being perpendicular to the first axis.

In addition to one or more of the features described herein, or as an alternative, further embodiments of the system may include a first motor coupled to the two-axis build portion to rotate the two-axis build portion about the first axis; and a second motor coupled to the two-axis build platform to rotate the two-axis build portion about the second axis.

In addition to one or more of the features described herein, or as an alternative, further embodiments of the system may include the first motor and second motor are stepper motors.

In addition to one or more of the features described herein, or as an alternative, further embodiments of the system may include the planar build portion has an opening sized to receive the two-axis build portion; and the two-axis build portion has a first build area having a circular shape.

In addition to one or more of the features described herein, or as an alternative, further embodiments of the system may include the two-axis build portion being centrally located in the planar build portion.

In addition to one or more of the features described herein, or as an alternative, further embodiments of the system may include the two-axis build portion having a first build area; and the planar build portion includes a second build area, the first build area and second build area being co-planar when in an initial position.

In addition to one or more of the features described herein, or as an alternative, further embodiments of the system may include a controller operably coupled to first motor and second motor; an energy source operably coupled to the controller, the first motor and the second motor; and wherein the controller and energy source are disposed on a side of the planar build portion opposite the second build area.

In addition to one or more of the features described herein, or as an alternative, further embodiments of the system may include the planar build portion having a mount configured to couple with a vertical axis of an additive manufacturing system.

In addition to one or more of the features described herein, or as an alternative, further embodiments of the system may include the planar build portion having a pitch relief area adjacent the two-axis build portion, the pitch relief area defining a pitch clearance area.

In accordance with another aspect of the disclosure, a method is provided. The method comprising: providing an electronic model of an object; generating a machine control code to fabricate the object; transmitting the machine control code to a OEM Printer Controller, the machine control code including a two-axis portion; transmitting, in real-time, the two-axis portion to a two-axis controller; and rotating, with the two-axis controller, a two-axis build platform about a first axis or a second axis based at least in part on the two-axis portion.

In addition to one or more of the features described herein, or as an alternative, further embodiments of the method may include the machine control code further having an N-axis portion.

In addition to one or more of the features described herein, or as an alternative, further embodiments of the method may include moving a planar build platform in a vertical direction based at least in part on the N-axis portion.

In addition to one or more of the features described herein, or as an alternative, further embodiments of the method may include moving a print head in an first-direction or a second-direction based at least in part on the N-axis portion, the first direction, the second direction, and the vertical direction being orthogonal to each other.

In addition to one or more of the features described herein, or as an alternative, further embodiments of the method may include the rotating of the two-axis build platform further comprises transmitting control signals from the two-axis controller to at least one controller.

In accordance with another aspect of the disclosure, an additive manufacturing system is provided. The system comprising: planar circular build portion; a frame positions adjacent the planar circular build portion; first motor coupled between the frame and the planar circular build portion, the first motor configured to rotate the planar circular build portion about a first axis; a second motor operably coupled to the planar circular build platform, the second motor being configured to rotate the planar circular build portion about a second axis, the second axis being perpendicular to the first axis; and a two-axis build portion rotationally coupled to the planar build portion about a first axis, the two-axis build platform further being configured to rotate about a second axis, the second axis being perpendicular to the first axis.

In addition to one or more of the features described herein, or as an alternative, further embodiments of the system may include a drive assembly coupled to the frame, wherein the drive assembly is configured to move the frame in at least one translational direction.

In accordance with another aspect of the disclosure, an additive manufacturing system is provided. The system comprising: a real-time motion processor; an interface operably coupled to the real-time motion processor, the real-time motion processor being configured to receive sensor signals via the interface; a build platform; and a plurality of tools operably coupled to the build platform and the real-time motion processor, wherein the real-time motion processor is configured to receive the sensor signals and transmit fabrication signals to the plurality of tools and the build platform.

In addition to one or more of the features described herein, or as an alternative, further embodiments of the system may include the build platform further comprising: a planar build portion; and a two-axis build portion rotationally coupled to the planar build portion about a first axis, the two-axis build platform further being configured to rotate about a second axis, the second axis being perpendicular to the first axis.

In addition to one or more of the features described herein, or as an alternative, further embodiments of the system may include the real-time motion processor being configured to predict a next-state two-axis machine code based at least in part on the sensor signals, wherein the fabrication signals are based at least in part on the prediction.

In addition to one or more of the features described herein, or as an alternative, further embodiments of the system may include the prediction being based at least in part on analyzing the sensor signals with a Hidden Markov Model engine or a Neural Network engine.

In addition to one or more of the features described herein, or as an alternative, further embodiments of the system may include the next-state two-axis machine code being based at least in part on an N-2 axis machine control code and a 2-axis machine control code.

In addition to one or more of the features described herein, or as an alternative, further embodiments of the system may include the real-time motion processor being further configured to: identify a repetitive pattern in the N-2 axis machine control code; and repeat the next-state two-axis machine control code based at least in part on the repetitive pattern without performing an additional prediction step.

In addition to one or more of the features described herein, or as an alternative, further embodiments of the system may include the repetitive patterns being positioned on different layers of a target object.

In addition to one or more of the features described herein, or as an alternative, further embodiments of the system may include the identifying of the repetitive pattern including defining at least one compound linear Hidden Markov Model.

In addition to one or more of the features described herein, or as an alternative, further embodiments of the system may include the compound linear Hidden Markov Model being comprised of multiple linear models in consecutive sequence to define a single cyclic linear Hidden Markov Model.

In addition to one or more of the features described herein, or as an alternative, further embodiments of the system may include the real-time motion processor being further configured to increment a counter index each time the next-state two-axis machine control code is repeated.

In addition to one or more of the features described herein, or as an alternative, further embodiments of the method may include the machine learning model being a Hidden Markov Model.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION OF THE DISCLOSURE

Embodiments herein are directed to additive manufacturing and in particular to an additive manufacturing system having additional axis incorporated into a system through a build platform, software system and processing methods. The build platform allows the adding of two additional axis to an existing additive manufacturing system. Some embodiments are further directed to controlling the two axis of the build platform using a printer controller. Still further embodiments are directed to controlling the two axis of the build platform by predicting the machine control code that is about to be performed by the additive manufacturing system. Still further embodiments provide for the prediction of the machine control code using a Hidden Markov Model or other machine learning including unsupervised and supervised methods such as neural networks. Other embodiments provide for simplified system and/or method of operation sometimes referred to as 3+2 indexed 2-axis operation, using either direct control through volume analysis algorithms and machine codes or prediction-based control operation and machine codes. Still further embodiments provide for using position sensors as a feedback signal for predicting and/or synchronizing machine control code.

Embodiments of the present disclosure provide advantages that includes reduction of cost and/or production time in additive manufacturing. Embodiments of the present disclosure provide further advantages in the fabrication of objects, parts, assemblies, sub-assemblies, or other structures (collectively referred to as a "target object") whose composition, properties and behavior comprise properties that would otherwise be intractable to achieve utilizing contemporaneous additive manufacturing systems and build platform technology.

It should be appreciated that while certain embodiments described herein may refer to additive manufacturing systems that fabricate with a particular number of movement axis (e.g. five axis), this is for example purposes and the claims should not be so limited. In other embodiments, the two-axis build platform can be added to additive manufacturing systems having multiple axes, such as three, four, five or six axis-based systems for example (e.g. an N-2 axis additive manufacturing system).

Figure 2A:
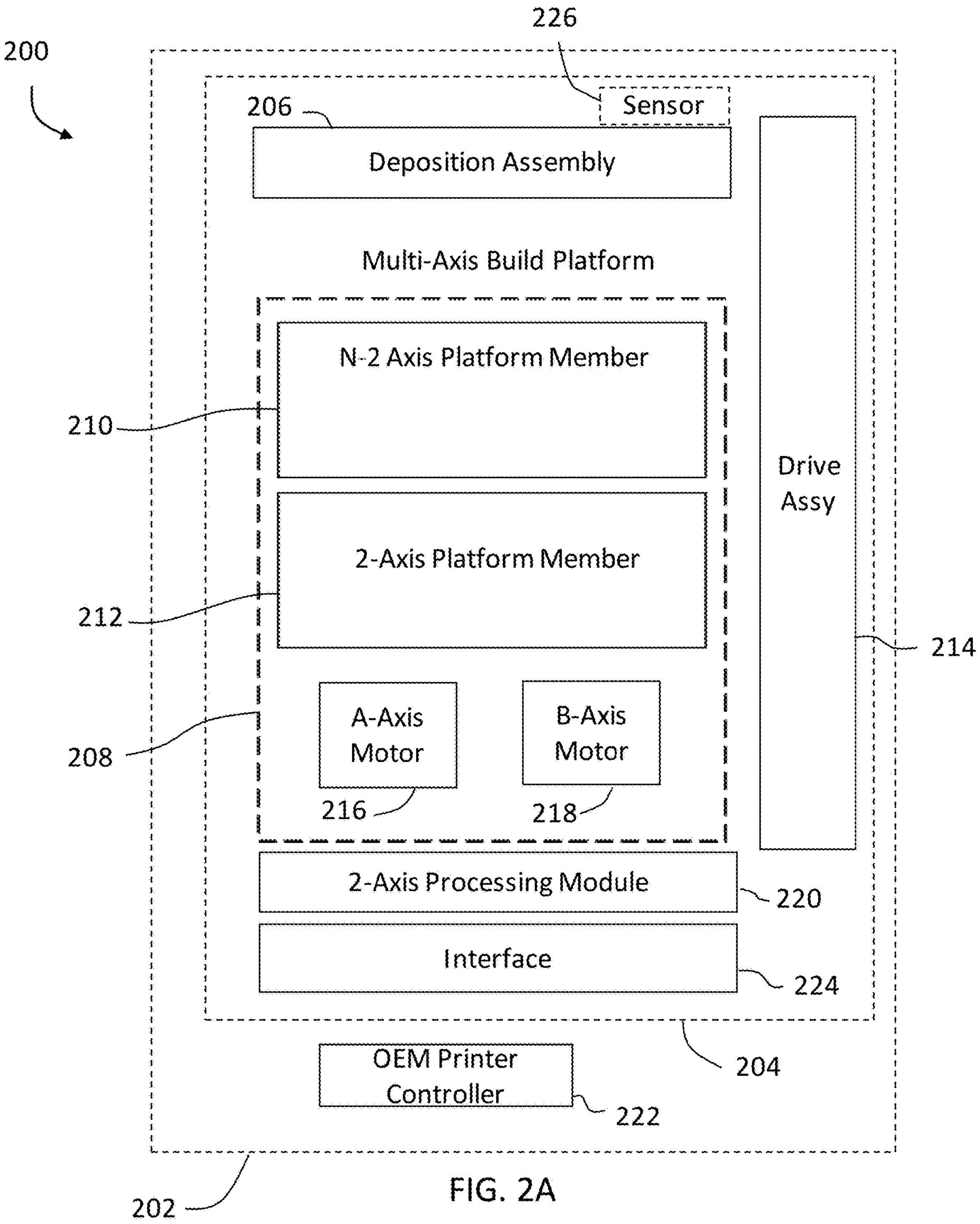
FIG. 2A is a schematic illustration of an additive manufacturing system having an "N-2" axis platform with an additional 2-Axis platform member in accordance with an embodiment.

Referring to FIG. 2A, an embodiment is shown of an additive manufacturing system 200, sometimes referred to as a 3D printer. The system 200 will typically include a housing 202 with includes a build chamber 204. Disposed within the build chamber 204 is a tool or deposition assembly 206 that cooperates with a build platform 208 to fabricate an object. In the illustrated embodiment, the system 200 is capable of fabricating objects along multiple axis. For example, a typical additive manufacturing system the fabrication may be along three orthogonal axis, such as along an "X" axis, a "Y" axis and a "Z" axis (FIG. 3B). Embodiments of the present disclosure allow for a multi-axis system 200 to include an additional two axis. In the example of a three-axis manufacturing system 230 shown in FIG. 2B, the manufacturing system 230 then is capable of fabrication along five-axis.

In the embodiment of FIG. 2A, the build platform includes an N-2 axis build platform member 210 and a two-axis build platform 212. The N-2 axis build platform 210 is moved by a drive assembly 214 along at least a portion of the N-2 axis. In the illustrated embodiment, the tool or deposition assembly 206 is moved in an X, Y plane and the build platform 210 is moved in the other axis directions (e.g. N-2 axis). In still other embodiments, the build platform 210 is in a fixed position and the drive assembly 214 moves the tool or deposition assembly 206 along the N-axis.

In an embodiment, the two-axis build platform 212 is integrated with the N-2 axis platform member 210. In this embodiment a first motor 216 and second motor 218 are provided to move or rotate the two-axis build platform 212 along an "A" axis and a "B" axis respectively. In an embodiment, the A-axis is a rotational movement about an axis extending through the center of and perpendicular to the two-axis build platform 212. In an embodiment, the B-axis is a pitch or yaw rotation of the two-axis build platform 212 about an axis extending parallel to the plane of the N-2 axis build platform member 210.

The motors 216, 218 are controlled by a two-axis processing module 220. As will be discussed in more detail herein, the two-axis processing module 220 may be integrated with, or cooperate with, a OEM printer controller 222, or may operate independently from the OEM printer controller 222. The two-axis processing module 220 is part of a System-on-Chip (SoC) that also includes an interface 224 that allows the two-axis processing module 220 to transmit and receive signals (e.g. communicate) over wired mediums (e.g. system hardware bus, USB or Ethernet), wireless mediums (e.g. WiFi or Bluetooth™), or a combination of the forgoing. The interface 224 may provide a connection with the OEM printer controller 222, an external or remote computer (not shown), or one or more internal components, such as a sensor 226 for example.

As will be discussed in more detail herein, the build platform 208 that includes an N-2 axis build platform member 210 and a two-axis build platform 212 may be integrated into the system 200 (e.g. natively part of the system), or may be added to an existing system 200 to increase the number of axis in which the object may be fabricated.

Figure 2B:
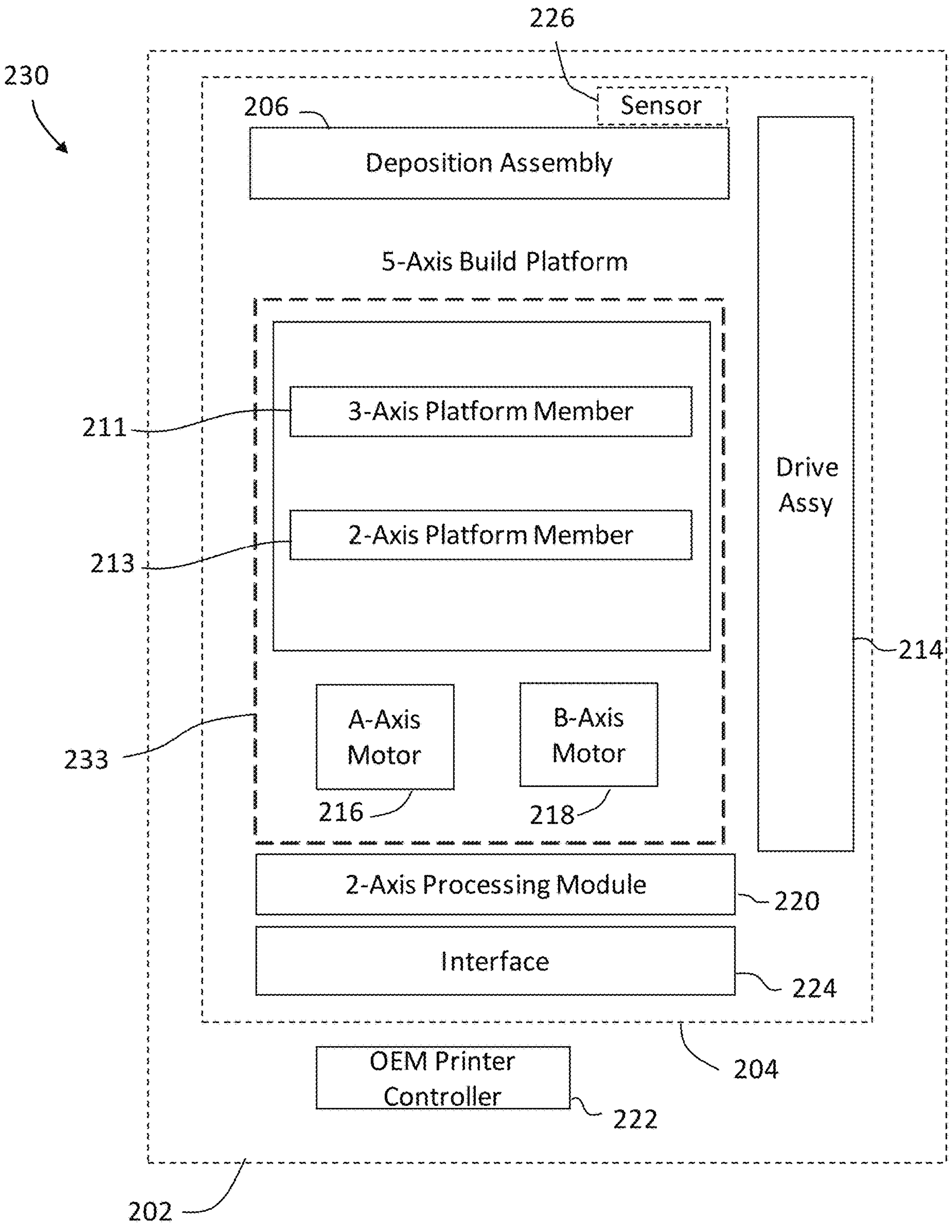
FIG. 2B is a schematic illustration of a 3-axis additive manufacturing system with a build platform that accommodates 5-axes in accordance with an embodiment.

Referring now to FIG. 2B, an embodiment in shown of a five-axis build platform 233. It should be appreciated that the five-axis additive manufacturing system 230 is a particular example or subset of the multi-axis system 200. The five-axis build platform 233 includes a 3-axis build platform member 211 and a two-axis build platform 213. The two-axis build platforms 211, 213 cooperate to allow fabrication of objects in five axis directions via the drive assembly 214 and tool/deposition assembly 206. In an embodiment, the axes include three orthogonal translation directions and two orthogonal rotation directions (rotation, pitch/yaw). An example of a five-axis build platform 233 will be described herein with respect to FIG. 3A-3D. The five-axis manufacturing system 230 otherwise performs in the same manner as the multi-axis system 200. The five-axis build platform 233 includes a pair of motors 216, 218 that rotate the two-axis build platform 213. The motors 216, 218 are controlled by a two-axis processing module 220. The two-axis processing module 220 includes an interface 224 that allows the two-axis processing module 220 to electrically couple or couple for communication with OEM printer controller 222. In an embodiment, one or more sensors 226 monitor the position of the tool/deposition assembly or the five-axis build platform 233 and provide a feedback signal to the two-axis processing module 220 via interface 224.

Figure 2C:
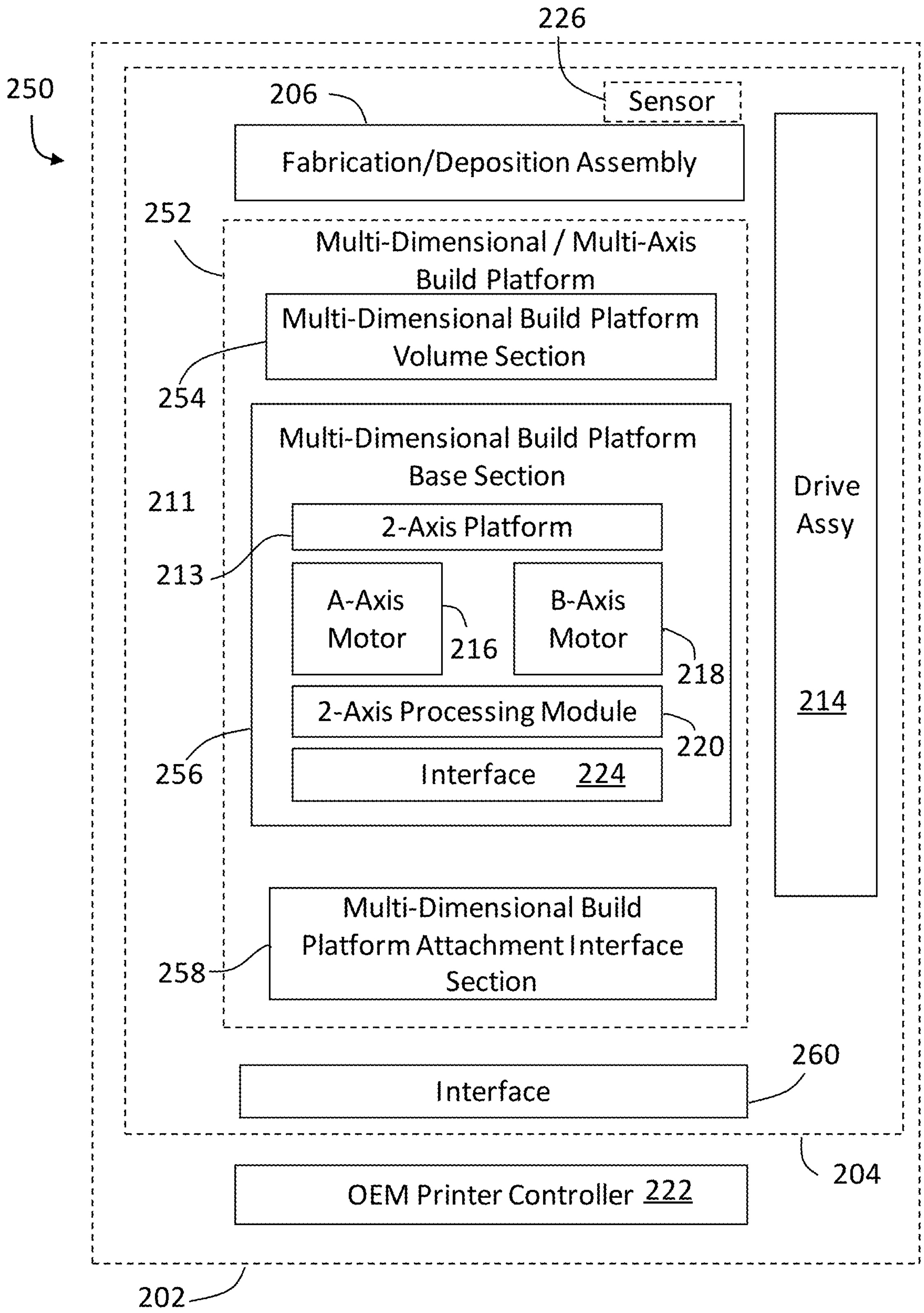
FIG. 2C is a schematic illustration of a multi-dimensional build platform having multiple axis in accordance with an embodiment.

Referring now to FIG. 2C, an embodiment is shown of a multi-dimensional/multi-axis additive manufacturing system 250. In this embodiment, the system 250 includes a multi-dimensional/multi-axis build platform 252 includes a multi-dimensional build platform volume section 254, a multidimensional build platform base section 256 and a multidimensional build platform attachment interface section 258. In an embodiment, the multi-dimensional build platform volume section 254, the multidimensional build platform base section 256, and the multidimensional build platform attachment interface section 258 are the same as that described in commonly owned U.S. patent applications Ser. No. 17/574,326, Ser. No. 17/574,330, and Ser. No. 17/574,331 all entitled "Methods and Apparatus for Additive Manufacturing Based Multi-Dimensional Build Platforms", the contents of all of which are incorporated by reference herein. The system 250 may also include an interface 260 that connects the multi-dimensional/multi-axis build platform to the OEM Printer Controller 222.

Incorporated into the base section 256 is a two-axis build platform 213. In an embodiment, the two-axis build platform 213 is configured to rotate at least a portion of the build platform volume section about two axes. In an embodiment, the two-axis build platform 213 by motors 216, 218. The motors 216, 218 are controlled by a two-axis processing module 220. The two-axis processing module 220 includes an interface 224 that electrically couples or couples for communication the two-axis processing module 220 with the OEM printer controller 222.

Figure 3A:
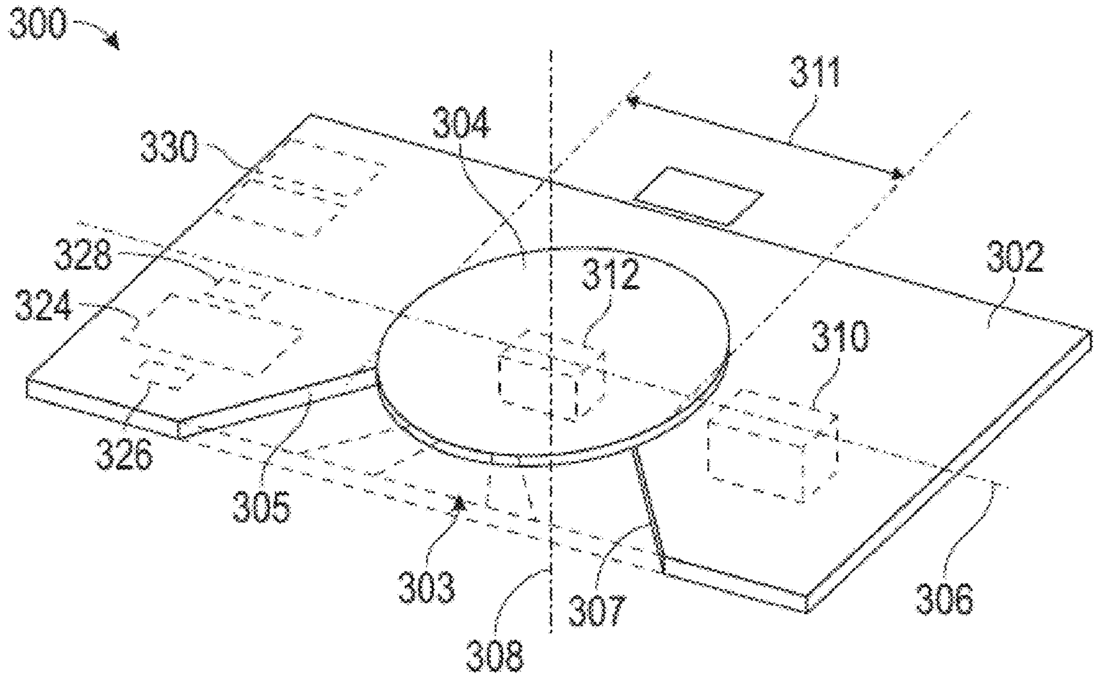
FIG. 3A illustrates a build platform for a 3-axis additive manufacturing system that accommodates 5-axis in accordance with an embodiment.
Figure 3B:
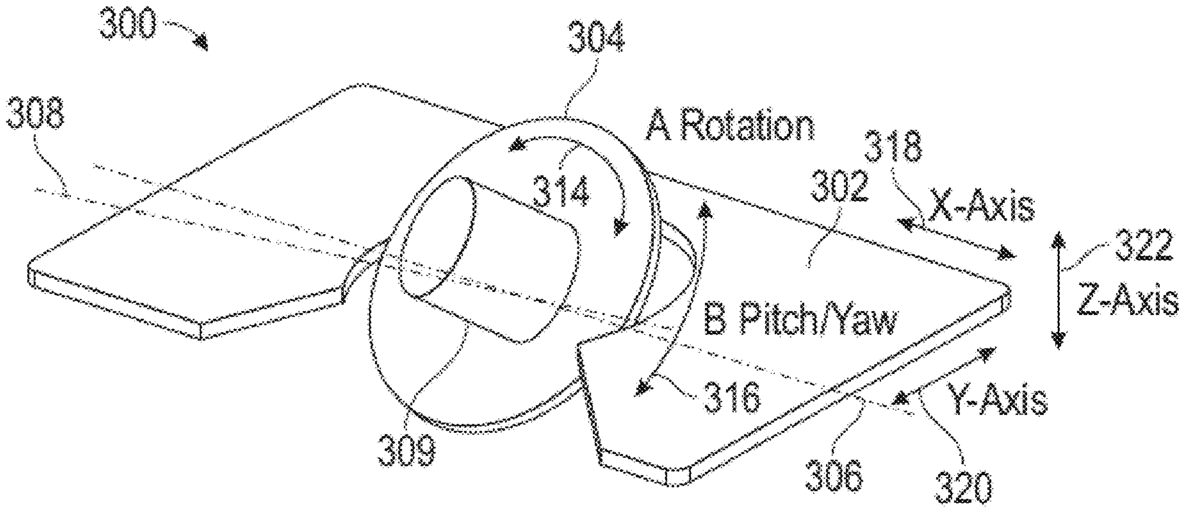
FIG. 3B is the build platform of FIG. 3A with a 2-axis portion rotated from a planar orientation in accordance with an embodiment.

Referring now to FIG. 3A and FIG. 3B an embodiment is shown of a build platform 300 that may be used in an additive manufacturing system, such as manufacturing system 200, 230, 250 for example. As will be discussed in more detail herein, the build platform 300 is configured to allow for the addition of 2-axis to an N-2 additive manufacturing system (e.g. 3-axis system) in a way that mimics the original build platform. In other words, the OEM printer still performs or functions in the same manner as it would if the object was being fabricated using N-2 axis. In other words, the additive manufacturing OEM printer controller 22 may operate without any knowledge/information regarding the additional 2-axis and functions as if operating in its original intended configuration. Thus, a 3-axis additive manufacturing system performs as a 3-axis printer while providing 5-axis for fabricating the target object.

In an embodiment, the build platform 300 includes a planar build portion 302 and rotational build portion 304. In an embodiment, the rotational build portion 304 is centrally located on the planar build portion 302. The rotational build portion 304 may be coupled to the planar build platform 302 to rotate about a first axis 306 and a second axis 308. In an embodiment, the first axis 306 extends parallel or co-planar with the planar build portion 302. In an embodiment, the first axis 306 extends through the center of the planar build portion 302. In an embodiment, the second axis 308 extends perpendicular to the rotational build portion 304. The second axis 308 rotates with the rotational build portion 304 when the rotational build portion 304 is rotated by the first axis 306.

In an embodiment, the planar build portion 302 includes a pitch relief region 303 defined between a pair of walls 305, 307. It should be appreciated that the pitch relief region provides a space for the object 309 that is being fabricated when the rotational build portion 304 is rotated about the pitch yaw axis 306 (FIG. 3B). In an embodiment, the walls 305, 307 are arranged on an angle relative to a plane extending through the center and perpendicular to the planar build portion 302. The inner edge of each wall 305, 307 defines a pitch clearance area 311 that represents a maximum width of the target object while allowing the free rotation of the rotational build portion 304.

It should be appreciated that the larger the pitch relief region 303, the wider the target object may be. It should be appreciated that the size pitch relief region 303 may be different depending on the target object being fabricated. In the case of a relatively thin object, a build platform may be provided where the walls 305, 307 are closer together, or there is a contiguous planar build portion 302 It should further be appreciated that the larger the pitch relief region 303 is, the less build room is available on the planar build portion 302.

In an embodiment, a planar build portion 302 may be provided that allows an end user to remove portions of the planar build portion 302 to adjust the size of the pitch relief region 303.

The build platform 300 may further include a pair of motors 310, 312 that are coupled to the rotational build portion 304 to rotate the rotational build portion 304 about the axis 306, 308 as indicated by the arrows 314, 316. The build platform 300 may further include a 2-axis processing module 324 that is electrically coupled to the motors 310, 312 and is configured to rotate the rotational build portion 304 during operation. The 2-axis processing module 324 may include an interface 326 that allows the 2-axis processing module 324 to communicate with a OEM Printer Controller or a remote computer for example. In an embodiment, a power management circuit 328 is provided that couples the 2-axis processing module 324 and motors 310, 312 with an energy source, such as a USB-C interface or batteries 330 for example, if present.

In an embodiment, the build platform 300 is also movable about three-translation axis as indicated by arrows 318, 320, 322. The movement in the translation directions as indicated by arrows 318, 320, 322 may be accomplished by the additive manufacturing system drive assembly, such as drive assembly 214 for example. In an embodiment, the build platform may include a drive interface 232 that allows the build platform 300 to couple with the drive assembly 214.

In an embodiment, the build platform 300 only moves in the vertical or "Z" axis direction indicated by arrow 322. Movement in the other translation in the direction of arrows 318, 320 is performed by the tool/deposition assembly 206. In still other embodiments, the planar build portion 302 is fixed relative to the build chamber and the movement along the translation in the directions of arrows 318, 320, 322 is performed by the tool/deposition assembly 206. It should be appreciated that the build platform 300 includes two areas, an N-2 axis area 302 (e.g. 3-axis area) and a N axis portion 304. The additive manufacturing system may be configured to print in both portions 302, 304 separately, or in both areas at the same time. For example, a target object may be fabricated using N-2 axis may in portion 302, while a second target object may be fabricated using N-axis in portion 304 during the same fabrication session.

Figure 3C:
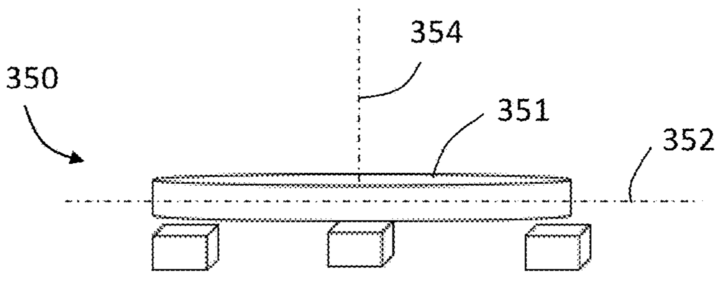
FIG. 3C is a perspective view illustration of a circular N-axis build platform in accordance with an embodiment.
Figure 3D:
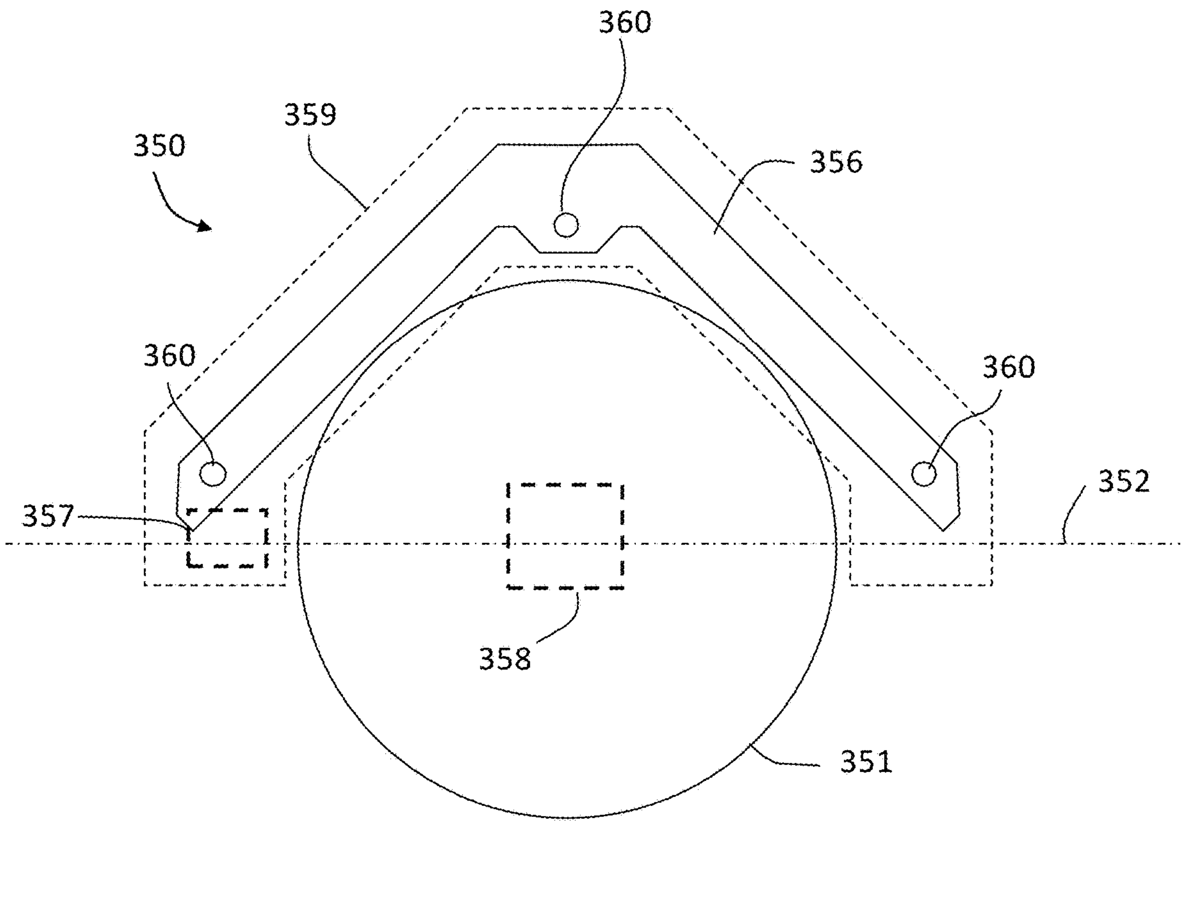
FIG. 3D is a plan view illustration of the circular N-axis build platform of FIG. 3C.

Referring now to FIG. 3C and FIG. 3D, another embodiment is shown of a build platform 350 that may be used in an additive manufacturing system, such as manufacturing system 200, 230, 250 for example. In this embodiment, the build platform 350 has a circular body 351 and the entire area of the build platform is rotatable about a first axis 352 and a second axis 354. In an embodiment, the second axis 354 is coaxial with an axis extending perpendicular to surface of, and at the centroid of, the body 351. In an embodiment, the first axis 352 extends through the axis of the cylindrical shape of body 351. In this embodiment, the body 351 may be optimized to operate in N-axis (e.g. 5-axis) with a direct integration to operate with the OEM printer controller. As a result, the entire build area may be used to fabricate objects that utilize up to N-axis for fabrication.

In an embodiment, the circular body 351 is supported by a frame 356. The frame 356 may have a V-shape when viewed along the direction of the second axis 354. The frame 356 supports a first motor 357 that rotates the body 351 about the first axis 352. In an embodiment a second motor 358 is coupled to rotate the body 351. The frame 356 may be adapted to couple with the drive assembly 214, such as to move the circular body 351 along the vertical or "Z" axis of the build chamber. The frame 356 may include features, such as set screws 360 for example, that allow the leveling of the circular body 351 relative to the X-Y plane of the system in which it is installed. The features may also allow the frame 356 to be coupled to a support structure 359 that is part of the additive manufacturing system in which the build platform 350 is being installed.

It should be appreciated that while the frame 356 is illustrated as having a particular V-shape, this is for exemplary purposes and the claims should not be so limited. In other embodiments, the frame 356 may have other geometric shapes, such as a U-shape build platform 399 (FIG. 3I), a square shape, a rectangular shape, a polygon, or any other suitable shape.

Figure 3E:
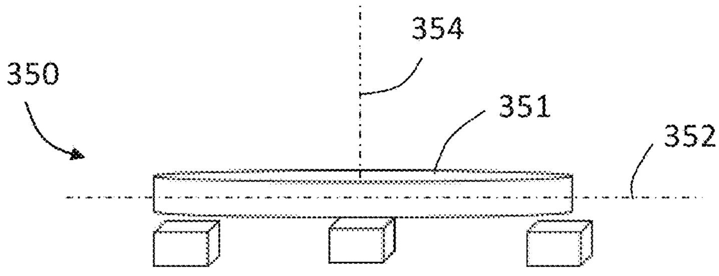
FIG. 3E is a perspective view illustration of a circular N-axis build platform depicting alternative gantry configurations.
Figure 3F:
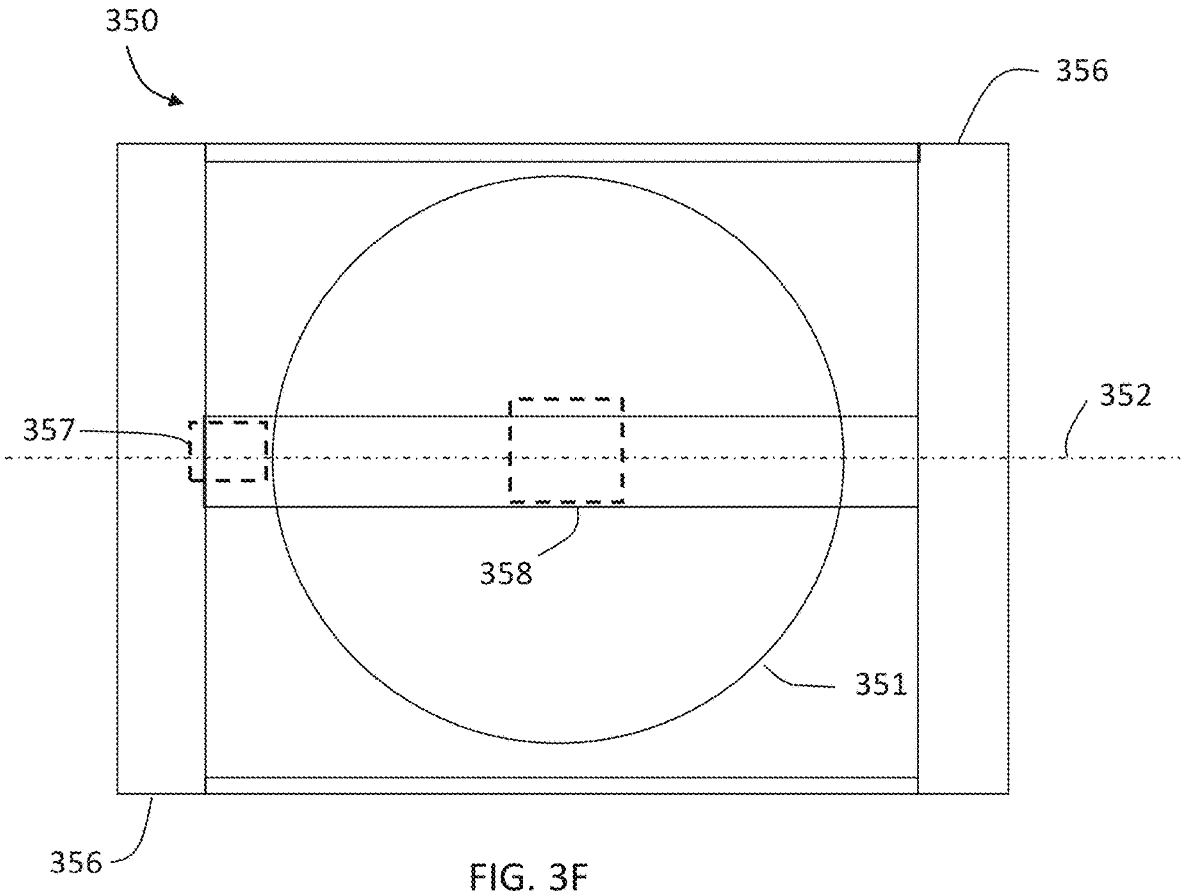
FIG. 3F is a plan view illustration of the circular N-axis build platform of FIG. 3E.
Figure 3G:
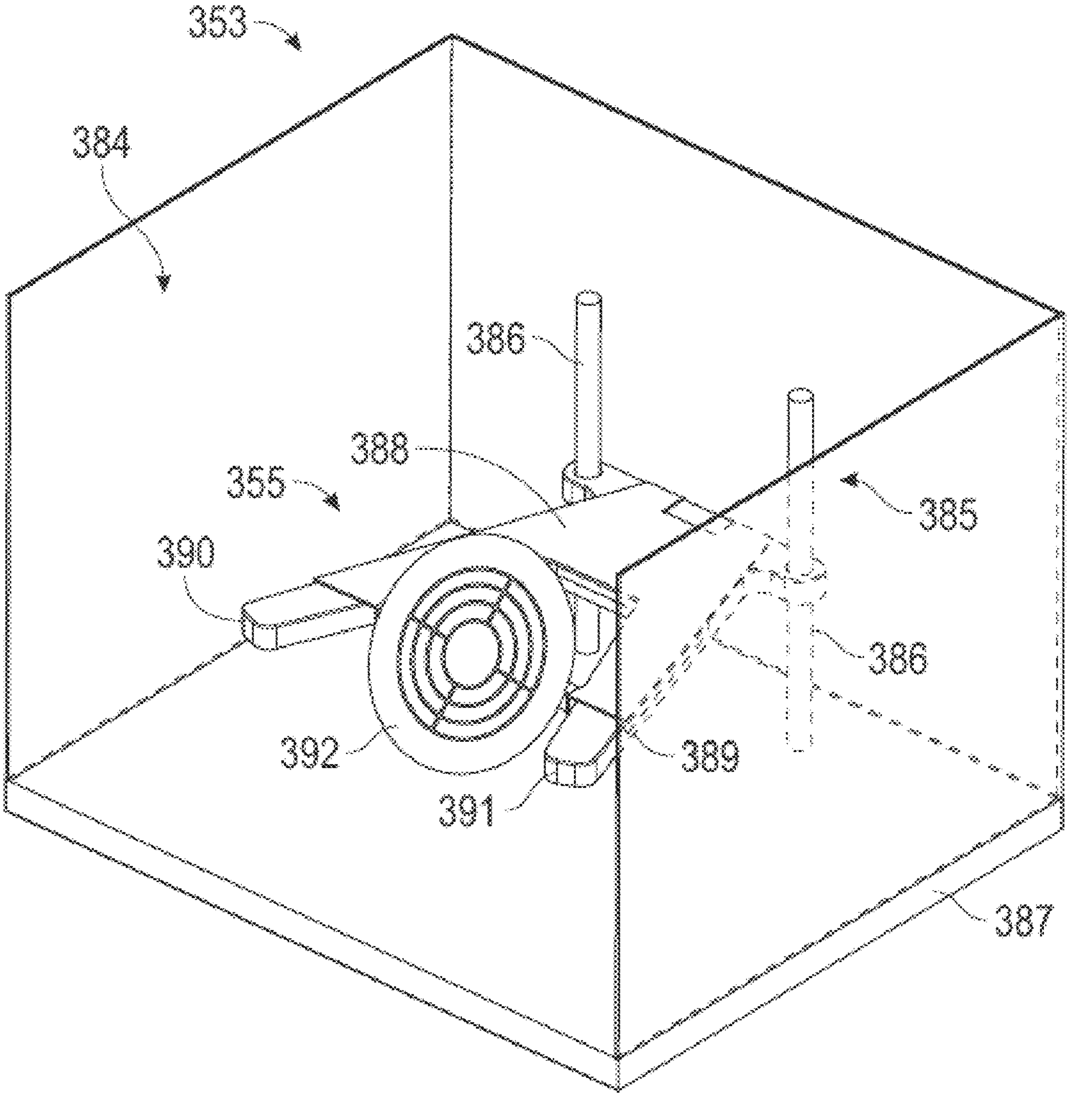
FIG. 3G is a schematic perspective view of an additive manufacturing system wherein the build 5-axis platform is integrated into the system.
Figure 3H:
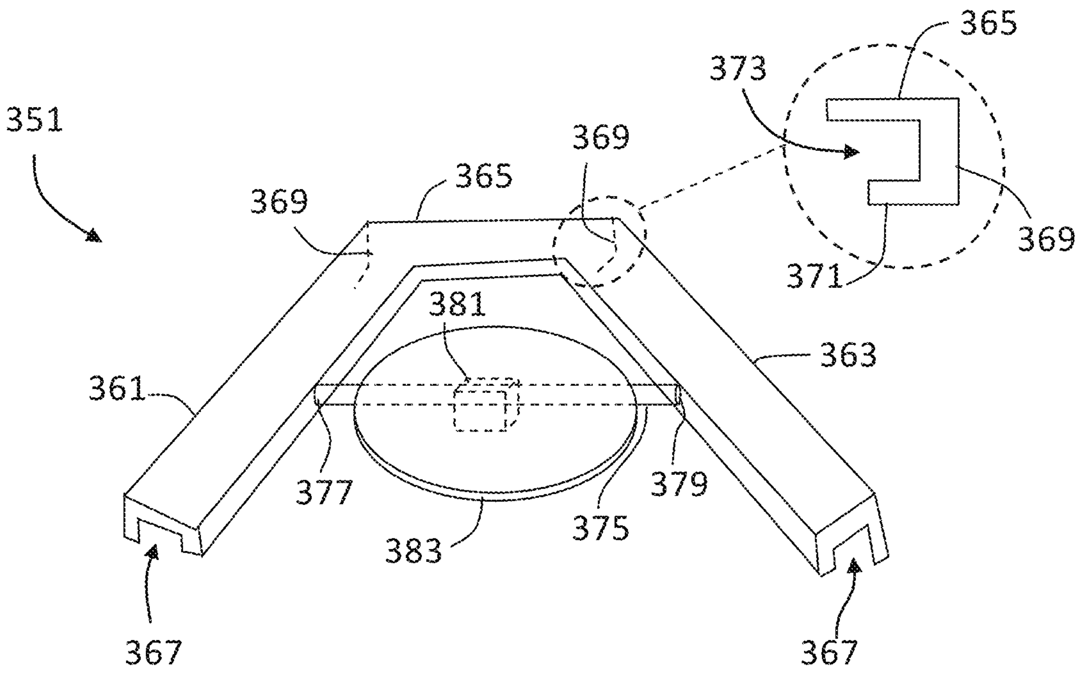
FIG. 3H is a schematic perspective view of a build platform assembly that allows for retrofitting into an existing OEM additive manufacturing system.

For example, another circular body 351 similar to the build platform 350 is shown in FIG. 3H. In this embodiment, the frame 356 includes a first arm 361 and a second arm 363 that are connected by a base 365. The arms 361, 363 are arranged on an angle relative to the base 365 (a "u" shape), however in other embodiments, the arms 361, 363 may be perpendicular to the base 365. In this embodiment, the arms 361, 363 and base 365 include a channel 367 that is sized and shaped to receive the support structure 359. Further, the base 365 includes a locking feature, such as clips 369. The clips 369 include a lip 371 that defines a second channel 373. In an embodiment, the support structure 359 is received in the second channel 373 with the lip 371 engaging the underside of the support structure 359 to removably fix the frame 356 to the support structure 359.

In this embodiment, a shaft 375 that is supported by bearings 377, 379 is suspended between the arms 361, 363. The shaft 375 is coupled to a motor (not shown) that rotates the shaft 375 about an axis (e.g. the B-axis of FIG. 3B) extending coaxially with the shaft. Coupled to the shaft 375 is a second motor 381. The circular build platform 383 is supported by the second motor 381 allowing the circular build platform 383 to be rotated about an axis (e.g. the A-axis of FIG. 3B) that is perpendicular to the rotational axis of the shaft 375.

Figure 3I:
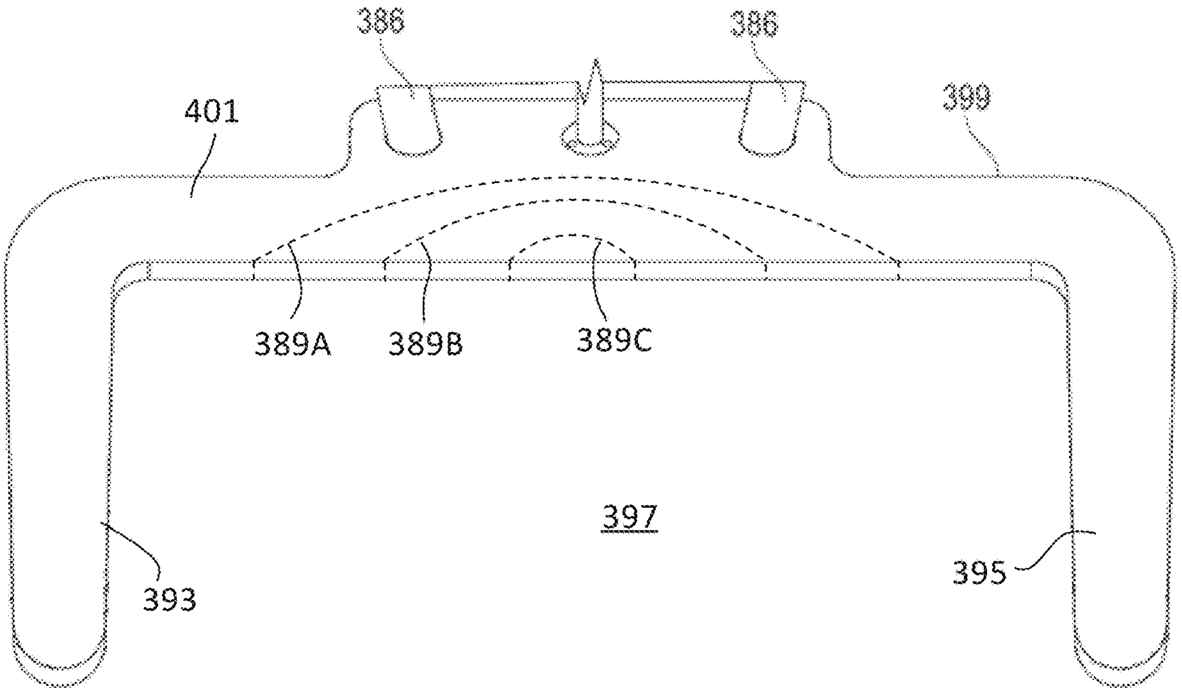
FIG. 3I is a schematic perspective view of an additive manufacturing system with the 5-axis platform coupled to the support frame in accordance with another embodiment.

In the embodiment of FIG. 3I, another build platform 399 is provided having a U-shaped body. It should be appreciated that the u-shape of the build platform 399 increases the efficiency of space utilization within the build chamber as it provides more space in the center portion 397 for the rotational build platform. In this embodiment, the build platform 399 is supported by the posts 386.

In an embodiment, the build platform 399 shown in FIG. 3I may have a first arm 395, second arm 393 and a base portion 401. The base portion 401 may extend straight between the arms 393, 395 as shown, or may be contoured as indicated by dashed lines 389A, 389B, 389C to provide additional clearance for the rotation of the rotational build platform. It should be appreciated that the shapes and sizes of the dashed lines 389A, 389B, 389C as illustrated are exemplary and may be changed to provide a desired clearance without deviating from the teachings provided herein.

FIG. 3E and FIG. 3F illustrate an example of such geometric shape variation that uses a rectangular configuration. In this embodiment, a support structure 359 extends between portions of the frame member 356 to support the motors 357, 358.

Referring now to FIG. 3G an embodiment is shown of an additive manufacturing system 353 having an integral build platform 355. The system 353 includes a build chamber 384 where the fabrication process is performed. Within the build chamber 384, a support structure 385, such as posts 386 are fixedly coupled to the housing 387 of the system 353. The build platform 355 is slidably coupled to the posts 386 and a driving mechanism (not shown) is configured to selectively move/translate the build platform 355 along the posts 386.

In this embodiment, the build platform 355 includes a build platform support structure portion 388 that is coupled to a system support structure 389. The build platform portion 392 allows for the fabrication of a target object along five-axis. The system support structure 389 includes a pair of arms 390, 391. In an embodiment, a portion of the planar build platform extends onto the arms 390, 391. Rotationally coupled to the arms 390, 391 is a rotational build platform portion 392. The rotational build platform portion 392 is configured to be selectively (and in some cases simultaneously) rotated about two orthogonal axis (e.g. axis A and axis B of FIG. 3B). In the illustrated embodiment, the build platform 355 may be constructed in the same or similar manner to circular body 351 of FIG. 3H. In an embodiment, the controller and at least some of the ancillary components (e.g. power electronics, energy sources) used to operate the rotational build platform portion 392 are positioned on, or coupled to, the support structure. It should be appreciated that components associated with controlling and operating the rotational build platform portion 392 may be coupled or connected to the support structure in any known manner suitable for the application.

In some instances, the embodiments shown in FIGS. 3A, 3B and 3G may be operated in a manner referred to as a 3+2 additive manufacturing build platform. In these embodiments, the object is printed in a 3-axis manner while keeping the rotational build platform at a fixed angle and rotation. In an embodiment, as described in more detail herein, the 3+2 method of operation may be performed as a series of sequential build volumes that are fabricated with the rotational build platform a different fixed and rotational orientations.

Figure 4A:
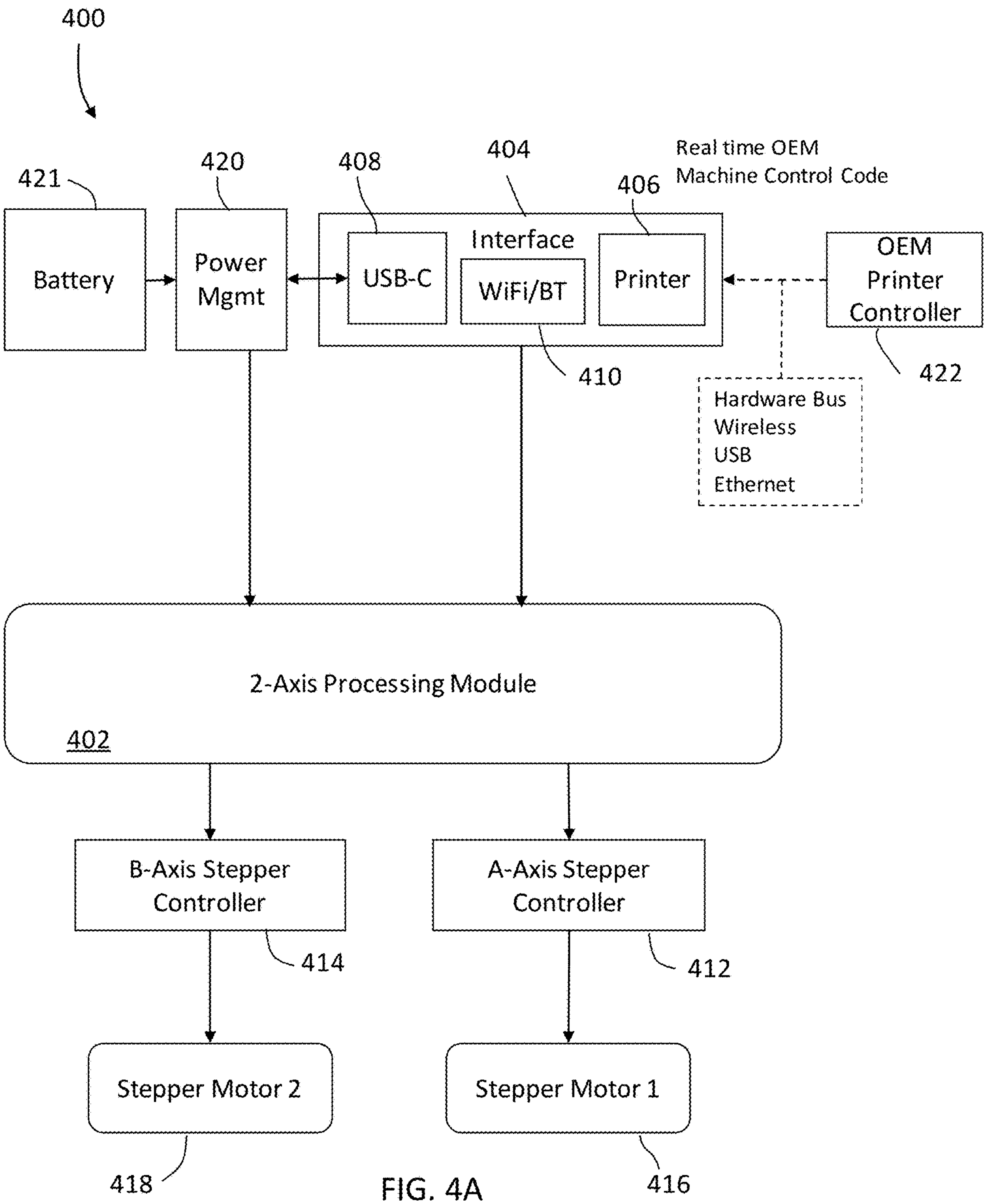
FIG. 4A is a block diagram of a portion of an additive manufacturing system with the additional 2-axis portion controlled by machine control code from a OEM printer controller.

Referring now to FIG. 4A-FIG. 8, different embodiments are shown of a control system for a 2-axis build platform, such as two-axis build platforms 212, 213 for example. The control systems for the 2-axis platform may be grouped into two classifications for the mode of operation: 1) nonpredictive modes; and 2) predictive modes. A nonpredictive mode of operation provides for a 2-axis build platform that is integrated with the additive manufacturing system (e.g. manufacturing system 200, 230, 250) and machine control codes, such as a computer numerical control programming language or "G-code", is transmitted from the OEM Printer Controller, such as OEM Printer controller 222 for example, to the 2-axis processing module. In a predictive mode of operation, the 2-axis processing module receives positional data on the tool/deposition assembly (e.g. deposition assembly 206) either from the OEM Printer Controller or from independent position sensors (e.g. sensors 226). In the predictive mode of operation, the 2-axis processing module implements a motion processor or motion engine that predicts the next action or movement of the tool/deposition assembly that is being executed by the OEM Printer Controller. In response to this prediction, the 2-axis processing module determines both the angular position (e.g. about axis 306, 308) of the rotational portion and the rotational position of the build platform (e.g. portion 304) that is desired to allow for the object to be fabricated. In one or more embodiments, the motion processor uses a Hidden Markov Model engine or a neural network for determining the predictions. Referring to FIG. 4A, an embodiment is shown of a control system 400 for controlling a 2-axis build platform member, such as two-axis build platforms 212, 213, 304, 351 for example, that operates in a nonpredictive mode of operation. In this embodiment, the control system 400 includes a axis processing module 402. The axis processing module 402 may be a suitable electronic device capable of accepting data and instructions, executing the instructions to process the data, and presenting the results. axis processing module 402 may accept instructions through user interface, or through other means such as but not limited to electronic data card, voice activation means, manually-operable selection and control means, radiated wavelength and electronic or electrical transfer. Therefore, axis processing module 402 can be a microprocessor, a field programmable gate array (FPGA), a system on a chip (SoC), a microcomputer, a minicomputer, an optical computer, a board computer, a complex instruction set computer, an ASIC (application specific integrated circuit), a reduced instruction set computer, an analog computer, a digital computer, a molecular computer, a quantum computer, a cellular computer, a superconducting computer, a supercomputer, a solid-state computer, a single-board computer, a buffered computer, a computer network, a desktop computer, a laptop computer, a scientific computer, a scientific calculator, or a hybrid of any of the foregoing.

axis processing module 402 is operably coupled with one or more components of the additive manufacturing system (e.g. manufacturing system 200, 230, 250) by an interface 404. The interface 404 is configured to couple with data transmission media that may include, but is not limited to, twisted pair wiring, coaxial cable, and fiber optic cable. Data transmission media also includes, but is not limited to, wireless, radio and infrared signal transmission systems. In the embodiment shown in FIG. 4A the interface includes ports that include a first port 406 to couple with the OEM Printer Controller 422, a second port 408 to couple with an industry standard computer connection, such as a Universal Serial Bus (USB), OEM hardware bus, and a wireless communications circuit 410, such as WiFi, or BlueTooth™ for example. axis processing module 402 is configured to provide operating signals via the interface 404 and to receive data from the ports 406, 408 or communications circuit 410.

In general, axis processing module 402 accepts data via interface 404 and is given certain instructions for the purpose of controlling the angular and rotational position of the build platform member. In the exemplary embodiment, the OEM Printer Controller 422 transmits machine control code (e.g. G-code) via the interface 404 to the 2-axis processing module 402. The 2-axis processing module 402 receives the machine control code and transmits signals (e.g. low level control signals) to motor controllers 412, 414 to initiate operation of motors (e.g. motors 216, 218, 310, 312, 356, 358) to rotate the rotational build platform portion (e.g. portion 304, 351) to a desired angular position about the first axis (e.g. axis 306, 352) or the second axis (e.g. axis 308, 354). In an embodiment, the motor controllers 412, 414 convert the signals from the 2-axis processing module 402 into control signals to the motors 416, 418 (e.g. motor control pulses). In the exemplary embodiment, the motors 416, 418 are stepper motors.

The control system 400 further includes additional components, such as a power management module 420 that regulates power from an energy source, such as battery 421 to the 2-axis processing module 402. In an embodiment, the USB port 408 complies with the USB Implementers Forum type C standard. This port 408 is also coupled to the power management module 420 to allow electrical power received by the port 408 to be used to replenish the electrical power in the battery 421. In another embodiment, the USB-C directly powers the 2-axis system while recharging the battery 421 if present.

Figure 4B:
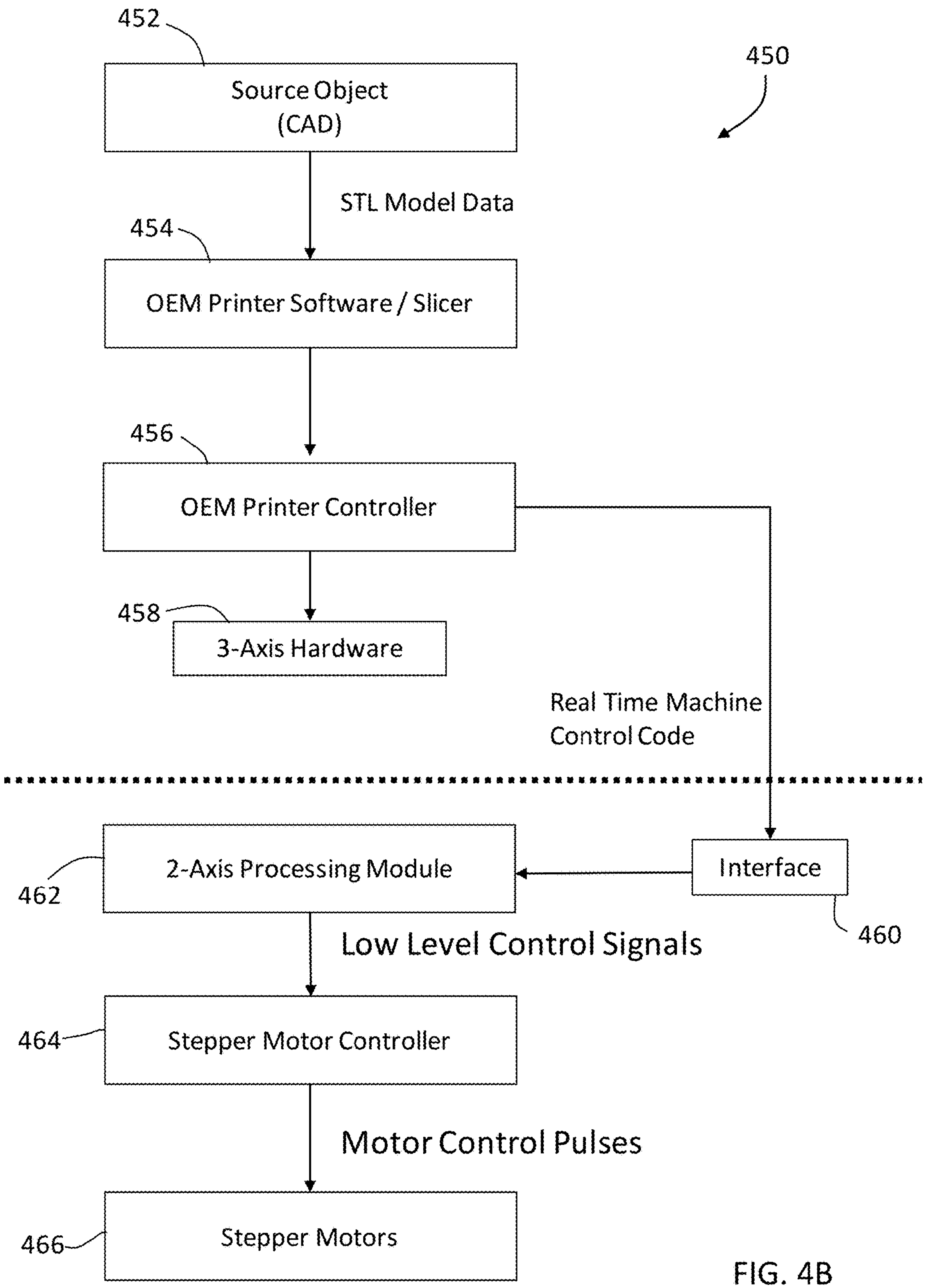
FIG. 4B is a data flow diagram for the additive manufacturing system of FIG. 4A.

Referring now to FIG. 4B, a data flow 450 is shown for operating the control system 400. The data flow 450 starts in block 452 with a source object, such as a computer aided design (CAD) model. The source object is exported in an industry standard format, such as an STL file (i.e. standard triangle language or standard tessellation language) for example, and transmitted to an additive manufacturing system software in block 454, sometimes referred to as a "slicer". The slicer program analyzes the exported source object and determines how to fabricate the object on the additive manufacturing system. The slicer program divides the model into individual material layers throughout the z-axis or "slices" and outputs the information in a machine control code (e.g. G-code). In an embodiment, the slicer program divides the model into individual material layers in accordance to the desired geometries based on the number of axes supported. In the embodiment of FIG. 4A and FIG. 4B, the slicer is provided by the manufacturer of the additive manufacturing system (i.e. the original equipment manufacturer or OEM).

The outputted machine control code is transmitted to the OEM printer controller 422 in block 456. The OEM printer controller interprets the machine control code and transmits a first group of signals to the 3-axis components in block 458. The first group of signals may include low level control signals to one or more motor controllers that effectuate movement along the translational axis (e.g. in the direction of arrows 318, 320, 322). In an embodiment, the OEM printer controller interprets and separates the received machine control code into translational machine control code and rotational machine control code.

The OEM printer controller in block 456 also transmits machine control code for the angular positions of the rotational platform portion in real-time to the interface 404 in block 460. The interface transfers the machine control code to the 2-axis processing module 402 in block 462. The 2-axis processing module 402 interprets the machine control code and transmits low level control signals to the motor controllers 412, 414 in block 464 which generate motor control pulses that are transmitted to the motors 416, 418 in block 466.

It should be appreciated that the nonpredictive mode of operation includes an integration of the 2-axis processing module into the operation of the additive manufacturing system. In some embodiments, the functionality of the 2-axis processing module 402 may be integrated into the OEM printer controller 422. In embodiments such as this, the 2-axis processing module 402 and the OEM printer controller 422 operate synchronously. It should be appreciated that when such integration is not provided. Such as when a build platform with a 2-axis platform portion is added to an existing additive manufacturing system, the 2-axis processing module and the OEM printer controller may be operating independently, or asynchronously, at least to some degree. When the 2-axis processing module and the OEM printer controller are operating asynchronously, a predictive mode of operation may be used to operate the 2-axis build platform and to synchronize all tool path motion operations.

Figure 1A:
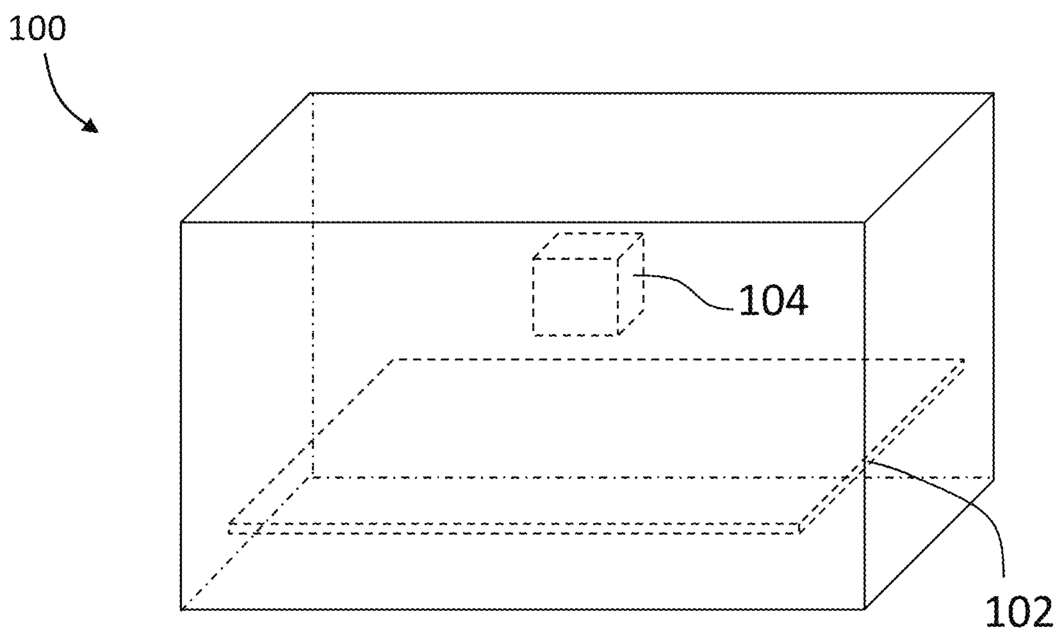
FIG. 1A Prior Art
FIG. 1A is a perspective view of a prior art planar and 3-axis additive manufacturing system.
Figure 1B:
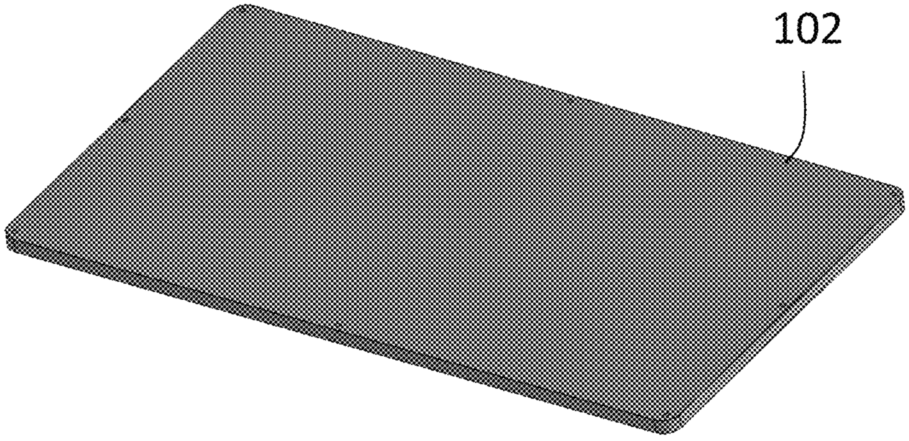
FIG. 1B Prior Art
FIG. 1B is a perspective view of a prior art planar build platform.
Figure 5A:
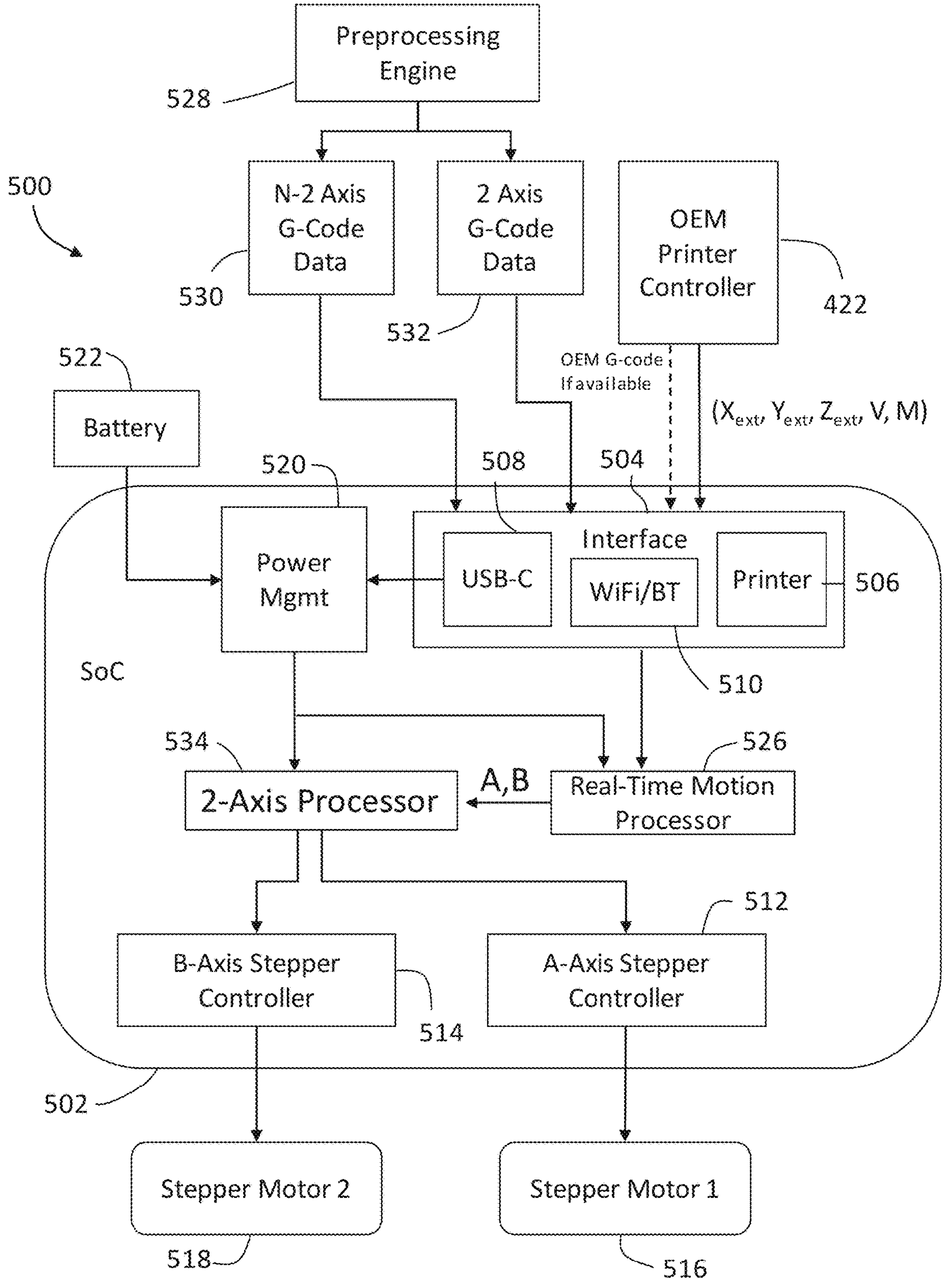
FIG. 5A is a block diagram of a portion of an additive manufacturing system that received real-time positional data from an OEM Printer Controller that transfers positional data, through an interface module, to a real-time motion processor for predicting a 2-axis machine control code based at least in part on the position data and an OEM predicted machine control code to a preprocessor in accordance with an embodiment.

Referring now to FIG. 5A, an embodiment is shown of a control system 500 for operating a 2-axis build platform. In this embodiment, the control system 200 receives real-time positional data (as opposed to machine control code) from positional data processor 522 as a synchronized stream of data representing the X, Y, and Z positions based on the OEM N-2-axis machine control code (internal to printer) executing within the OEM printer controller. The streaming of real-time positional data is fully synchronized with additive manufacturing system N-2-axis movements since the OEM printer controller 422 is the source of positional data. In the case of FIG. 5A-1, the positional data is not independently measured or based on real-time sensors, but rather generated directly by the positional data processor 522. The N-2-axis machine control code utilized by the 2-axis processing module 502 is independently generated by the preprocessor (predictive mode) and is utilized in conjunction with the real-time X,Y,Z and optionally V, M from the OEM printer controller 422 by the motion processor 526. As used herein, the M vector may include additional slicer, device/tool control, or toolpath metadata, including the OEM machine control code if it available. As used herein the "V" data represents motion vector data such as acceleration or velocity for example. The real-time motion processor 526 then generates the next-state machine control code prediction including 2-axis machine control codes which in turn is used by 2-axis processing module 502 to actuate both A, B axes in accordance to the movement operations.

It should be appreciated that the embodiment of FIG. 5A may be considered in one respect to be a "non-predictive" method of operation since the X, Y, Z (and optionally V, M) data is received directly from the OEM printer controller 422. However, even in this embodiment, the X, Y, Z (and optionally V, M) is used to predict the next state of the machine control code.

Figure 5B:
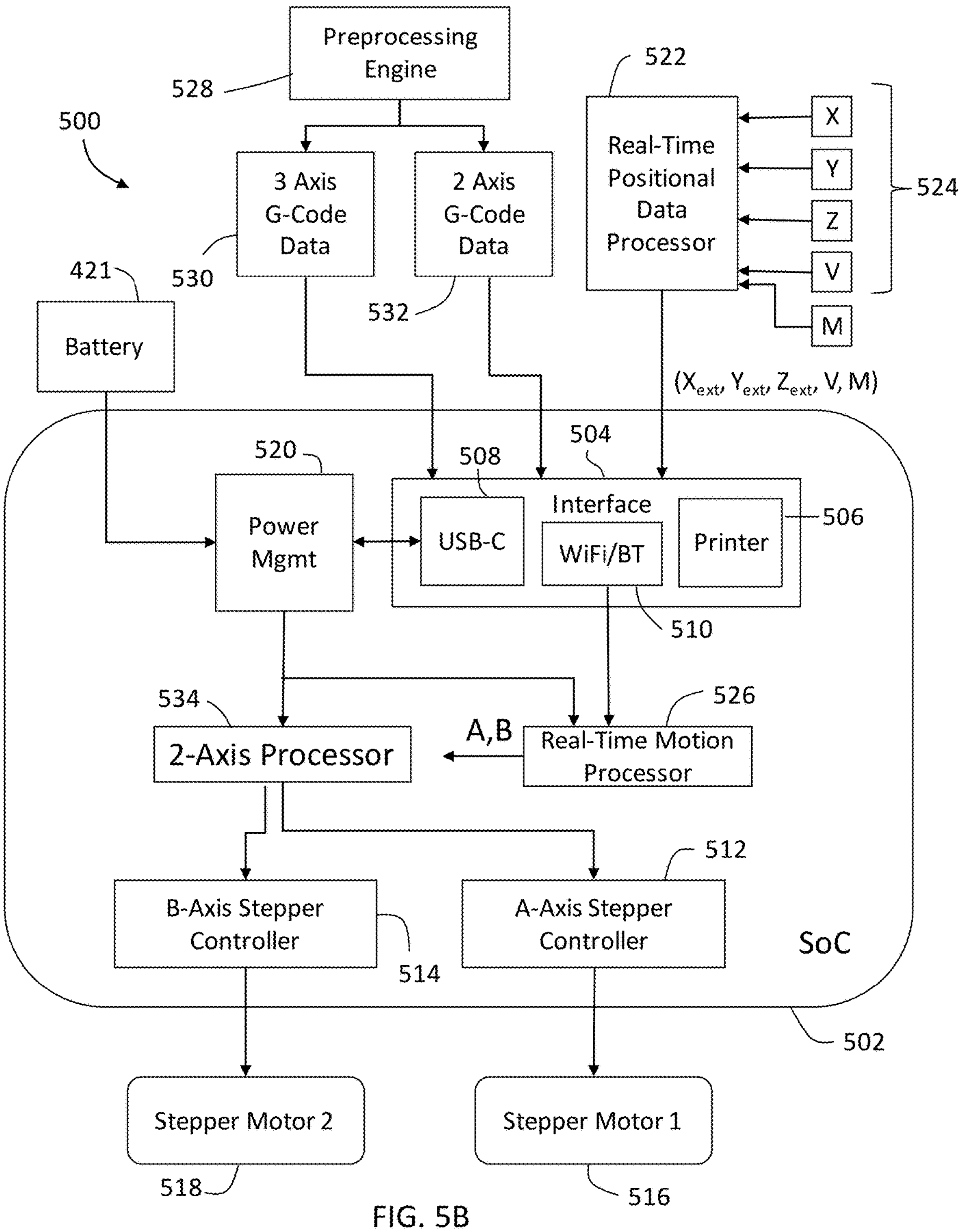
FIG. 5B is a block diagram of a portion of an additive manufacturing system that received real-time positional data from one or more positional sensors, in conjunction with a real-time positional data processor that transfers positional data, through an interface, to a real-time motion processor for predicting a 2-axis machine control code based at least in part on the position data and an OEM predicted machine control code to a preprocessor in accordance with an embodiment.

In an embodiment of FIG. 5B, positional data may be received from a plurality of sensors 524 within the build chamber that measure the position of components along the respective axis (e.g. in the direction of arrows 318, 320, 322 and along axis 306, 308). This embodiment differs from that of FIG. 5A in that the sensors 524 operate and transmit data independently of the OEM printer controller 422. In an embodiment, the sensor 524 data may be processed by a real-time positional data processor 522 that receives the raw data from the sensors 524 and generates output signals to the interface 504. In an embodiment, the positional data processor 522 includes an data converter that receives data signals from the sensors 524 and outputs a suitable digital signal. In an embodiment, the V data (e.g. acceleration or velocity of the tool) may be determined by the positional data processor 522. It should be appreciated that while FIG. 5B illustrates the data flow of the M data as being routed through the positional data processor 522, this is for exemplary purposes and the claims should not be so limited. In other embodiments, the 2-axis processing module 502 may receive the M data via other connections, such as directly from the interface 504 example.

It should be appreciated that in the embodiment of FIG. 5B, since the positional data is not synchronized with the OEM printer controller 422, one or more sensor data samples may be acquired between each stepper motor movement in order to determine/predict the tool location. In other words, synchronization may be achieved by the operation of the motion processor that is configured to determine how to effectively synchronize X, Y, Z, A, B for the next target state, given the sub-samples of positional data acquired and processed.

In an embodiment, the positional data may include an X-axis position of the deposition extruder, a Y-axis position of the deposition extruder, Z-axis position of the deposition-extruder or build platform and optional movement data (collectively referred to by the variable "V"), such as velocity and/or acceleration of components within the build chamber. The positional data is transmitted to the interface 504 such as via port 506, USB port 508, or wireless communications circuit 510. The positional data is transferred to a real-time motion processor 526 that is part of 2-axis processing module 502. In the illustrated embodiment, the 2-axis processing module 502 is an integrated circuit in the form of a system-on-chip (SoC).

The motion processor 526 receives the positional data and combines this with information from a preprocessing engine 428 to determine the angular positions A, B that correspond to the 3-axis machine control code being executed on the positional data processor 522 to position the build platform and/or tool/deposition assembly. As will be discussed in more detail below, the preprocessing engine outputs a 3-axis machine control code data 530 and a 2-axis machine control code data 532 that are transmitted to the motion processor 526 via the interface 504. It should be appreciated that while the hardware/software functionality is described as being in a particular location, the embodiments described herein may be configured in different hardware and/or software configurations without deviating from the teachings herein.

The motion processor 526 determines the optimal angular positions A, B for the given OEM X, Y, and Z tool movements, and transmits them to a 2-axis processor 534 that generates low level control signals to motor controllers 512, 514. The motor controllers 512, 514 generate and transmit motor control pulses that are transmitted to motors 516, 518 to rotate the rotational platform portion to the defined angular positions A, B.

Figure 5C:
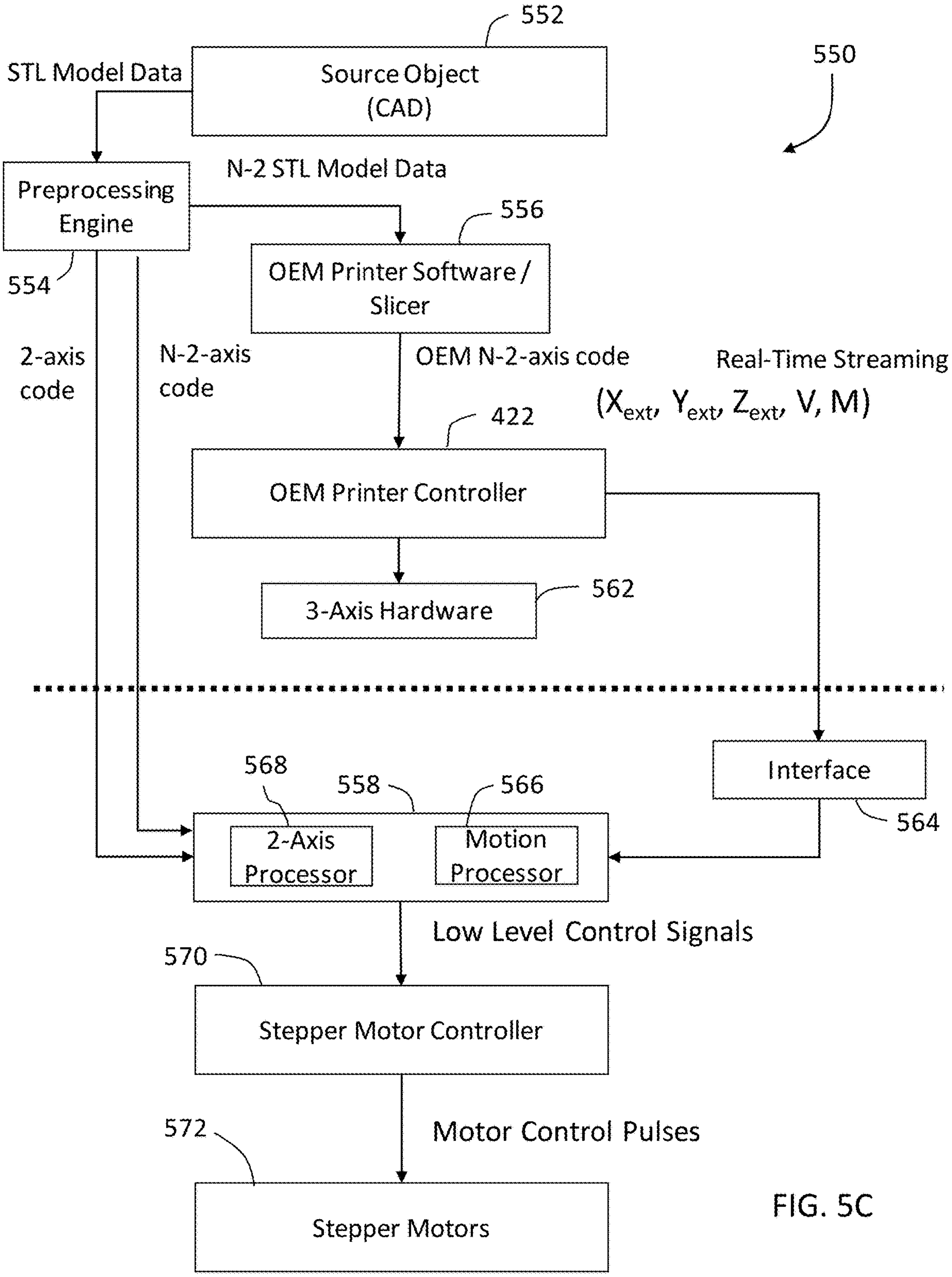
FIG. 5C is a data flow diagram for the additive manufacturing system of FIG. 5A.

Referring now to FIG. 5C, an embodiment is shown of a data flow 550 for the control system 500. In this embodiment, the data flow 550 begins in block 552 where a source object or electronic file such as a CAD file is generated. The source object is exported in an industry standard format, such as an STL file (i.e. standard triangle language or standard tessellation language) for example, and transmitted to a preprocessing engine in block 554. It should be appreciated that in this embodiment, the preprocessing engine and the OEM slicer software may be performed by the same software module.

Figure 5D:
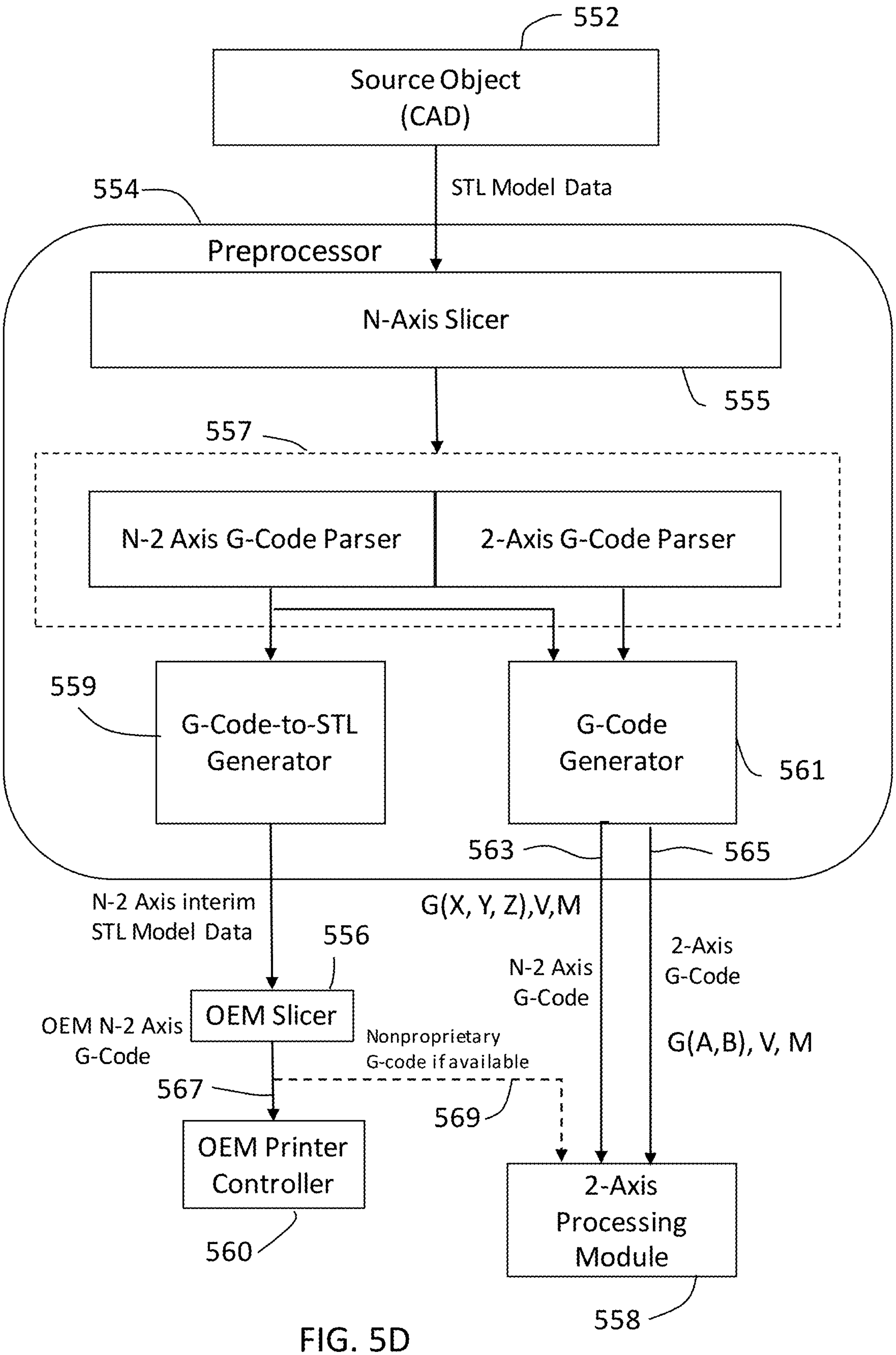
FIG. 5D is a block diagram showing the processing of the CAD data for the source object in accordance with an embodiment.

As shown in FIG. 5D, in an embodiment the preprocessor engine of block 554 receives the STL model data and processes it using an N-Axis slicer (e.g. a 5-axis slicer) in block 555. The N-axis slicer software generates an N-axis machine control code. It should be appreciated that 5-axis machine control code includes commands for both the N-2 axis (e.g. three translation axis) and the 2-axis (e.g. rotation axis A, B). This N-axis machine control code is transferred to a parser software 557 that separates the N-2 commands from the 2-axis commands. This results in the generation a first machine control code having the N-2 axis machine control codes and a second set of machine control code having the 2-Axis machine control codes.

The N-2 axis machine control code is processed using a machine control code generator software block 561 whose function is to create two streams of resultant machine control code command sequences in suitable format for processing by the 2-axis processing module of block 558 (e.g. the motion processor). In an embodiment, the first data stream 563 includes a machine control code having X, Y, Z command sequences and optionally V data and/or M data. The second data stream 565 includes machine control code having angular A, B command sequences and optionally V data and M data. In an embodiment, the M data may be an index or a look-up table that provides a correspondence between the X, Y, Z command sequences and the A, B command sequences. In an embodiment, the M data may include other tool control command sequences for controlling the build platform properties or operation, such as temperature. In an embodiment, the M data may include other command sequences for controlling other functional capabilities such as those supported in a multi-dimensional build platform. In an embodiment, the M data may include other control command sequences to apply correction metadata for the reduction or elimination of support structures. In an embodiment, the M data may include tool operation properties such as material feed rate and deposition control.

The N-2 axis STL model data is processed by the OEM slicer software (e.g. an N-2 slicer) in block 556 to generate an OEM N-2 axis machine control code (G-code). The OEM N-2 axis machine control code is then transferred to both the OEM printer controller 422 along data stream 567 in block 560 and along data stream 569 to the 2-axis processing module 502 in block 558 if available in a nonproprietary or open format. It should be appreciated that the data steam 569 to the 2-axis processing module may include M data when available.

It should be appreciated that in some embodiments the 2-axis processing module is configured to utilize any data that may be available in order to improve the accuracy of the prediction of the next state of the machine control code. Where the OEM slicer of block 556 outputs a nonproprietary or open format machine control code, this may be used to enhance the prediction. Where the OEM slicer of block 556 outputs a proprietary machine control code format, this may be readable only by the OEM printer controller 422 and the 2-axis processing module uses machine control code from data stream 563 as a close approximation of the OEM N-2 axis machine control code for making predictions on the next state of the machine control code.

The parser software 557 also generates 2-axis model machine control code in block 561 that represents the angular position commands for axis A, B. This 2-axis model machine code is first processed by the machine control code generator of block 561 to produce a final structured and formatted output, where it is then transmitted to the 2-axis processing module 502 in block 558.

It should be appreciated that the N-2 axis STL model data represents an electronic model of the source object that once processed by the OEM slicer software in block 556 will produce an N-2 axis machine control code. This N-2 axis machine control code, when executed in combination with the Model 2-axis machine control code results in the fabrication of the source object. In an embodiment, the N-2 axis STL model and resulting machine control code outputs corresponding to each of the desired axis movements is generated in the context of a N axis slicer such that the composition of the N-2 axes and 2 additional axes are configured and combined at fabrication time, creating a superposition process that results in the original target model and source object.

Referring back to FIG. 5C, during operation of the additive manufacturing system to fabricate the target object, the OEM printer controller 422 generates low level control signals to the N-2 axis control devices (e.g. motors that move the tool/deposition assembly and/or the build platform) in block 562 and may also stream in real-time the positional data (e.g. X, Y, Z positions of the tool/deposition assembly and/or build platform, and optionally movement parameters V, or meta data M) to the interface in block 564. The real-time positional data is then transferred to the 2-axis processing module 502 in block 558. The meta data M may include machine control code when the OEM slicer outputs a nonproprietary or open format machine control code.

The real-time positional data is used by the motion processor 526 in block 566 along with the N-axis code and the 2-axis code to predict the angular positions A, B of the 2-axis platform portion. The angular positions A, B are transferred to the 2-axis processor in block 568 which generates low level control signals. These control signals are transmitted to the motor controllers 512, 514 in block 570. The motor controllers 512, 514 then transmit motor control pulses to the motors 516, 518 in block 572.

Figure 5E:
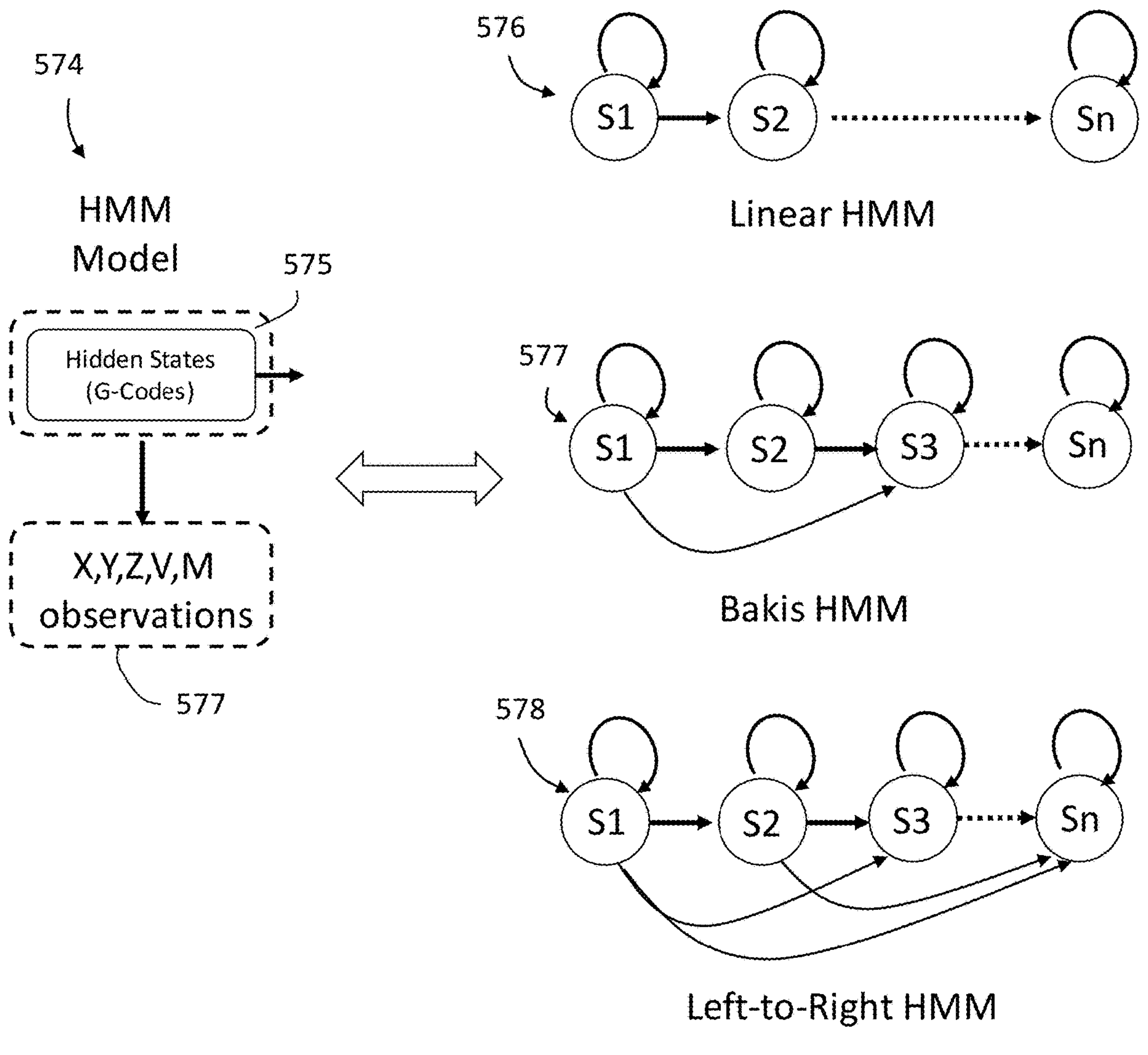
FIG. 5E is a schematic diagram of an HMM Linear model, with different scenarios.
Figure 5F:
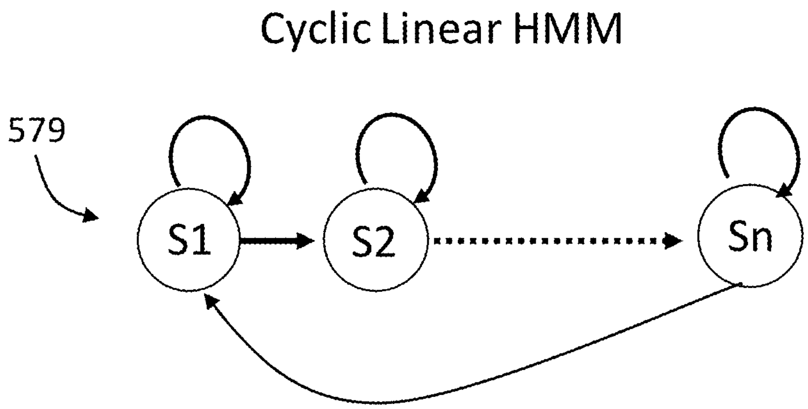
FIG. 5F is a schematic diagram of a cyclic linear HMM model.
Figure 5G:
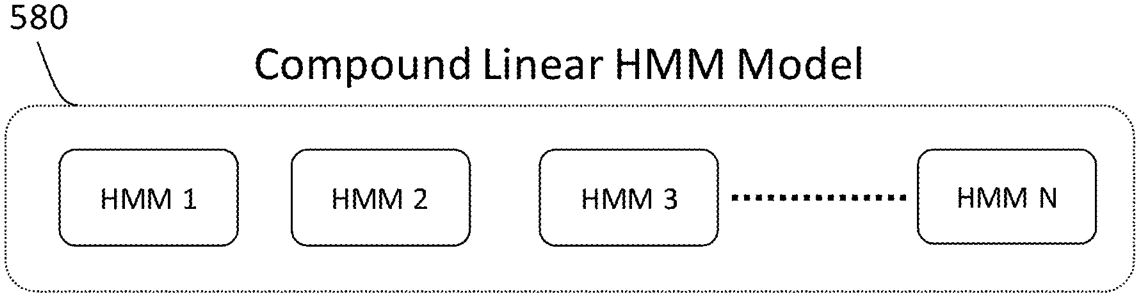
FIG. 5G is a schematic diagram of a compound linear HMM model.

Referring now to FIG. 5E, FIG. 5F, and FIG. 5G an embodiment of a process for predicting the angular positions using a Hidden Markov Model (HMM) 574 is shown. An HMM model is a method of modeling a system that has hidden or unobservable states 575 by assuming it is follows a Markov process 576. A Markov process is a stochastic model that describes a sequence of possible events or states S1-Sn in which the probability of each event S depends on the state attained only in the previous event. A stochastic model with such memoryless property is said to satisfy the Markov property. In the case of the HMM, there is an observable process that is influenced by the outcome of the Markov process in a known way. In other words, the hidden or unobservable state 575 can be predicted based on an observable process 577.

In general, a stochastic process is a collection of random variables which represent the evolution of a random values over time, such as the progression of a tool path or change of position of a tool in the context of an additive manufacturing (AM) system. The states in the stochastic process have distribution probabilities for the collection of random variables and the transitions from state to state depending on such distribution probabilities. The Markov property states that the probability distribution of future states depends only on the present state. In an HMM, the unobserved states indicate that the states are not directly visible, but rather that observed states or outputs depends probabilistically on the unobserved, or hidden states.

In embodiments herein, the tool command and/or control operations associated to a tool path are modeled as a sequence of hidden states where positional data and dynamic tool attributes, such as velocity and acceleration (collectively referred to as motion variables "V"), are modeled as observed states. To model the operation of an additive manufacturing system one or more machine learning methods may be utilized including HMM models and/or Neural Networks models to predict the tool path for a given additive manufacturing fabrication process.

Referring to FIG. 5E, a single HMM model 576 illustrates observation states representing X,Y,Z, and one or more a vectors M containing tool attributes such as motion velocity or acceleration. Tool attributes may also contain other data such as command and control code as provided by the OEM system including machine control code derived from the OEM slicer software. Similarly, one or more hidden states representing the unknown tool command and control operations (for example sequence of machine control commands or "G-code commands") is illustrated. The state sequence of tool commands and control operations implement a given tool path of the additive manufacturing system. The HMM model is a sequence of hidden and observed states that follow in chronological order that progress forward in time from an initial state space. Consequently, the HMM model topology that is most closely represents such a chronological sequence of states is represented by a Linear HMM structure 576 as illustrated at the top right of the figure. In some cases, the sequence or progression of states may move forward or skip by some number of states. These situations may be modeled by the two variants of the linear model, called the Bakis HMM 577 or Left-to-Right HMM model 578.

In some cases, a linear model may repeat one or more times to best represent the process being modeled. For example, in an additive manufacturing fabrication process, a sequence of tool operations may repeat over and over, as is the case where a given layer has the same trajectory but must be repeated for each Z-axis layer increment. This type of model may be referred to as a cyclic linear HMM 579. It should be appreciated that each of the Bakis and Left-to-Right may include such cyclic transitions (last state back to first state), in which case we have a cyclic Bakis or cyclic Left-to-Right HMM model as is shown in FIG. 5F.

Figure 5H:
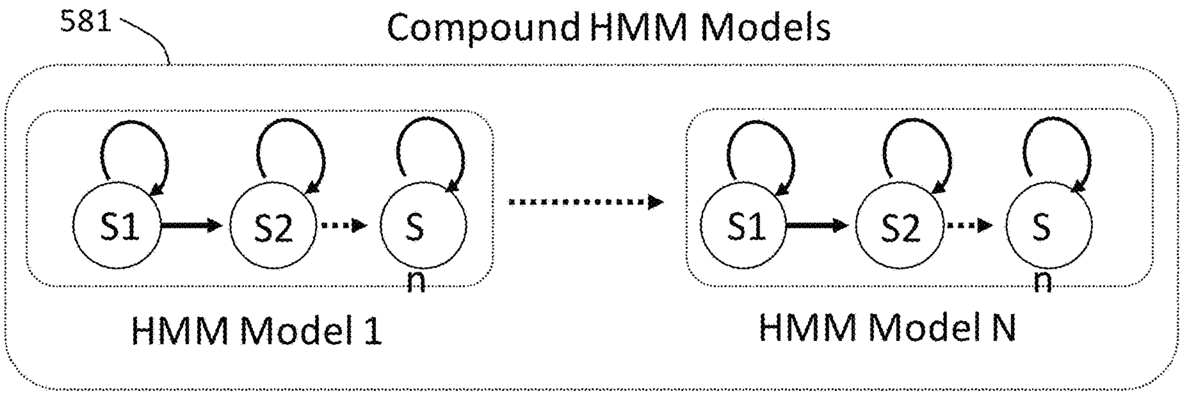
FIG. 5H, FIG. 5I, FIG. 5J are schematic diagrams of additional compound HMM models.
Figure 5I:
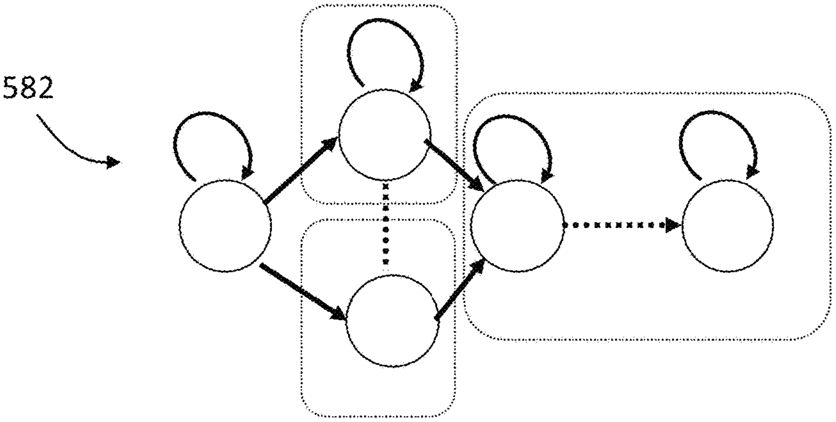
Figure 5J:
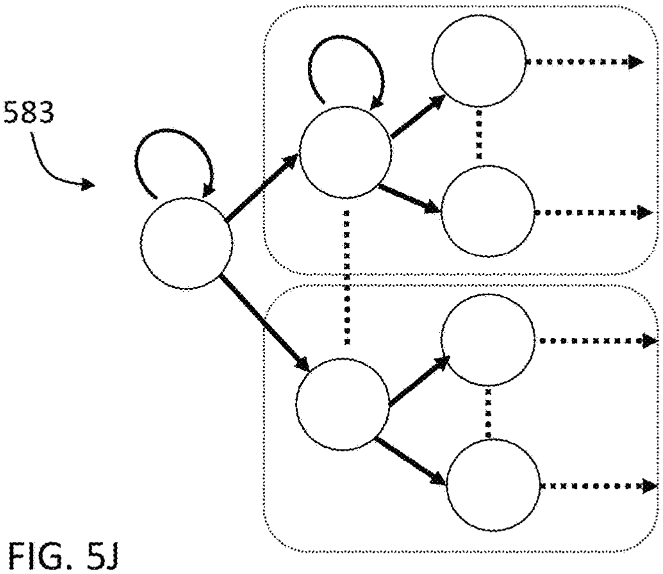

In some embodiments, one or more HMM models may be organized into compound structures 580, where the compound HMM enables the implementation of more complex HMM models based on aggregation or creation of multiple simpler or partial HMM models as shown in FIG. 5G. FIG. 5H, FIG. 5I, FIG. 5J further illustrate the compound HMM model structure 581, 582, 583 in various example forms. For example, FIG. 5H illustrates a compound HMM 581 created from a series of partial HMM Models (1 . . . N) by concatenation. As further illustrated in FIG. 5I and FIG. 5J, a compound HMM topology 582, 583 may vary in structure and plurality of permutations. Hence, with no loss of generality, it should be appreciated that numerous compound HMM topology implementations are possible.

Figure 5K:
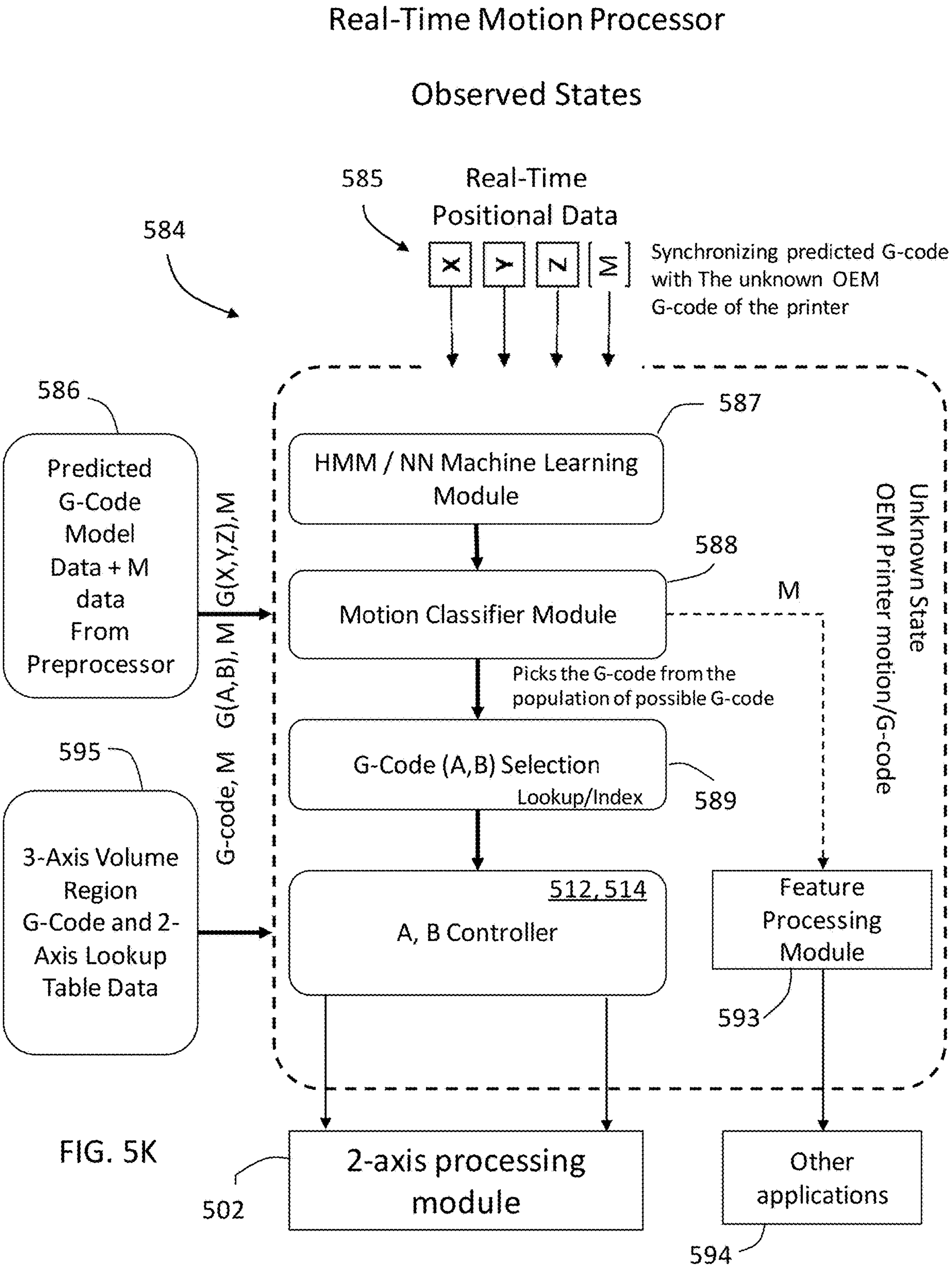
FIG. 5K real-time motion processor of FIG. 5A and FIG. 5B that uses the HMM of FIG. 5E-FIG. 5J to predict the A and B axis control operations, or alternatively provide 3+2 method of operation with supplied data in accordance with an embodiment.

Referring now to FIG. 5K, an embodiment is shown of a real-time motion processor 584 that uses an HMM engine (such as those shown in FIG. 5D-FIG. 5I) for use with the control system 500 to predict the next state of the sequence of tool operations. In some embodiments, the motion processors of blocks 526, 566 or any other motion processor described herein may be implemented using the motion processor 584. The motion processor 584 may include real-time observed states 585, such as coordinates X, Y, Z and optionally motion vectors V (e.g. velocity and/or acceleration) and meta data M. The observed states 585 may be received from the additive manufacturing OEM printer controller 422, such as in FIG. 5A for example, or by sensors 524 that are independent of the additive manufacturing OEM printer controller 422.

The motion processor 584 may further include predicted machine control code 586. The motion processor may include or have access to additional data, such as but not limited to previously calibrated X, Y, Z coordinates and spatial data for the additive manufacturing geometries associated to the hardware chassis, tooling and/or build platform and a lookup table for angles A, B associated with the X, Y, Z coordinates, or a combination of the foregoing for example. The predicted machine control code 586 may be received from a preprocessor, such as preprocessor of blocks 528, 554 for example. The motion processor receives the real-time observed states 585 and predicted machine control code 586 in a learning module of block 587. Using the HMM models described herein, or other machine learning models, such as neural networks for example, the learning module generates a probability matrix of next state machine operations of possible N-2 axis machine control codes based on the observed states 585.

The probability matrix is transferred to a machine control code motion classifier module 588. The classifier module 588 selects a next-state machine control code from the possible machine control codes in the probability matrix. This selection may be based on criteria, such as by selecting the machine control code with the highest predicted probability for example. In some embodiments, such as where there are two machine control codes with equal probabilities, additional criteria may be used. For example, in some embodiments a machine learning engine may be used to select between several equal probabilities.

In an embodiment, additional information provided by the meta data M and/or motion vector data V, including OEM data, may be processed by the motion classifier module 588 where additional machine learning methods executed by the motion classifier can be combined in the form of boosting methods (boosting is a technique for combining multiple machine learning algorithms together in order to improve inference accuracy or performance) to choose the most optimal next-state machine control code from both the set of possible next-state machine control codes as well as other real-time operating telemetry.

In an embodiment, performance or execution time of the machine learning processes may be further optimized (in execution time or required hardware and associated costs) wherein for any given additive manufactured fabrication process, one or more tool path patterns exist that are repetitive or have other similarities, resulting in the recurring machine learning execution patterns that may be reused, thereby presenting an opportunity to optimize execution time by reusing previously computed results. As example, a compound linear HMM model 580 as illustrated in FIG. 5G may model a repeating tool path for a given layer that is the same for many Z layer instances. Processing and memory may be optimized by the motion processor adaptively refactoring the HMM model from a compound model comprising multiple linear models in consecutive sequence, to one representing a single cyclic linear HMM 579 whereby the states are reused in terms of single HMM transition matrix and simply have a counter index to a single cyclic linear HMM model that is associated to each Z layer increment. It should be appreciated that the real-time motion processor can implement numerous machine learning optimizations by making use of multiple machine learning methods and multi-feature pattern analysis processes for any combination of positional analysis, tool position, motion prediction, error reduction, accuracy improvement, and performance optimization.

The selected machine control code is then transferred to the angle selection module 589. As used herein, the term "angle" with respect to angles A, B may include tilt/pitch, yaw, roll, or rotation angles. In an embodiment, the selection module receives the A, B angles as a lookup table that includes predicted machine control code and associated angles, A, B. In an embodiment, the selected machine control code is indexed against the predicted machine control code to identify the desired angles A, B. These angles A, B are transferred to the A-axis controller and B-axis controller, such as controllers 512, 514 for example.

In an embodiment, the controllers 512, 514 may further receive 3-axis volume region machine control code and 2-axis table data from block 595, such as when the additive manufacturing system is being operated in a 3+2 method of operation and the position/orientations of the build platform may be determined deterministically. In some embodiments, the data from block 595 is all that is used to operate the build platform. In some embodiments, the deterministic determination of the position/orientation of the build platform avoids the use of machine learning processes to predict the desired angles A, B.

The meta data M from the motion classifier module 588 may be transferred to a feature processing module M 593 that determines a next state function (where a function is a programmatic set of command and/or control machine codes representing the processed system state variables as M metadata, that can be transferred to internal or external modules, applications or systems) that transmits a signal to other applications 594 either internal or external to the additive manufacturing system. For example, the meta data may include information, such as a temperature for example, that is transferred to another application 594 that activates a heater or cooling system based on the observed states. In other embodiments, the meta data may include non-physical parameter data such as inspection information or instructions that are transmitted to a scanning measurement application for example.

In another embodiment, commands and/or machine codes are generated by the real-time motion processor (e.g. feature processing module) 526 and transmitted via interface 504 (e.g. such as via port 506) to other systems or components. These systems or components may include, but are not limited to one or more of tools, build platforms, and/or multi-dimensional build platforms within the additive manufacturing system, or to one or more other additive manufacturing systems containing tools, build platforms, and/or multi-dimensional build platforms over a network. In an embodiment, real-time motion processor 526 and interface 504 act as the master of tool and motion path operation, that can be transmitted in a fully distributed and coordinated fashion in the implementation of a network (internal to the additive manufacturing system, a local area network, a wide area network, a geographically distributed network, or cloud based computing networks) of additive manufacturing systems that act as a slave to the real-time motion processor 526 and interface 504 when configured to operate in master mode.

Figure 12:
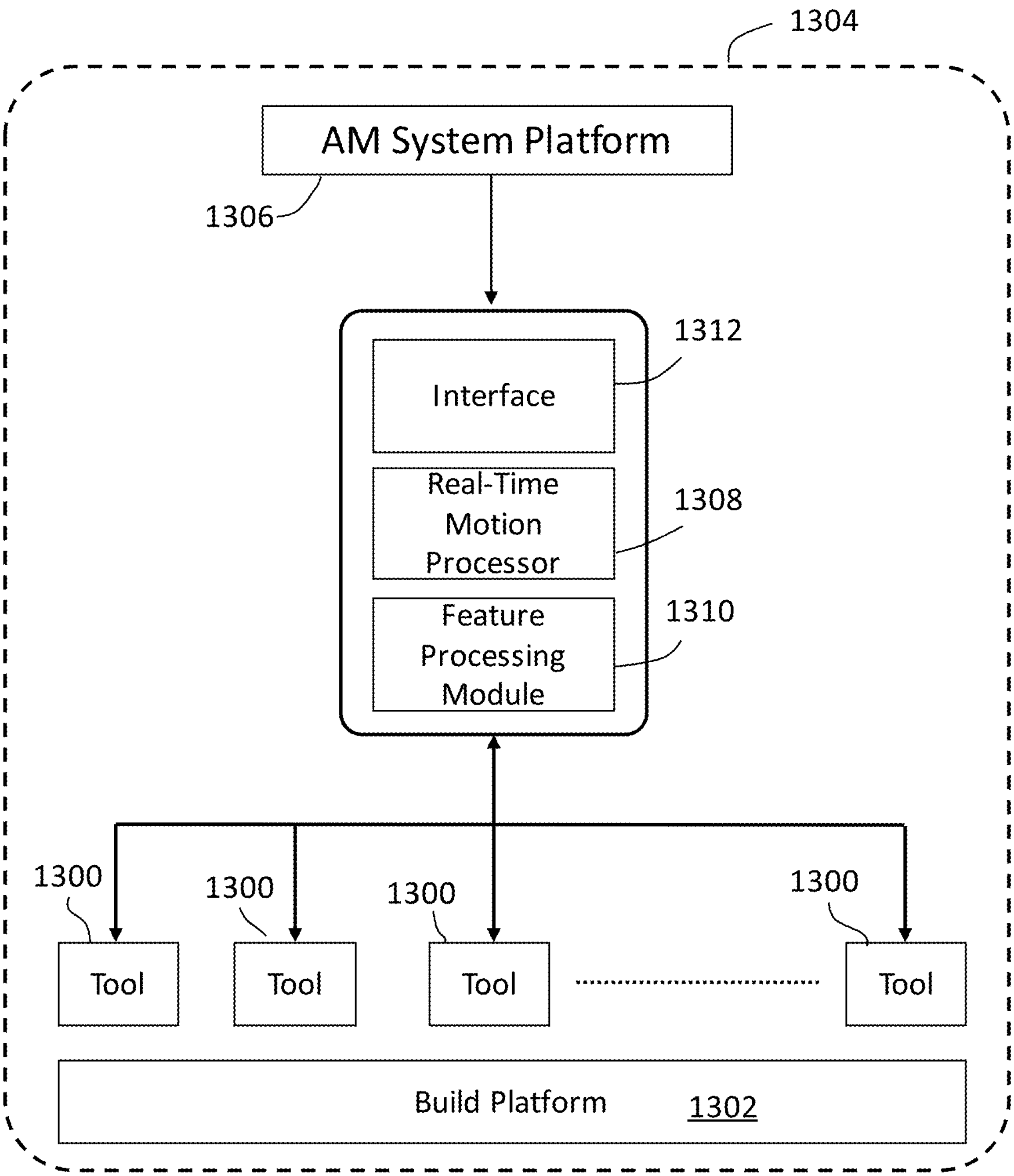
FIG. 12 is a block diagram of a real-time motion processor and related components controlling one or more tools within an additive manufacturing system.
Figure 13:
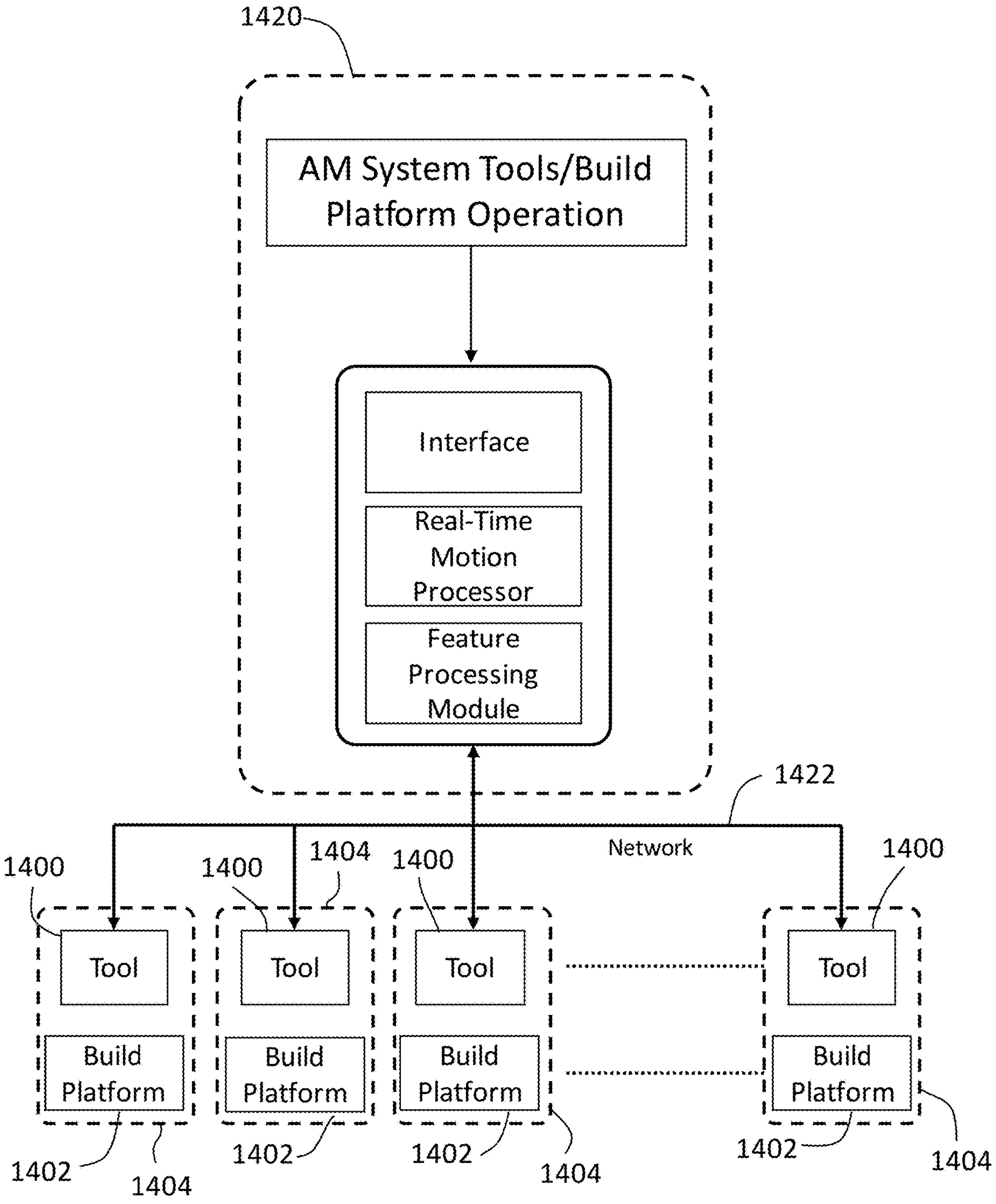
FIG. 13 is a block diagram of a real-time motion processor and related components controlling over a network one or more tools and/or build platforms.

In this configuration, a highly scalable, cost efficient, additive manufacturing system cluster or cloud can be formed. In one embodiment, the additive manufacturing system may contain multiple independent extruders or tools operating across one more build platform configurations. In another embodiment, the configurations described can be implemented independently from the OEM additive manufacturing system. The various embodiments described herein are illustrated in FIG. 12 and FIG. 13. where embodiments described herein are utilized in the implementation of one or more independent tools 1300 and/or build platforms 1302 and/or multi-dimensional build platforms. In the case of FIG. 13 the configuration of tools 1300 and/or build platforms 1302 and/or multi-dimensional build platforms are within a single additive manufacturing system 1304. The system 1304 includes an OEM system control 1306 that communicates with the real-time motion processor 1308 and a feature-processing module 1310 via an interface 1312.

In contrast, in the configuration of FIG. 13, each of the tools 1400 and/or build platforms 1402 and/or multi-dimensional build platforms exist in one or more independent additive manufacturing systems 1404 each controlled by a single system 1420 utilizing a network 1422 to communicate with each additive manufacturing system 1404. It should be appreciated that the network 1422 may be implemented using any known data communications system, such as but not limited to wired networks, wireless networks, local area networks, wide area networks, cellular networks, and satellite networks for example. As an embodiment, it should be appreciated that combinations of configurations depicted in FIG. 12 and FIG. 13 are possible.

Figure 5L:
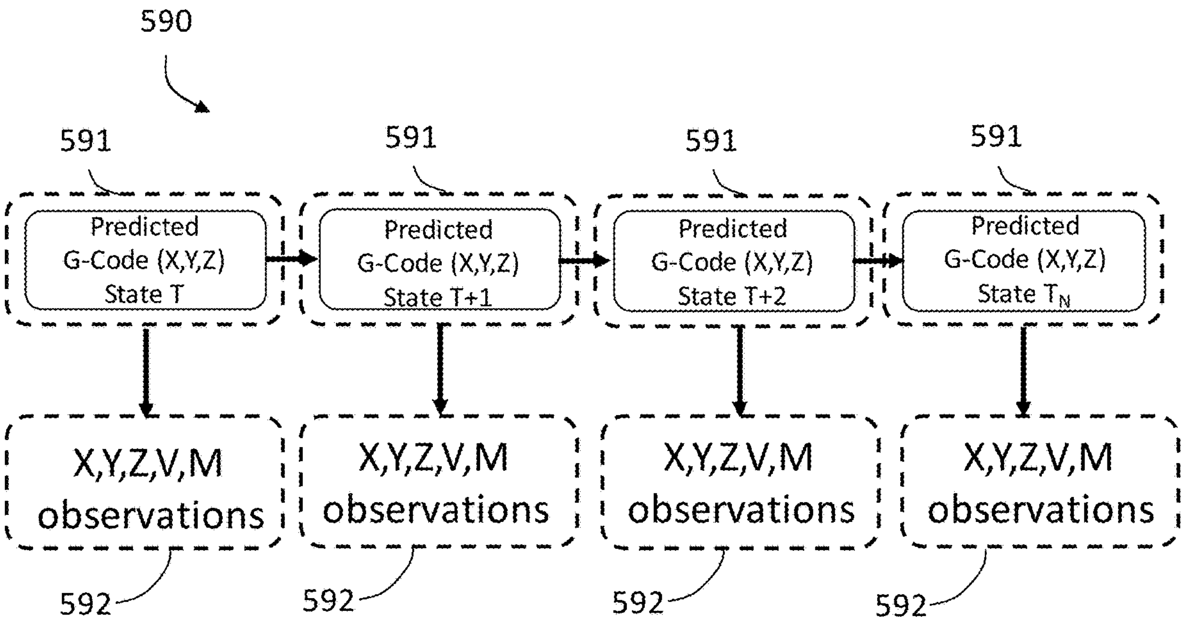
FIG. 5L is a flow diagram of the operation of the real-time motion processor of FIG. 5K when the additive manufacturing system of FIG. 5A is operating in accordance with an embodiment.

It should be appreciated that the operation of the motion processor 584 may be repeated continuously during the operation of the additive manufacturing system and the fabrication of the desired object. For example, as shown in FIG. 5L, the motion processor operation 590 may be represented as a series of predicted machine control code states of block 591, state T to state $T_N$, as a series of sequential steps of receiving observations X, Y, Z (and optionally M) 592 and predicting a machine control code for a next state tool operation.

Figure 6A:
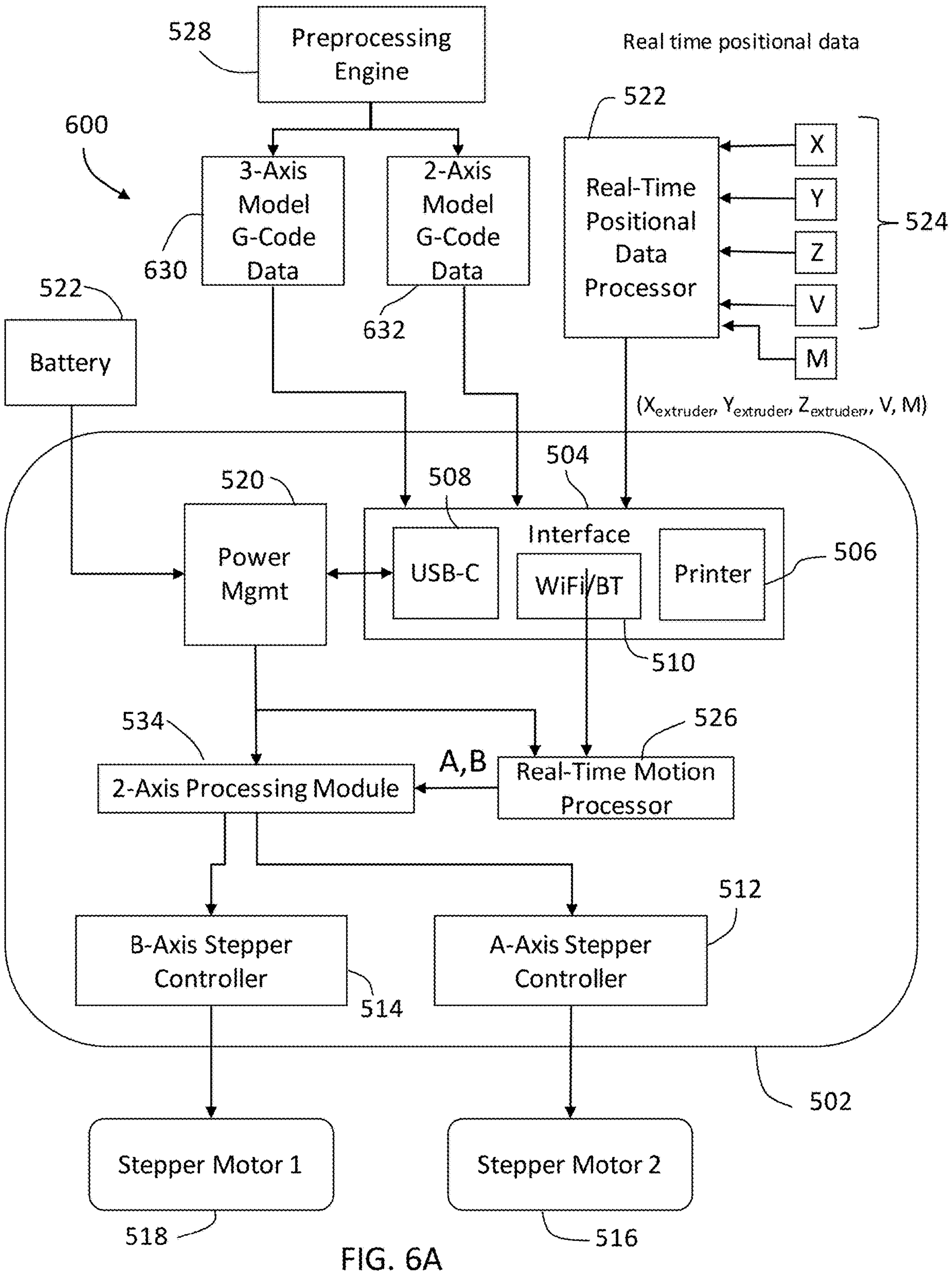
FIG. 6A is a block diagram of a portion of an additive manufacturing system that received real-time positional data from a real-time positional data processor utilizing a real-time motion processor for predicting a 2-axis machine control code based at least in part on the position data and a predicted machine control code in accordance with an embodiment.
Figure 6B:
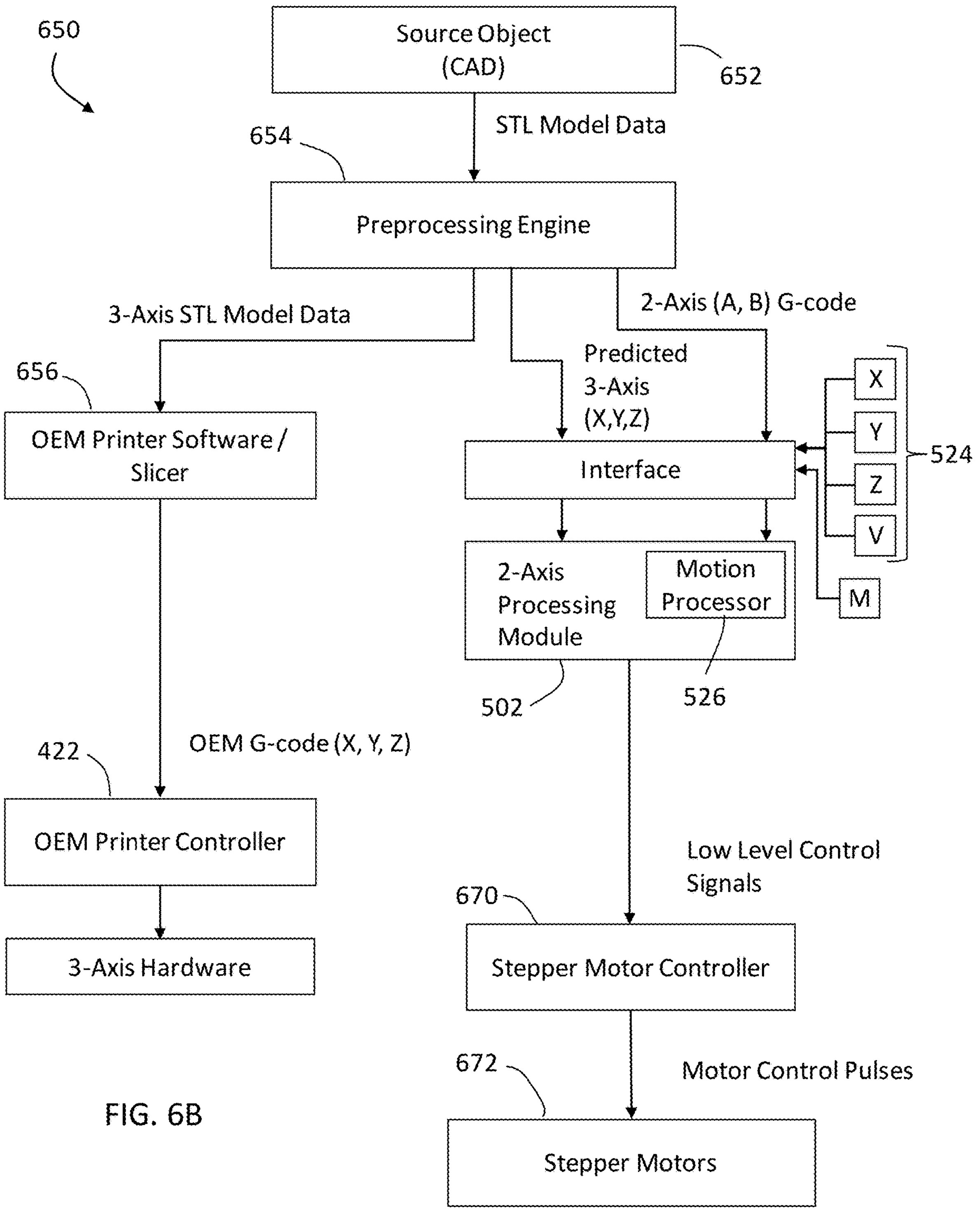
FIG. 6B is a data flow diagram for the additive manufacturing system of FIG. 6A.
Figure 6C:
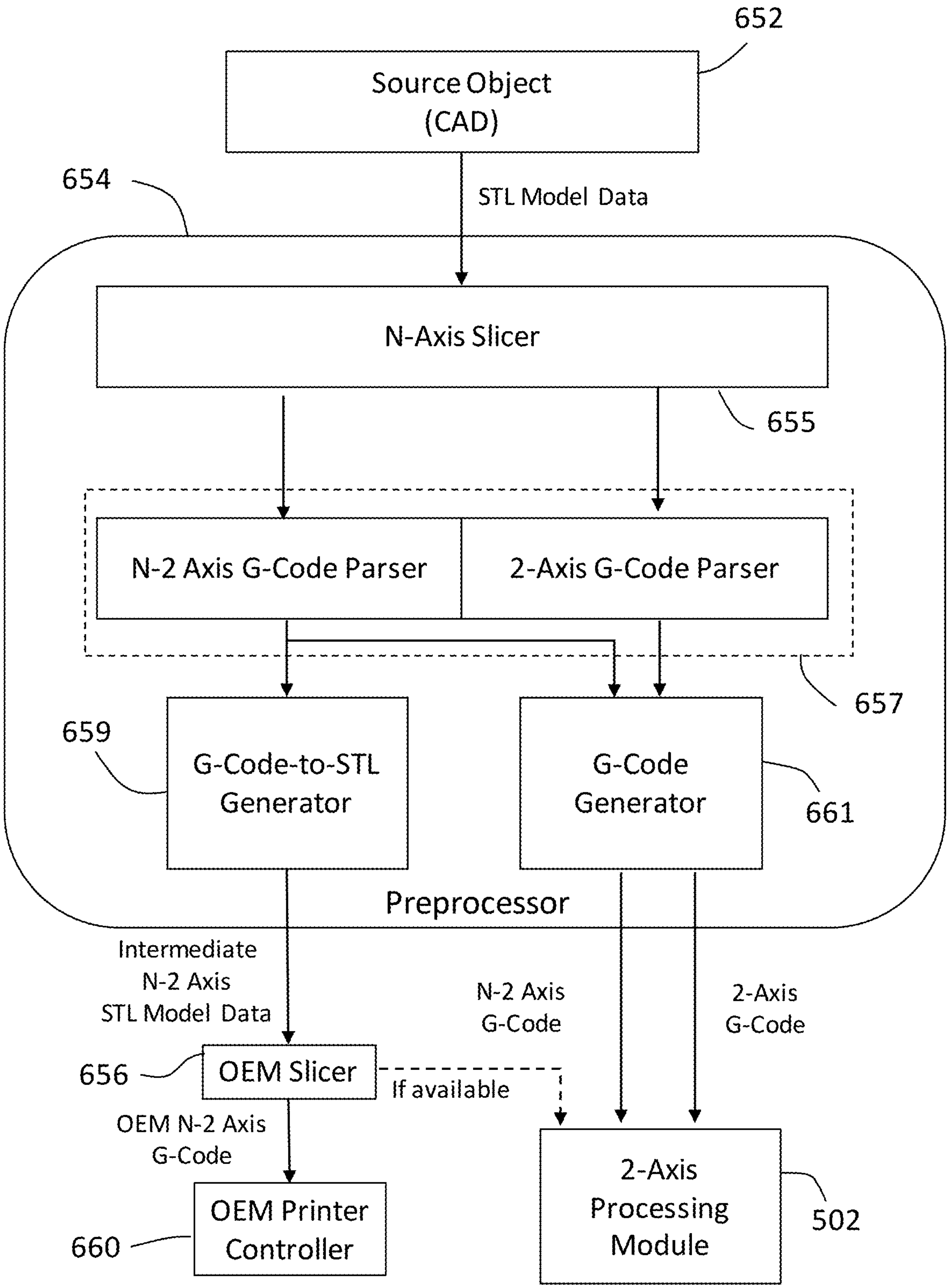
FIG. 6C is a block diagram showing the processing of the CAD data for the source object according to an embodiment.

Referring now to FIG. 6A-FIG. 6C, an embodiment is shown of a control system 600. The control system 600 is similar to control system 500 with the observational data being supplied by signals from sensors 524 in real-time by the real-time positional data processor 522. In this embodiment additive manufacturing system machine control code is unknown, such as because it is in a "closed" or proprietary format. It should be appreciated that in this embodiment, the preprocessor 528 is configured to generate a predicted machine control code based on a CAD model using an N-axis slicer application. The slicer generates an N-axis machine control code that is subsequently parsed into N-2 axis model machine control code 630 and a 2-axis model machine control code 632.

The N-2 axis and 2-axis machine control code 630, 632 then passes via interface 504 and received by the real-time motion processor 526. In an embodiment, the real-time motion processor 526 then determines the optimal machine control codes for angles A, B and the operation proceeds in the same manner as FIG. 5A and FIG. 5C.

Referring now to FIG. 6B and FIG. 6C, an embodiment of the data flow 650 is shown for control system 600. In this embodiment, the data flow 650 begins in block 652 where a source object or electronic file such as a CAD file is generated. The source object is exported in an industry standard format, such as an STL file (i.e. standard triangle language or standard tessellation language) for example, and transmitted to a preprocessing engine in block 654.

As shown in FIG. 6C, in an embodiment the preprocessor engine of block 654 receives the STL model data of block 652 and processes it using an N-Axis slicer (e.g. a 5-axis slicer) in block 655. The N-axis slicer software generates an N-axis machine control code. It should be appreciated that N-axis machine control code includes commands for both the N-2 axis (e.g. three translation axis) and the 2-axis (e.g. rotation axis A, B). This N-axis machine control code is transferred to a parser software 657 that separates the N-2 commands from the 2-axis commands. This results in the generation a first machine control code that having the N-2 axis machine control code and a 2-Axis model machine control code. The final format comprising syntax and structure of the machine control code is performed by the machine control code generator module of block 561.

The N-2 axis machine control code is further processed using a machine control code (G-Code) to STL generator software in block 659 whose function is to generate a new intermediate 3D CAD model in STL format. This intermediate 3D CAD model is used to generate an OEM specific set of N-2 axis machine codes by the OEM slicer software In an embodiment, it is desired to provide the N-2 axis machine control code as a function of the original N axis sliced model, not the N-2 axis context as would be the case if the source CAD model file were to be processed by the OEM slicer alone. The desired result of the target object is achieved through the principle of superposition. Namely, the N-2 axis and 2-axis machine code operations, when combined together through the superposition of the operations of all the tool axis movements will compose at fabrication time the target object. In other words, the fabrication of the target object is realized by all N-axis operations cooperating together.

This N-2 axis intermediate CAD/STL model data is processed by the OEM slicer software (e.g. an N-2 slicer) in block 656 to generate an OEM N-2 axis machine control code (G-code) in the OEM additive manufacturing system native format. The OEM N-2 axis machine control code is then transferred to both the OEM printer controller in block 660 and optionally to the 2-axis processing module if the OEM N-2 axis machine control code is available in an open standard source format. This last step is optional, and OEM dependent, whereas the OEM N-2 axis machine code, if in source format, can be utilized by the 2-axis processing module motion processer 526 as part of the M feature vector, utilized as additional metadata describing the current fabrication process OEM tool path operations resulting in improved predictions and consequently, tool operation accuracy.

The parser 657 also generates 2-axis model machine control code in block 661 that represents the angular position commands for axis A, B. The 2-axis model machine code and the N-2 model machine control code are also transmitted to the 2-axis processing module 502. The resulting predicted 2-axis rotation values are then transferred to the stepper motor controller in block 670 and the stepper motors are operated in block 672.

It should be appreciated that the N-2 axis intermediate STL model data represents an electronic model of the source object that once processed by the N-2 slicer software in block 656 will produce an N-2 axis model machine control code. This N-2 axis model machine control code is used by the motion processor 526 during operation to predict the model 2-axis machine control code to allow the fabrication of the source object in N axis.

It should be further appreciated that the embodiment of FIG. 6A-6C predicts the 2-axis rotation values based on a N-2 model machine control code rather than N-2 OEM machine control code (block 587 of FIG. 5K). The N-2 model machine control code approximates the N-2 OEM machine control code since the OEM N-2 machine control code may be proprietary and not available. Thus, the embodiment of FIG. 6A-6C allows for the incorporation of the N-axis build platform, such a build platform 300 into additive manufacturing systems with proprietary coding systems. As a result, the target object may be fabricated using N axes even though the original (e.g. unmodified) additive manufacturing system is configured to operate (and fabricate objects) using N-2 axes. This is accomplished using the principle of superposition described herein.

Referring now to FIG. 7A-7F another embodiment of a control system 700 is shown. The control system 700 is similar to control system 500 and control system 600 with the observational data being supplied by sensors 724 in real-time to the real-time positional data processor 722. In an embodiment, the sensors 724 may only provide the Z-axis measurements and optionally the movement measurements V (e.g. velocity and/or acceleration) and optionally metadata M. In different embodiments, the Z-axis measurement may be performed by the system controller (e.g. an OEM system controller) or by an independent Z-axis distance sensor that provides a signal directly or indirectly to the real-time positional data processor 722. It should be appreciated that in this embodiment, the preprocessor 528 is configured to generate a machine control code based on a CAD model using a 3-axis slicer application. As discussed in more detail herein, the slicer generates a 3-axis machine control code 730 for a plurality of volume regions. The preprocessor 528 further is configured to generate a 2-axis table 732 (based at least in part on the 3-axis machine control code 730) that defines an angular position for rotational build platform portion for each of the plurality of volume regions. In an embodiment, the Z-axis sensor measurement and the 2-axis table allow the 2-axis processing module 502 to deterministically control the position of the rotational build platform portion in a desired orientation during operation such that the build layer of the target object is positioned substantially orthogonal (or within accepted overhang angles) to the Z-direction so allow typical 3-axis (X, Y, Z) movement and operation by the system tool (e.g. extruder).

The 3-axis machine control code 630 and 2-axis table 732 then pass via interface 504 and received by the real-time motion processor 526. In an embodiment, the real-time motion processor 526 then determines the machine control codes for angles A, B based at least in part on the real time position data from sensors 724 and the 2-axis table 732. In an embodiment, only the Z-axis sensor measurement is used with the 2-axis table 732 to determine the angles A, B.

It should be appreciated that in some embodiments, where only 3+2 motion control is provided, the 2-axis processing module 502 may be simplified to directly transmit the machine control code 730 and 2-axis table 732 to the 2-axis processor 534 (similar to FIG. 4A). Further, the simplified processing module 502 may also be used with the continuous five-axis operation when there is a direct integration of operation with the additive manufacturing system controller.

Figure 7A:
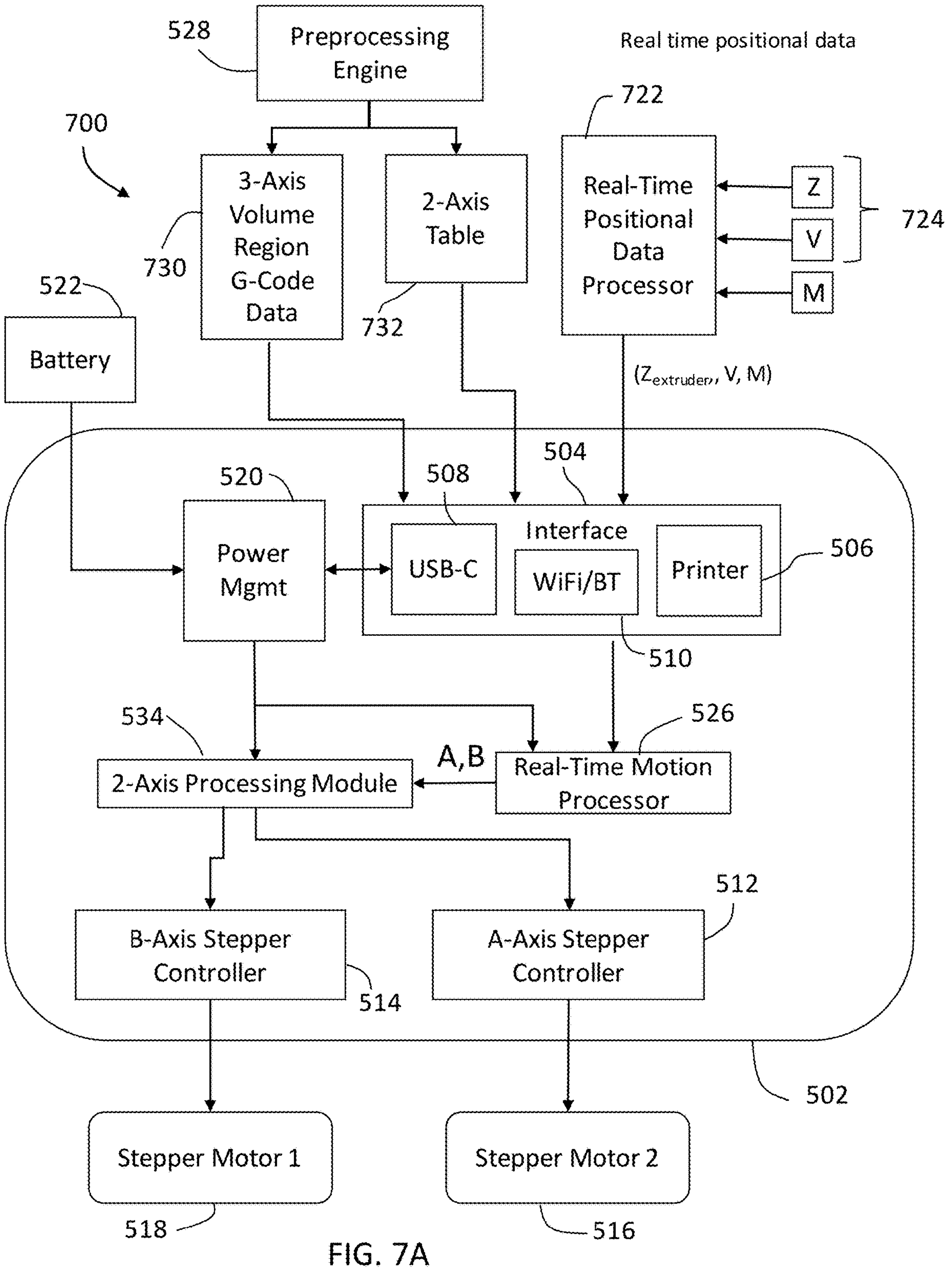
FIG. 7A is a block diagram of a portion of an additive manufacturing system that received real-time positional data from a real-time positional data processor utilizing a real-time motion processor for determining an orientation of a rotational build platform based at least in part on a single position data using a 3+2 method operation in accordance with an embodiment.
Figure 7B:
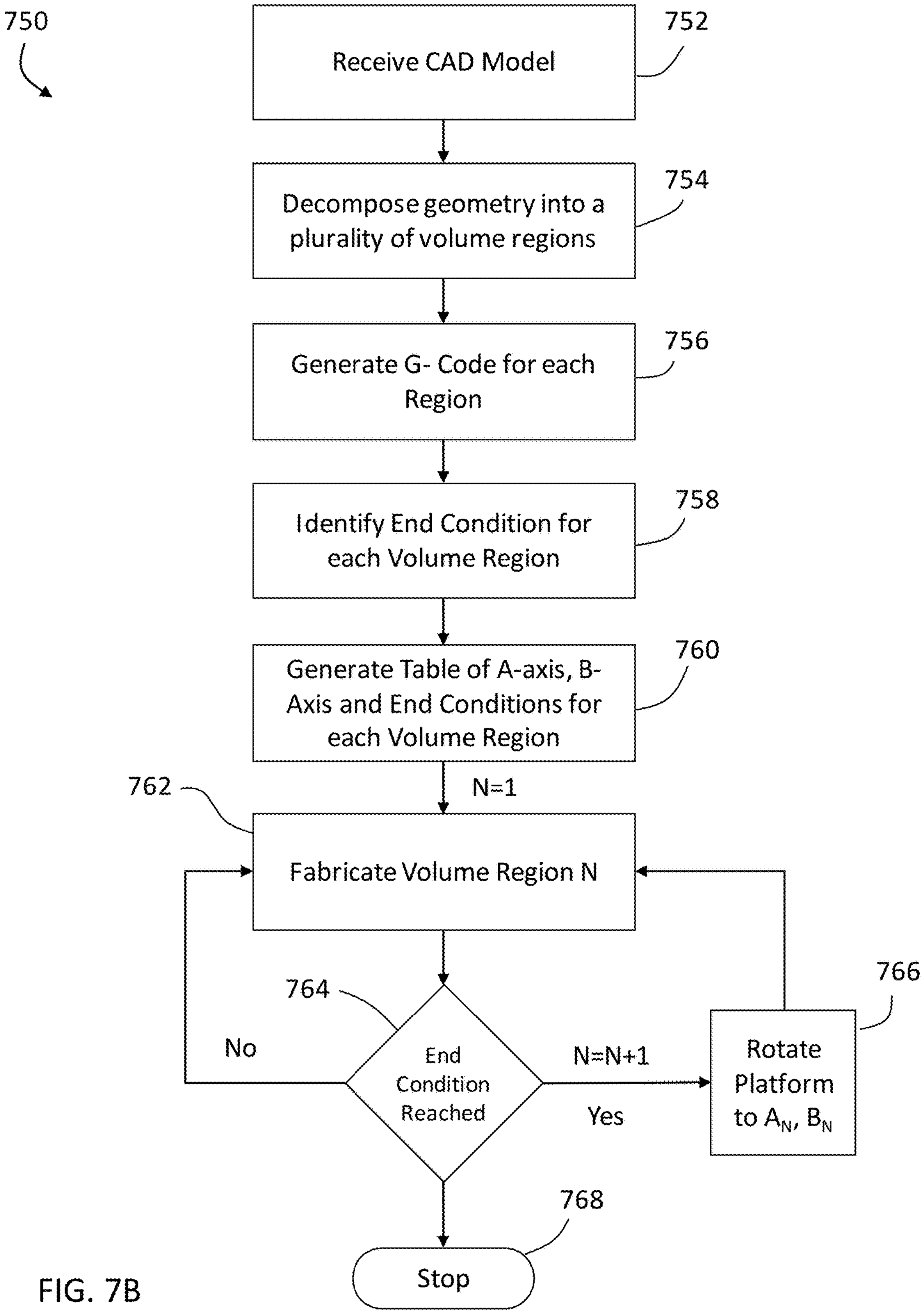
FIG. 7B is a flow diagram of a method of operating the system of FIG. 7A using a 3+2 method of operation in accordance with an embodiment.
Figure 7C:
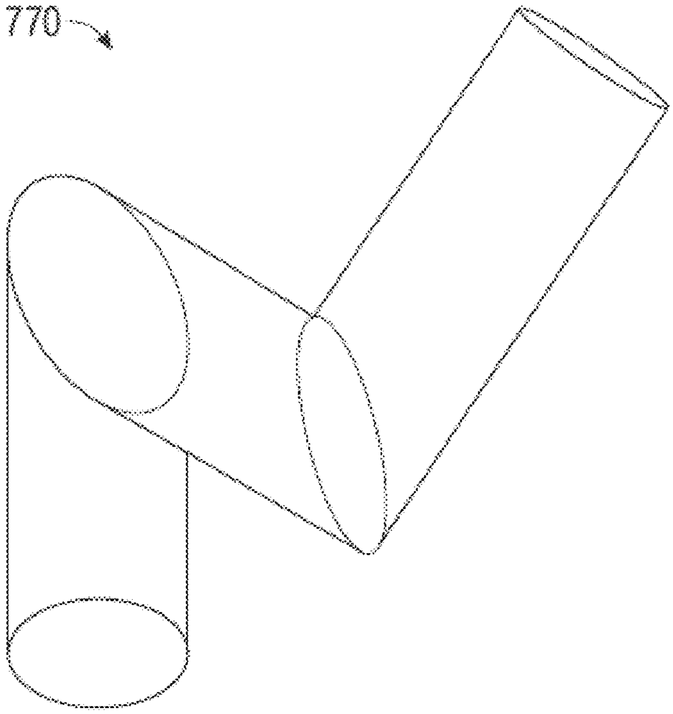
FIG. 7C is a prior art electronic model of an example target object.
Figure 7D:
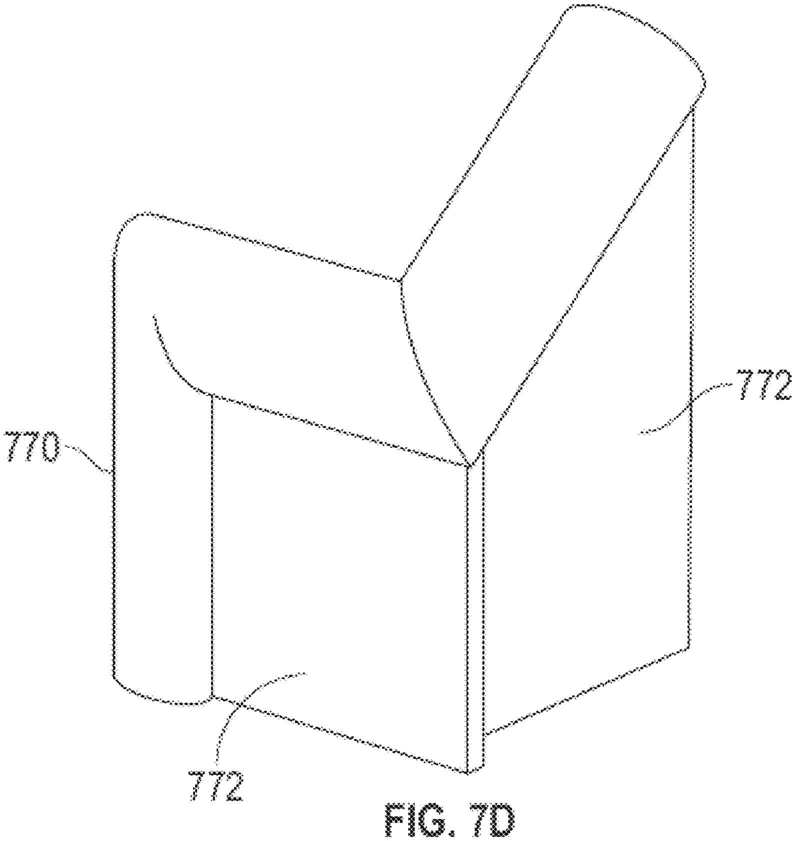
FIG. 7D is an illustration of the target object of FIG. 7C fabricated using a prior art three-axis additive manufacturing system.

Referring now to FIG. 7B a method 750 is shown for fabricating objects with the control system 700 that reduces or eliminates the use of support material during the fabrication of the target object. In an embodiment, the method 750 decomposes the target object being fabricated using a method described in the Journal of Additive Manufacturing 36 (2020) 101569 entitled "Process Planning for Five-axis Support Free Additive Manufacturing" by Xinyi Xiao and Sanjay Joshi, the contents of which are incorporated herein by reference.

The method 750 begins in block 752 where a CAD model, such as CAD model or target object 770 (FIG. 7C) is received. It should be appreciated that in a traditional 3-axis additive manufacturing process, the fabrication of target object 770 would involve a large amount of support structure material 772 (FIG. 7D) to support the overhanging portions of the target object 770.

Figure 7E:
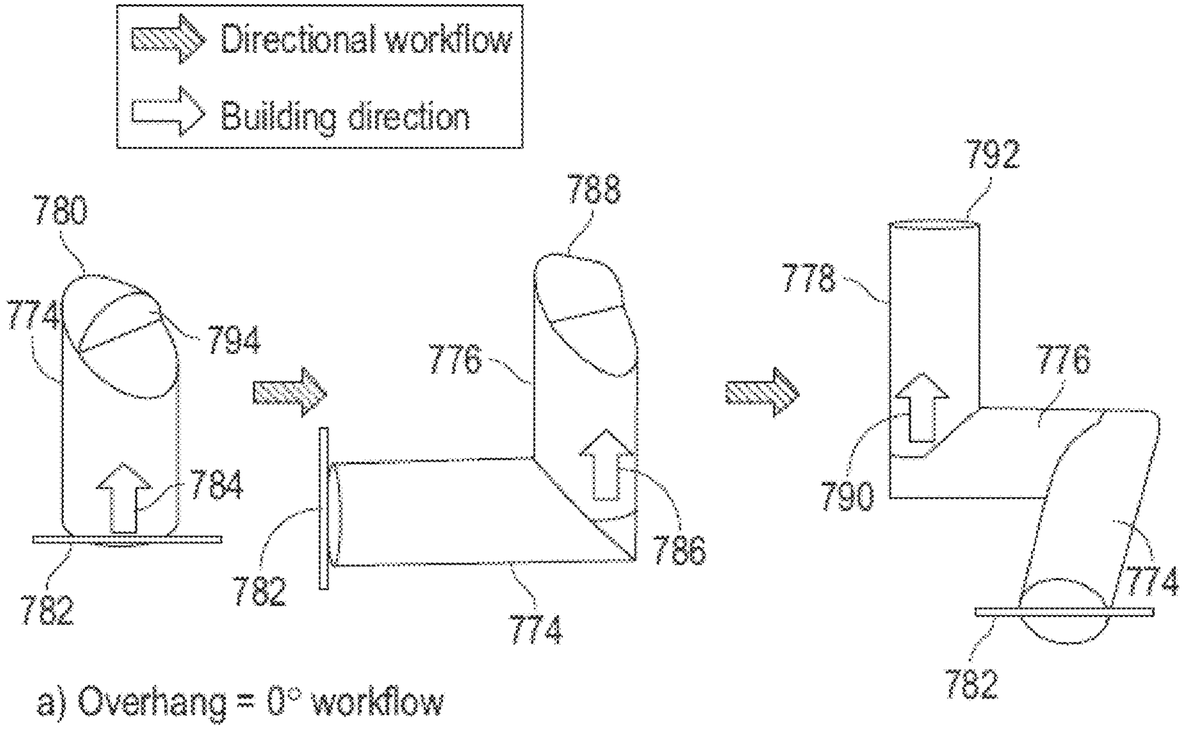
FIG. 7E is a schematic illustration of a method of fabricating the target object of FIG. 7C with the system of FIG. 7A and the method of FIG. 7C in accordance with an embodiment.

The method 750 then proceeds to block 754 where the geometry of the target object 770 is decomposed into a plurality of volume regions where each volume region may be fabricated in a 3-axis manner. In other words, the individual volume region may be fabricated along 3-axis while the B-axis angular position of the rotational build platform is maintained in a fixed position. Referring to the example target object 770, this object may be decomposed into three volume regions 774, 776, 778 (FIG. 7E). The method 750 then proceeds to block 756 where the volume regions are sliced and machine control code is generated for each of the individual volume regions 774, 776, 778 as if the volume region was being fabricated on a traditional 3-axis additive manufacturing system. It should be appreciated that in some embodiments, the individual volume regions are slices separately and then combined to define a single machine control code for fabricating the target object. In other embodiment, the build volumes are sliced as a single object with the interface or partitions computed to generate the machine control code and the desired A, B angles to maintain the desired orthogonality. The method 750 then proceeds to block 758 where an end condition is determined for each of the volume regions 774, 776, 778. An end condition, as used herein, is a point in the fabrication process where the fabrication of the volume region is completed. For example, the point 780 on volume region 774. It should be appreciated that in some embodiments, based on the Z-axis value of the extruder tool, the control system 700 will be able to determine that the fabrication of the volume region 774 is completed and the fabrication of the second volume region 776 is about to be initiated.

The method 750 then proceeds to block 760 where a table (e.g. table 732) is generated of A-axis and B-axis values an end conditions for each volume region. The method 750 then proceeds to block 762 where fabrication begins for the first volume region 774 (e.g. N=1). In FIG. 7C-7F, an example is provided of an object proposed in the paper entitled "Process Planning for Five-Axis Support Free Additive Manufacturing" by Xinyi Xiao and Sanjay Joshi in the Journal of Additive Manufacturing (2020) as an object that would utilize a substantial amount of support material in a traditional 3-axis additive manufacturing system. In the example shown in FIG. 7 the first volume region is fabricated with the rotational build platform 782 oriented at 0 degrees (e.g. flat). The fabrication process proceeds in the direction indicated by the arrow 784. While the first volume region 774 is being fabricated, the method 750 is monitoring for the end condition in query block 764. If an end condition has not been achieved the method 750 loops back to block 762.

When an end condition has been achieved, such as when the Z-axis value associated with point 780 is achieved for example, the method 750 proceeds to block 766 where the rotational build platform 782 is rotated about the A-axis and B-axis based on 2-axis table 732 to the orientation that allows the second volume region 776 to be fabricated along 3-axis. In the example shown in FIG. 7E, the rotational build platform is rotated 90 degrees. The method 750 then continues the fabrication process of the second volume region along the direction indicated by arrow 786 until the next end condition, such as a Z-axis value of point 788 for example. When the next end condition is achieved (e.g. point 788), the control system then rotates the rotational build platform 782 to position the second volume region (or the preceding volume region) to be fabricated. In the embodiment of FIG. 7E, the rotational build platform is rotated an angle (e.g 45 degrees) about the B-axis to position the end of the second volume region 776 to allow fabrication of the third volume region 778 along the direction of arrow 790 until an end condition (e.g. Z-axis value for point 792) is achieved. When the final end condition is achieved, the method 750 proceeds to stop block 768.

It should be appreciated that in the embodiment of FIG. 7E, the additive manufacturing system, the material used, or a combination there of, did not allow for any overhang of the deposited material, sometimes referred to as a 0 degree overhang workflow. As a result, the generation of the machine control code for each of the volume regions created interface surfaces that allowed for fabrication of the next volume region. For example, the first volume region 774 and the second volume region 776 each included a step area 794, 796 that allowed fabrication of the next volume region to begin once the build platform 782 was rotated to the desired orientation.

Figure 7F:
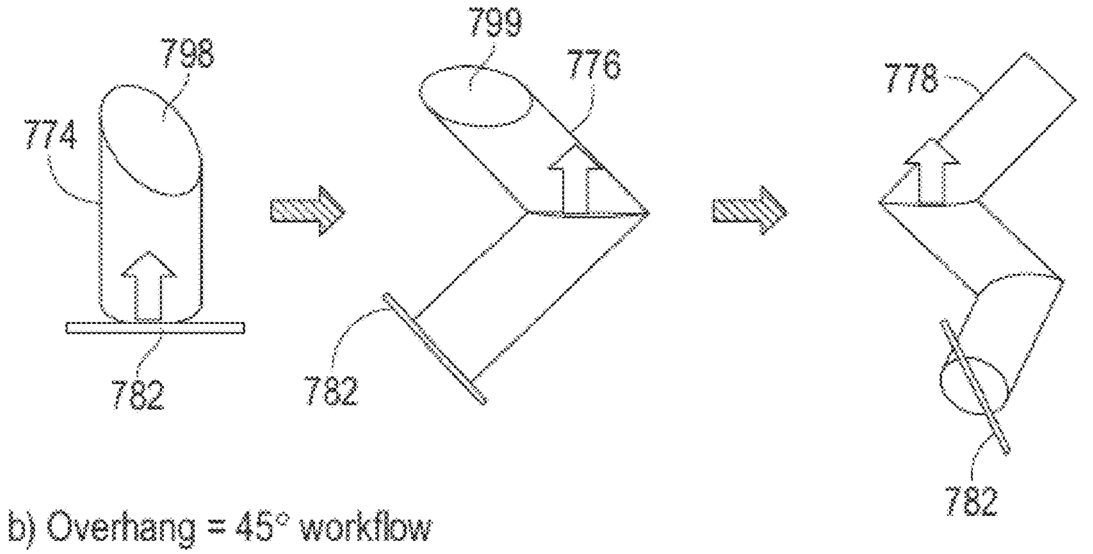
FIG. 7F is a schematic illustration of a method of fabricating the target object of FIG. 7C with the system of FIG. 7A and the method of FIG. 7C in accordance with another embodiment.

In other embodiments, some overhang of material is allowable. In the embodiment of FIG. 7F, a 45 degree overhang is allowed. As a result, the decomposition of the target object into the volume regions provides for a single surface interface 798, 799, at least for the target object 770.

It should be appreciated that the interface geometry between adjoining volume regions may be different depending on several factors, including the geometry of the target object, the additive manufacturing system being used, and the material being deposited.

In some embodiments it may be desirable to add two additional axis (A, B) to an additive manufacturing system that does not provide a data output, such as the X, Y, Z and optionally M values for example. In applications such as this, it may be desirable to add sensors to the additive manufacturing system such as those described in FIG. 9A-FIG. 11B.

Figure 8:
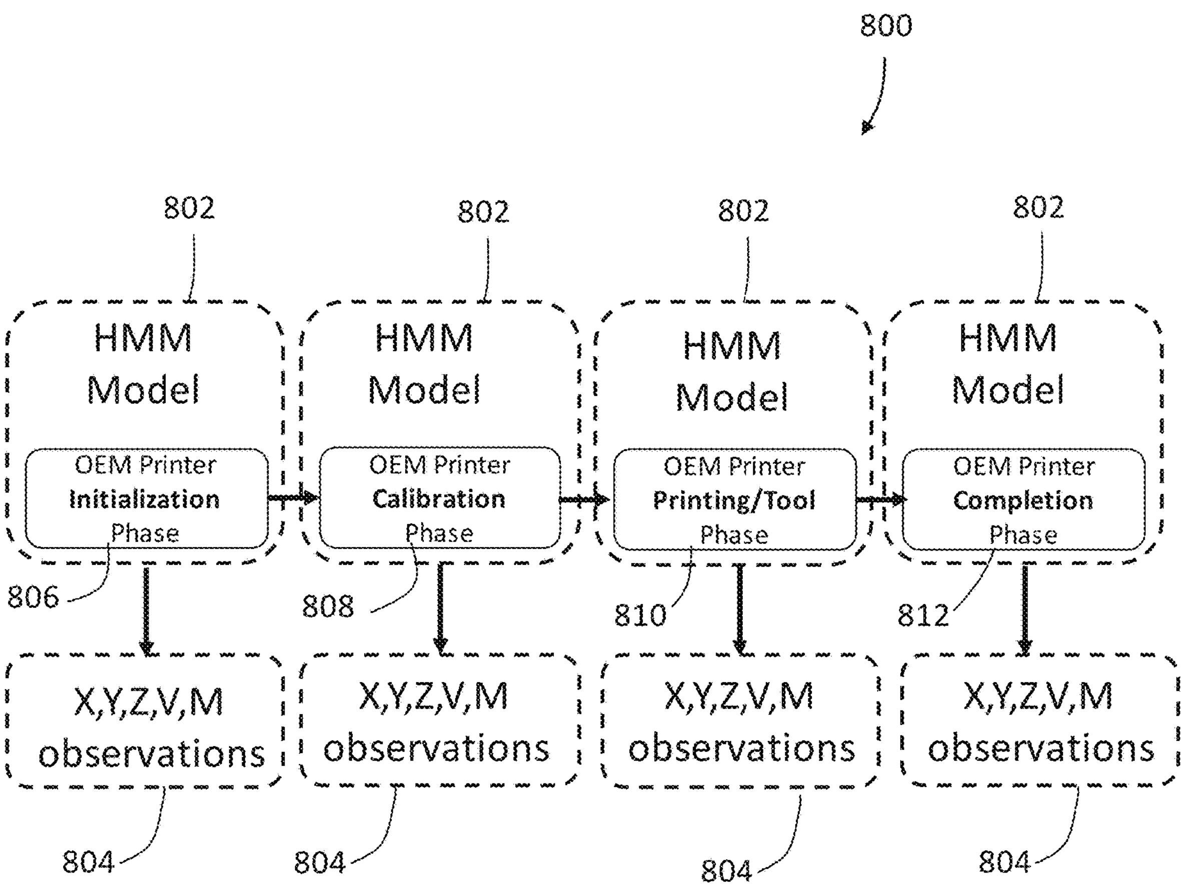
FIG. 8 is a block diagram illustrating a system prediction of a state sequence of an additive manufacturing system using an HMM model in accordance with an embodiment.

Referring now to FIG. 8, an embodiment is shown for operating the N-2 control system, such as control system 800 for example, where the control system 800 is operated asynchronously from the OEM printer controller. It should be appreciated that when the 2-axis build platform (e.g. build platform 300) is operated independently of the additive manufacturing system, the 2-axis processing module does not have direct data from the additive manufacturing system as to the state or operating mode of the additive manufacturing system.

To resolve this, embodiments herein may use a method 800 having an HMM model 802 that may be implemented in one or more of the HMM models described herein, that predicts an unknown operating state of the additive manufacturing system based on observational data 804. In this embodiment, observational data such as observational data from sensors 524 for example, is received via the interface 504 to the 2-axis processing module 502. The real-time motion processor 526 receives the observational data from sensors 524 and uses a machine learning module and data about tool/build-platform position data and movement data to predict a current operating state of the additive manufacturing system. As a result, the 2-axis processing module can predict (based on the observational data) whether the additive manufacturing system in an initialization phase 806, a calibration phase 808, a printing phase 810 (e.g. FIG. 5B, FIG. 5C), or a completion phase 812.

It should be appreciated that this provides technical advantages in allowing the two-axis build platform to operate independently of any action of the operator or additive manufacturing system while also synchronizing the operation of the two-axis build platform with that of the additive manufacturing system.

It should further be appreciated that in a system such as that shown in FIG. 7A and FIG. 7B, the position and orientation of the rotational build platform during fabrication may be made deterministically rather than through the use of an HMM model. In these embodiments, the HMM model may be used for example to determine one or more of the initialization phase 806, calibration phase 808, and completion phase 812. It another embodiment, the deterministic methods described for 3+2 motion can be augmented with the one or more HMM models described to improve upon the manufactured objects geometric accuracy and precision, print quality including surface quality, or combinations thereof.

Figure 9:
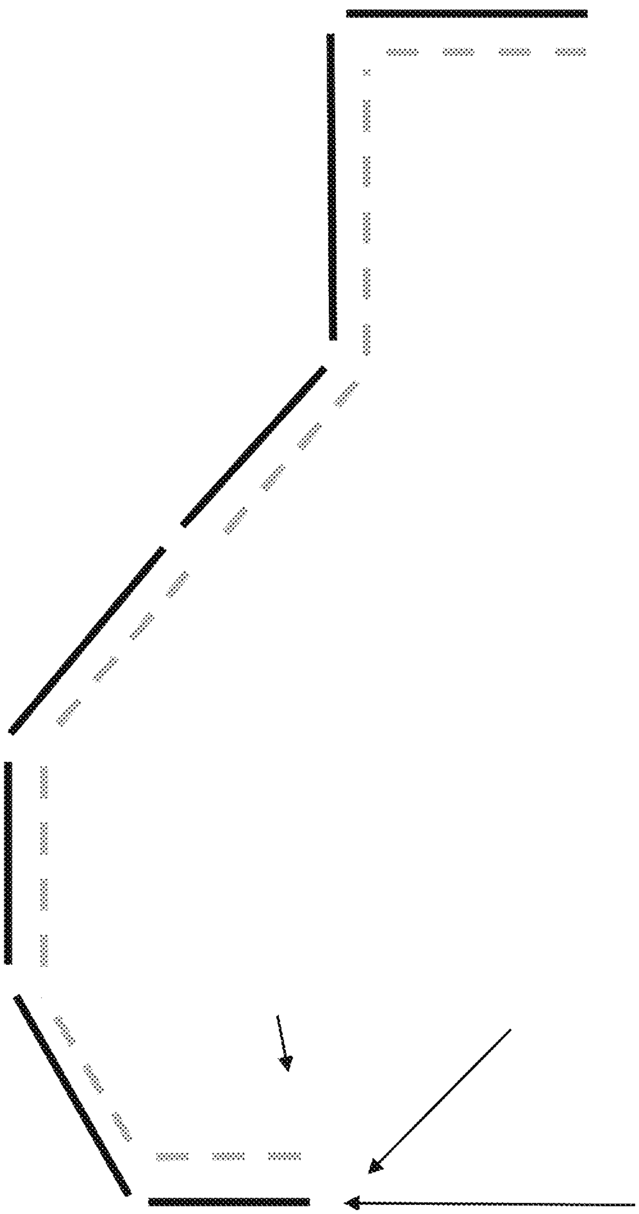
FIG. 9 is an illustration of a path prediction for a 3-axis additive manufacturing system with a 5-axis build platform in accordance with an embodiment.

Referring now to FIG. 9 a path 900 is shown that compares the actual path of the additive manufacturing system tool (and/or build platform Z-position) with that of the predicted path generated by the real-time motion processor using an HMM model. In this embodiment, the tool moves through positions 1 through 8 as defined by the OEM N-2 axis machine control code shown as line 902. In the illustrated embodiment, this is an unknown in the HMM model or hidden states. The motion control processor, using the observational data (X, Y, Z and optionally M or V) then predicts a N-2 axis machine control code that products a path represented by dotted line 904 and a 2-axis position represented by dashed line 906 that move through positions AB1 to AB8.

It should be appreciated that there is an offset between the actual N-2 path and the predicted N-2 path. This offset represents a spatial error function (as a vector function of X, Y, Z coordinates) that defines the set of Euclidean distance measurements between the absolute tool path movements (solid black line) directed by the OEM command codes and those specified by the predicted machine codes (dotted line). The goal of the real-time motion processor is to reduce or minimize the error function (e.g. such as a mean-square error minimization algorithm) across the total tool path such that the 2-axis command code selected for each N-2 axis movement is sufficiently accurate in the presence of any motion estimation errors. The result of real-time error reduction or minimization is fabrication of the final target object with minimal or negligible visible defects and an accurate target object geometry. In an embodiment, the motion processor includes a machine learning module, such as a HMM model, plurality of HMM models in one or more topologies including compound structure, neural network, plurality of neural networks, and/or combinations of each for example. The motion processor (e.g. motion processor 526) is implemented in both hardware and software to support high-performance, dynamic reconfigurability and pre-caching (stored in memory) machine learning models that can be pre-trained prior to use within an additive manufacturing system. In an embodiment, using one or more predetermined models, the motion processor is trained dynamically across multiple iterations. The first iteration is referred to as global training case, whereas subsequent iterations are based on end-user specific scenarios and are referred to as local training cases. To support either case, the motion processor contains memory storage for machine learning data, that collectively defines desired run-time machine learning structures and parameters (state transition matrices in the case of an HMM models and weight/coefficients in the case of neural networks) common to all machine learning models implemented by the motion processor. The initial training operation is global in scope, and provides a baseline set of trained HMM or neural networks for motion processor operation prior to exposure to specific CAD models during local training. Global training operations provide for significant reduction in training time used when the solution is deployed and provides the basis for basic operation of the motion processor and its motion estimation and prediction functionality. In an embodiment, numerous training examples are executed in software simulation that represent additive system operations, 3D CAD models, and their respective STL, G-Code representations and simulated positional data and/or feature vectors. The resulting data is utilized as labeled training data for software training (e.g. at the factory) of the respective HMM and neural network models, which once trained, can be pre-loaded into the motion processor memory space as a stored data set. Similar in manner to how program machine code is loaded into a micro-controller Flash or non-volatile memory storage.

Local training by calibration occurs as a combined online training and reconfiguration process whereby a set of calibration models are utilized with known relationships as they execute (fabrication run) within the OEM additive manufacturing system environment. In an embodiment, the local training process provides a technical effect of further enhancing the accuracy and performance of the motion processor machine learning models by updating each of the model parameters and structure as desired based on the use of error reduction/minimization and correction algorithms including expectation maximization methods, executing within the motion processor as described herein. It should be appreciated, that while the global training operation is performed in software, the local training is based on the actual/physical fabrication of one or more calibration target objects where the input CAD model parameters are known, the target observation state space (X, Y, Z, V, and M), where it is desired is to further improve based on empirical run-time data the prediction of the most likely next-state machine control code that aligns to the OEM machine control code instructions or hidden state space. A second form of local training entails dynamic learning during additive manufacturing system fabrication operation of new target objects and their respective input models. In this form, combined online training and reconfiguration of the motion processor HMM/NN models are based on unknown (non-calibration models) CAD models being fabricated for the first time. In this scenario the motion processor is dynamically updating and reconfiguring the machine learning models in an adaptive manner. In this operating mode, the motion processor is computing in real-time, error reduction/minimization and expectation increase/maximization algorithms (reducing/minimizing the gap of the actual vs. predicted tool path based on the machine code domain) in order to further improve its motion estimation and prediction of next-state machine control code (e.g. g-code) at run-time. In this mode, the motion processor is executing dynamic updates to all the machine learning parameters and structures as the target object fabrication is in process. As an embodiment, it should be appreciated that the accuracy and performance of the motion processor and machine learning functionalities described can be further optimized by utilizing all knowledge from and across the multiple ongoing fabrication activities. That is, in an embodiment, all fabrication cycles represent multiple incremental local training processes and opportunities so that all local optima can be utilized to achieve a global optimal. As such, knowledge/information gained from each fabrication run is refactored into the global set of machine learning model datasets and structures (update models in persistent memory). This additional method provides for additional optimization, accuracy, and machine learning model improvement, since we are learning and retraining across all models encountered collectively.

Figure 10A:
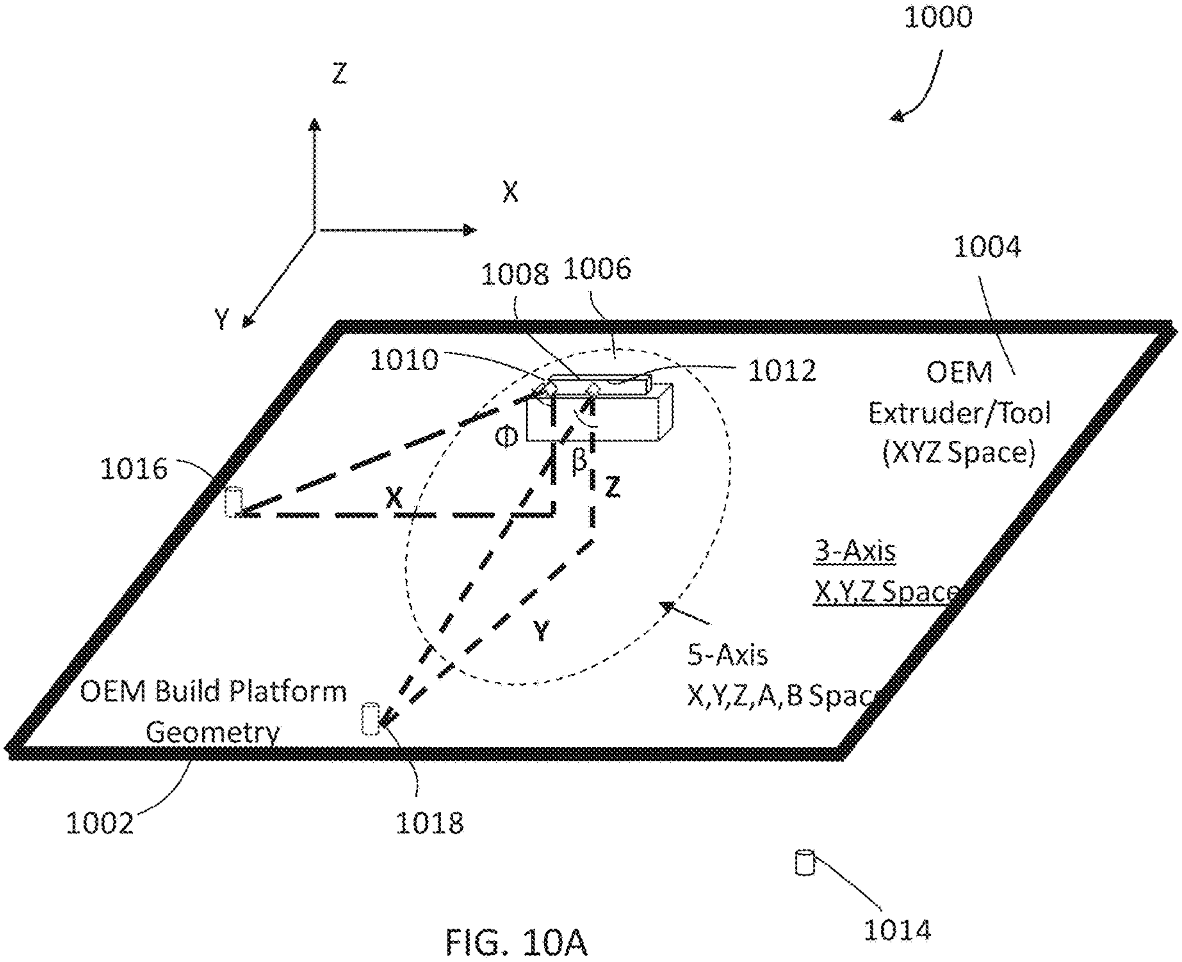
FIG. 10A is a perspective schematic illustration of a build platform and tool head for an additive manufacturing system where artifacts may be printed on the platform for calibrating position sensor offsets in accordance with an embodiment.
Figure 10B:
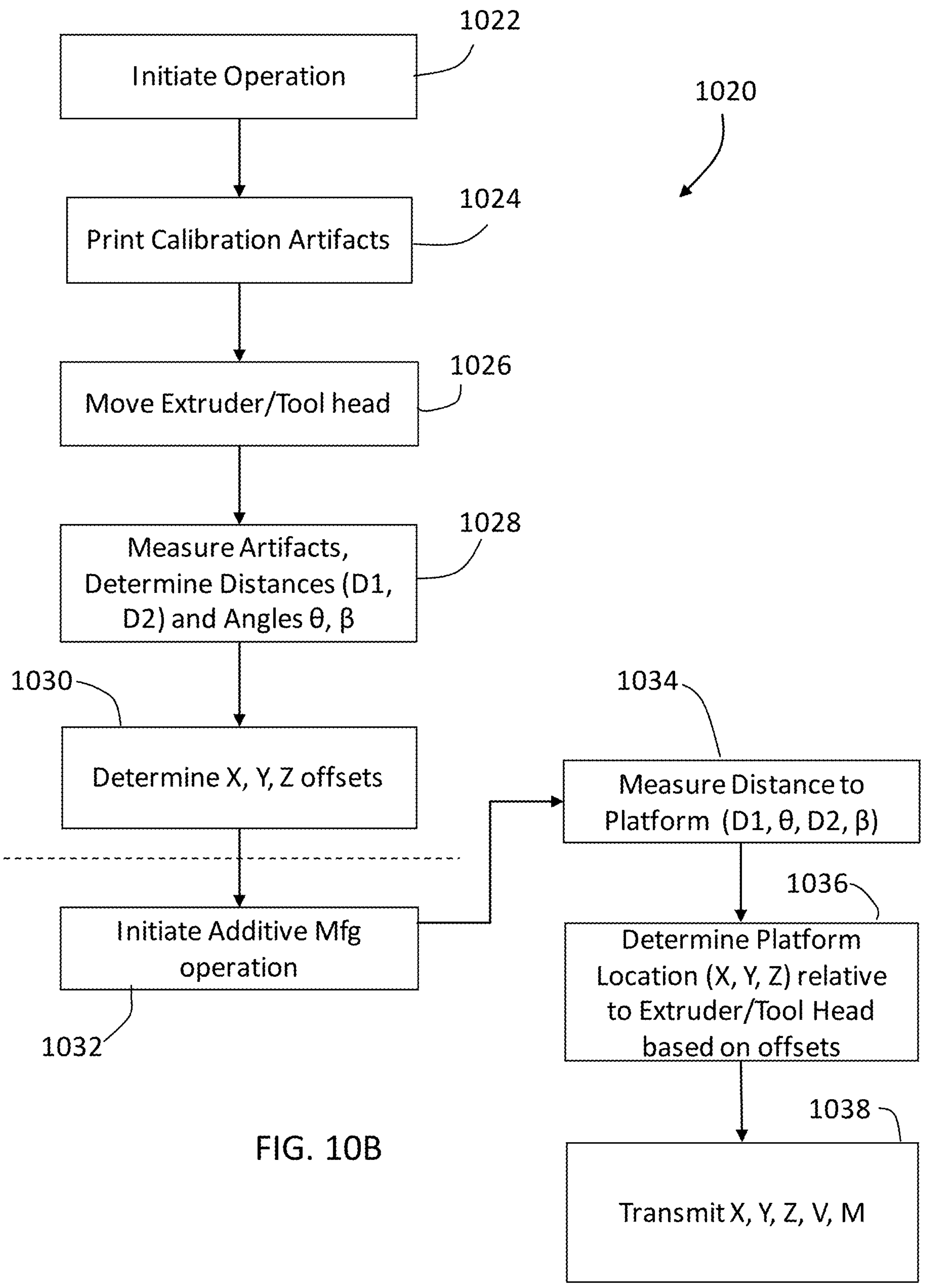
FIG. 10B is a flow diagram of a method of calibrating position sensor offsets based on the artifacts of FIG. 10A in accordance with an embodiment.

Referring now to FIG. 10A and FIG. 10B, an embodiment is shown of a system having independent sensors, such as sensors 724 for example. In this embodiment, the system 1000 includes a build platform 1002 having a planar N-2 axis area 1004 and a N-axis area 1006. It should be appreciated that the system is configured to fabricate objects in both areas 1004, 1006 of the build platform 1002 and may also fabricate in both areas 1004, 1006 of the build platform 1002 simultaneously. In an embodiment, the build platform 1002 moves in a “Z” direction. The system further includes a tool or tool head 1008, such as an extruder for example. In an embodiment, the tool 1008 moves in the X, Y, Z directions with the build platform 1002 remaining in a fixed position. In another embodiment, the tool 1008 moves in the X, Y direction and the build platform 1002 moves in the Z direction. It should be appreciated that when N is greater than five, the tool 1008 and build platform 1002 may move in additional directions or rotate about additional axis.

In an embodiment, the system 1000 may include sensors 1010, 1012, 1014. In the illustrated embodiment, the sensor 1010 measures in the x-direction to the surface of the build platform 1002, the sensor 1012 measures in the Y direction, and the sensor 1014 measures in the Z direction. In an embodiment, the sensors 1010, 1012 are arranged on an angle β, θ. These angles β, θ may be fixed for example. The angles β, θ may further be adjusted, such as using a set screw, to direct the light from the sensors 1010, 1012 onto a predetermined location, such as an indicia on the platform area 1004, or a feature on a fabricated object 1016, 1018 for example. In an embodiment, a different calibration platform is provided that includes different indicia (e.g. printed markers or embossed elements) that are used for calibrating the angle of the sensors 1010, 1012.

In still other embodiments, the system 1000 may include a calibration plate or fixture. This calibration plate may be removably coupled to the build platform 1002 or the build platform 1002 may be replaced by the calibration plate. The calibration plate may include on or more features, such as a boss for example, having a predetermined size, shape, and location. These features may be used in the same manner as the fabricated objects 1016, 1018 to calibrate the sensors 1010, 1012. In some embodiments, multiple calibration plates may be provided. In still further embodiments, the calibration plate may be used in combination with the method described herein where fabricated objects are formed on the calibration plate. For example, an initial calibration may be used to perform an initial calibration, then the indicia or fabricated objects 1016, 1018 are used to perform either an additional calibration or subsequent calibrations of the sensors 1010, 1012.

It should be appreciated that in the illustrated embodiment, the build platform 1002 moves in the Z direction, so the sensor 1014 may be positioned on the frame of the additive manufacturing chamber to measure the movement of the build platform 1002. In other embodiments, the sensor 1014 may be positioned on the tool 1008. In other embodiments, the sensor 1014 may be positioned within the build platform 1002 as an integral part of the build platform.

In an embodiment, the sensors 1010, 1012, 1014 may be calibrated to the system 1000. Referring to FIG. 10B, a method 1020 is shown for calibrating the sensors 1010, 1012, 1014. The method 1020 begins in block 1022 where operation is initiated. The method 1020 then proceeds to block 1024 where calibration artifacts 1016, 1018 (FIG. 10A) are fabricated using the tool 1008. The calibration artifacts 1016, 1018 are fabricated or formed with a predetermined shape and a predetermined position on the N-2 axis area 1004. In other embodiments, the calibration artifacts may be preprinted or positioned in a fixed manner as an integral part of a calibration build platform that is used specifically to calibrate the system.

The method then proceeds to block 1026 where the tool 1008 is moved to a predetermined position and the sensors 1010, 1012, 1014 are used to measure the distances D1, D2 in block 1028. The distances D1, D2 and the predetermined fixed angles θ, β are compared with predetermined values (e.g. expected values) and X, Y, Z offsets are determined in block 1030.

When the operator desires to fabricate a source object, the method 1020 moves to block 1032 where operation of the additive manufacturing system 1000 is initiated. The method 1020 then proceeds to measure the distances and angles to the build platform 1002 using the sensors 1010, 1012, 1014 in block 1034. In block 1036, the actual location of the tool 1008 and build platform 1002 are then determined based at least in part on the offset values determined in block 1030. These actual X, Y, Z and optionally M values are then used in block 1038 as inputs to the control system 500, 600, 700 to predict the A, B angles of the 2-axis build area 1006 during operation. It should be appreciated that the method 1020 is repeated continuously during operation to provide observational data to the real-time motion processor.

Figure 11A:
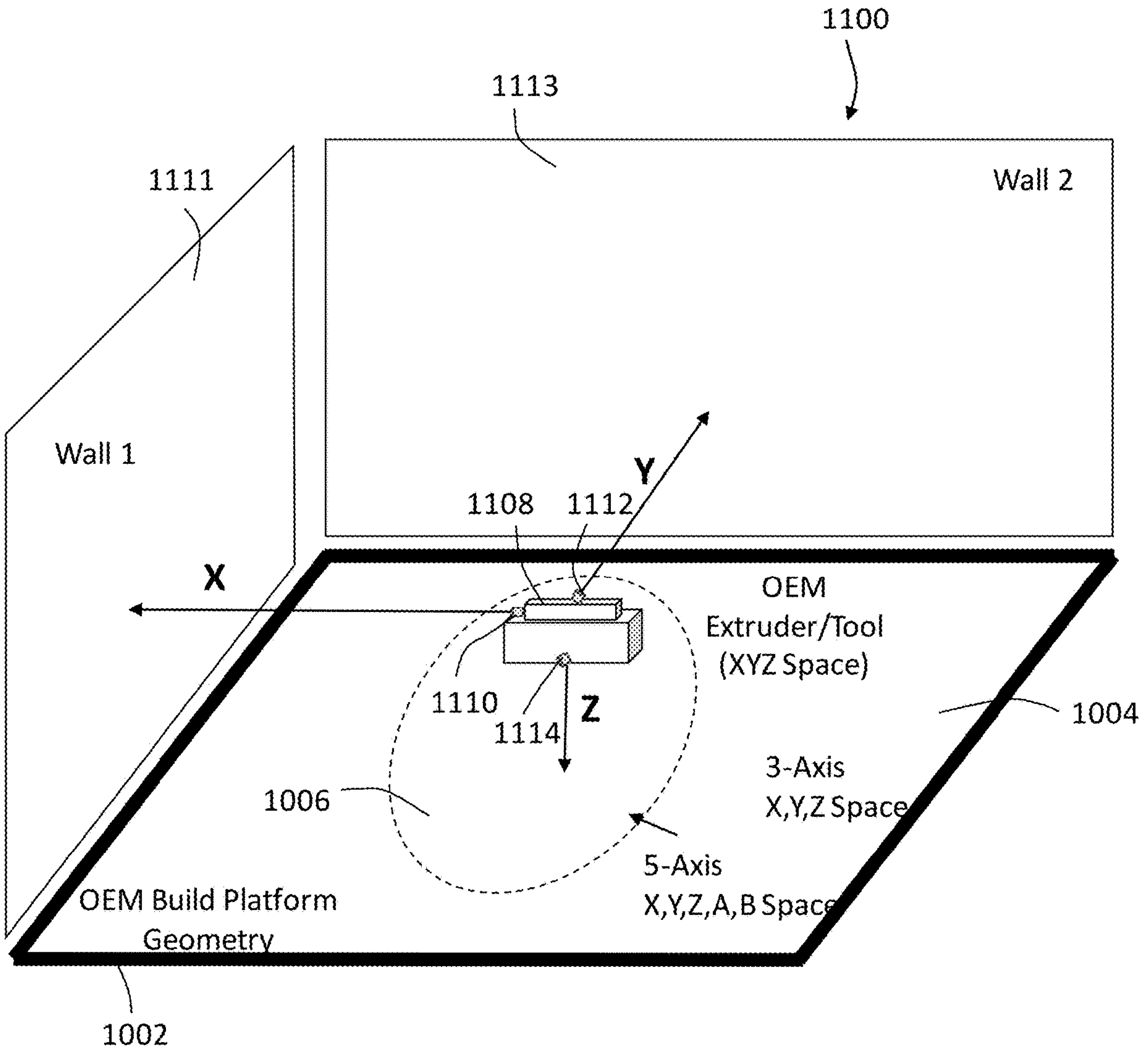
FIG. 11A is a perspective schematic illustration of a build platform and tool head for an additive manufacturing system that uses the position sensors to measure an interior of the additive manufacturing system for determining a position of the build platform and tool head accordance with an embodiment.
Figure 11B:
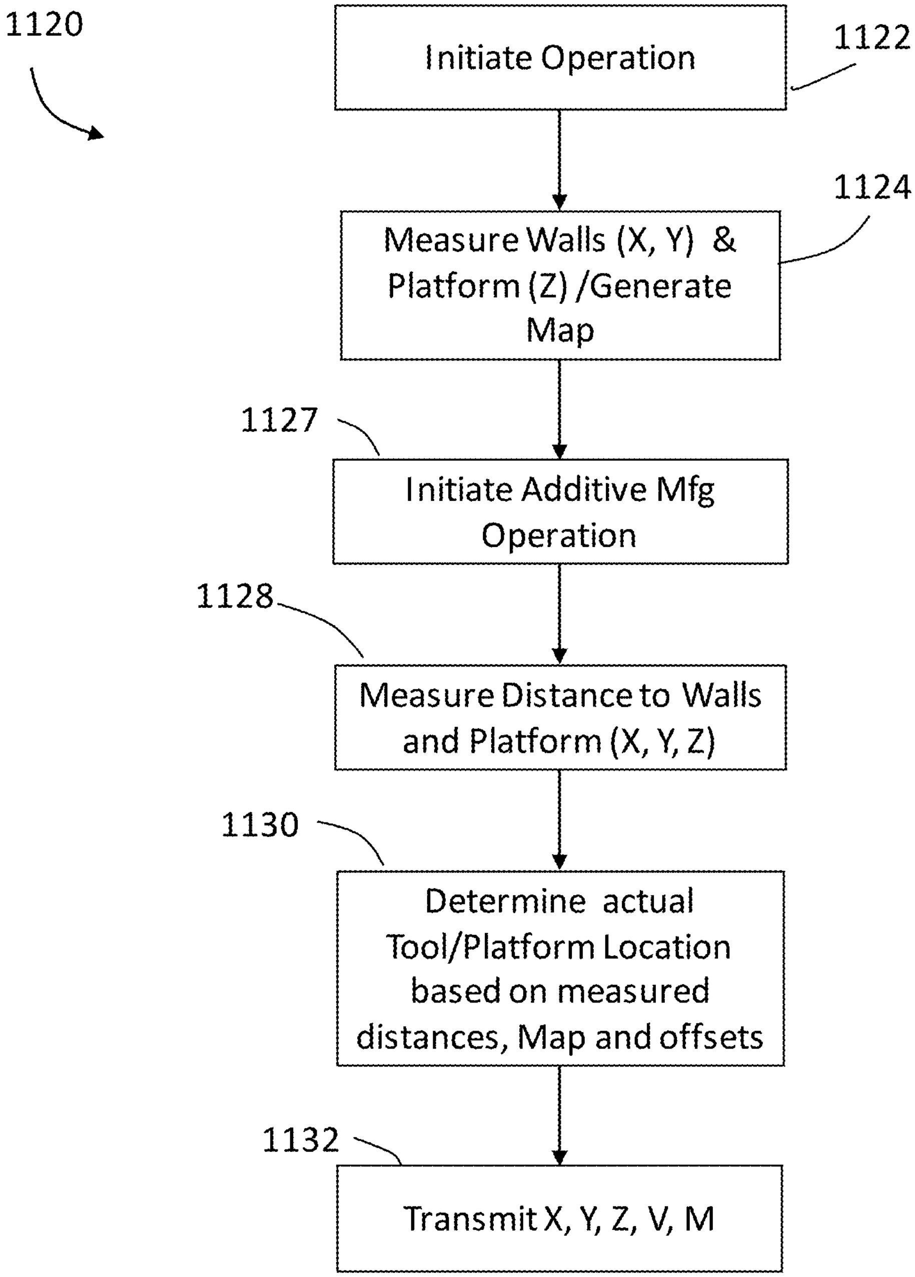
FIG. 11B is a flow diagram of a method determining a position of a build platform and tool head in accordance with an embodiment.

Referring now to FIG. 11A and FIG. 11B another embodiment is shown that uses sensors to determine the position of the tool and build platform. In this embodiment, the system 1100 includes a build platform 1102 having an N-2 axis build platform portion 1104 and a N-axis build platform portion 1106. A tool head or tool 1108 is provided, such as an extruder for example. In this embodiment, the tool 1108 moves in the X, Y, Z directions and build platform 1002 is fixed. However, it should be appreciated that in other embodiments, the build platform 1102 may move in the Z-direction.

The system 1100 further includes a plurality of sensors 1110, 1112, 1114 that measure three orthogonal distances. In an embodiment the sensor 1110 measures a distance to a wall 1111 of the system 1100 build chamber and the sensor 1112 measures a distance to a wall 1113 of the system 1100 build chamber. As part of the calibration process, an embodiment includes the distance sensors in conjunction with the motion processor calibrating against a non-planar OEM chassis surface to account for topographical variations in each of the OEM printer wall elevations during subsequent distance measurements. The topographical map is stored in non-volatile memory as a set of calibration offsets or correction factors, so that the applicable correction factor is applied to each corresponding distance measurement location taken in order to achieve an accurate X, Y, and Z measurement during run-time operation of the system.

Referring now to FIG. 11B, an embodiment of a method 1120 is shown of calibrating the sensors 1110, 1112, 1114 and operating the system 1100. The method 112 begins in block 1122 where operation is initiated and proceeds to block 1124 where the tool 1108 is moved to measure the distances to the walls 1111, 1113 and the surface of the build platform 1102 using the sensors 1110, 1112, 1114 to generate a map of these surfaces.

The operator then initiates operation to fabricate a source object in block 1127. During operation, the distances to the walls 1111, 1113 and the platform 1102 are measured using the sensors 1110, 1112, 1114 in block 1128 with correction factors applied as previously described. The method 1120 then proceeds to block 1130 where the actual position of the tool 1108 and build platform 1102 are determined based on the measured distances, the generated map from block 1124, and the calibration offsets. The method 1120 then proceeds to block 1132 where the X, Y, Z and optionally M values are transmitted to the motion processor to predict the A, B values as described herein. It should be appreciated that blocks 1128, 1130, 1132 may be repeated continuously during operation to provide real-time observational data to the motion processor.

Figure 11C:
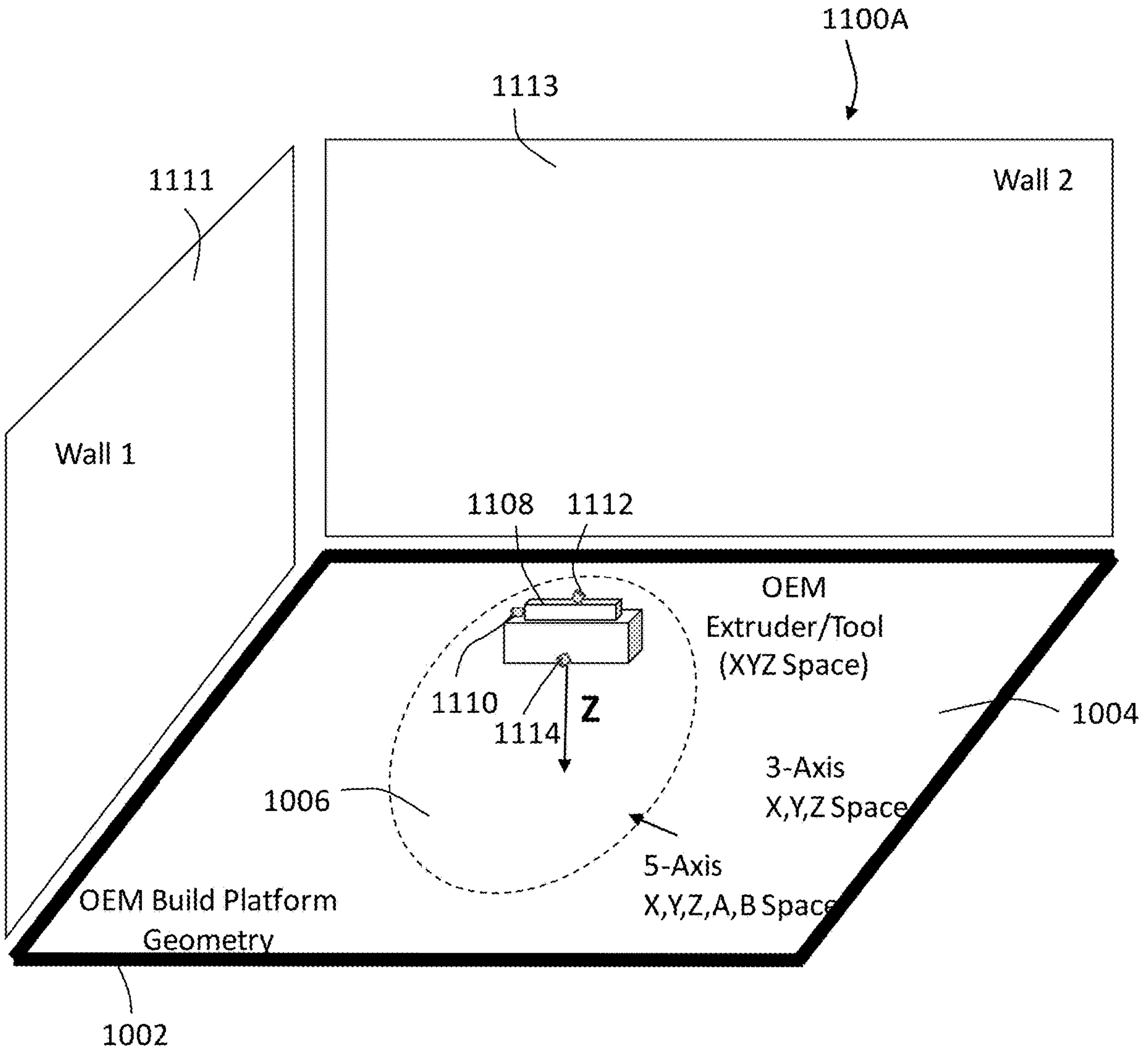
FIG. 11C is a perspective schematic illustration of a build platform and tool head for an additive manufacturing system that uses the position sensors to measure an interior of the additive manufacturing system for determining a position of the build platform and tool head accordance with an embodiment.

Referring now to FIG. 11C, an embodiment is shown of a system 1100A. The system 1100A is similar to system 1100 described herein above, except that in this embodiment, the system 1100 is used with the 3+2 methodology described herein. In this embodiment, only a single distance sensor 1114 is provided to measure the position of the area 1004 during operation. As discussed herein, since in the 3+2 operational methodology for a given volume region of the target object, the rotational build platform is arranged at a fixed A, B angle. These angles A, B may be determined based at least in part on a single distance measurement along the Z-axis. It should be appreciated that the Z-axis sensor 1114 is still calibrated in a similar manner to the calibration methods described herein.

One or more embodiments described herein can utilize machine learning techniques to perform tasks, such as to predict a next state of operation of an additive manufacturing system. More specifically, one or more embodiments described herein can incorporate and utilize rule-based decision making and artificial intelligence (AI) reasoning to accomplish the various operations described herein, namely the prediction of an unknown state, such as the next operation being performed by an additive manufacturing system, based on observational data. The phrase "machine learning" broadly describes a function of electronic systems that learn from data. A machine learning system, engine, or module can include a trainable machine learning algorithm that can be trained, such as in an external cloud environment, to learn functional relationships between inputs and outputs, and the resulting model (sometimes referred to as a "trained neural network," "trained model," and/or "trained machine learning model") can be used for predicting a next operating state of an additive manufacturing system and determined angular positions of a 2-axis component, for example. In one or more embodiments, in addition to the HMM models described herein, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input. It should be appreciated that these same techniques can be applied in the case of predicting of a next operating state of an additive manufacturing system as described herein.

Systems for training and using a machine learning model are now described in more detail with reference to FIG. 13. Particularly, FIG. 13 depicts a block diagram of components of a machine learning training and inference system 1200 according to one or more embodiments described herein. The system 1200 performs training 1202 and inference 1204. During training 1202, a training engine 1216 trains a model (e.g., the trained model 1218) to perform a task, such as to predict a next operating state of an additive manufacturing system. Inference 1204 is the process of implementing the trained model 1218 to perform the task, such as to predict a next operating state of an additive manufacturing system, in the context of a larger system (e.g., a system 1226). All or a portion of the system 1200 shown in FIG. 13 can be implemented, for example by all or a subset of block 587 of FIG. 5K, or block 591 of FIG. 5L, or block 892 of FIG. 8.

The training 1202 begins with training data 1212, which may be structured or unstructured data. According to one or more embodiments described herein, the training data 1212 includes a CAD model and machine control code for fabricating the target object with an additive manufacturing system. The training engine 1216 receives the training data 1212 and a model form 1214. The model form 1214 represents a base model that is untrained. The model form 1214 can have preset weights and biases, which can be adjusted during training. It should be appreciated that the model form 1214 can be selected from many different model forms depending on the task to be performed. For example, where the training 1202 is to train a model to perform image classification, the model form 1214 may be a model form of a CNN. The training 1202 can be supervised learning, semi-supervised learning, unsupervised learning, reinforcement learning, and/or the like, including combinations and/or multiples thereof. For example, supervised learning can be used to train a machine learning model to classify an object of interest in an image. To do this, the training data 1212 includes labeled images, including images of the object of interest with associated labels (ground truth) and other images that do not include the object of interest with associated labels. In this example, the training engine 1216 takes as input a training image from the training data 1212, makes a prediction for classifying the image, and compares the prediction to the known label. The training engine 1216 then adjusts weights and/or biases of the model based on results of the comparison, such as by using backpropagation. The training 1202 may be performed multiple times (referred to as "epochs") until a suitable model is trained (e.g., the trained model 1218).

Once trained, the trained model 1218 can be used to perform inference 1204 to perform a task, such as to predict a next operating state of an additive manufacturing system. The inference engine 1220 applies the trained model 1218 to new data 1222 (e.g., real-world, non-training data). For example, if the trained model 1218 is trained to classify images of a particular object, such as a chair, the new data 1222 can be an image of a chair that was not part of the training data 1212. In this way, the new data 1222 represents data to which the trained model 1218 has not been exposed. The inference engine 1220 makes a prediction 1224 (e.g., a classification of an object in an image of the new data 1222) and passes the prediction 1224 to the system 1226 (e.g., the processor 535 of FIG. 5A or 2-axis processor 534 of FIG. 5B). The system 1226 can, based on the prediction 1224, taken an action, perform an operation (e.g. rotate the portion 304 of FIG. 3A about one or two axes), perform an analysis, and/or the like, including combinations and/or multiples thereof. In some embodiments, the system 1226 can add to and/or modify the new data 1222 based on the prediction 1224.

In accordance with one or more embodiments, the predictions 1224 generated by the inference engine 1220 are periodically monitored and verified to ensure that the inference engine 1220 is operating as expected. Based on the verification, additional training 1202 may occur using the trained model 1218 as the starting point. The additional training 1202 may include all or a subset of the original training data 1212 and/or new training data 1212. In accordance with one or more embodiments, the training 1202 includes updating the trained model 1218 to account for changes in expected input data.

The term "about" is intended to include the degree of error associated with measurement of the particular quantity based upon the equipment available at the time of filing the application. For example, "about" can include a range of ±8% or 5%, or 2% of a given value.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection." It should also be noted that the terms "first", "second", "third", "upper", "lower", and the like may be used herein to modify various elements. These modifiers do not imply a spatial, sequential, or hierarchical order to the modified elements unless specifically stated.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions, or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A replacement build platform for an additive manufacturing system having a structure for supporting a build platform, the replacement build platform comprising:

a frame configured to removably couple with the structure;

a two-axis build portion rotationally coupled to the frame about a first axis, the two-axis build portion further being configured to rotate about a second axis, the second axis being perpendicular to the first axis; and a planar build portion coupled to the frame adjacent the two-axis build portion.

2. The replacement build platform of claim 1, wherein:

the frame includes a first and a second arm;

the two-axis build portion includes:

a shaft rotationally coupled between the first arm and second arm;

a first motor configured to rotate the shaft about the first axis;

a second motor coupled to the shaft; and a rotational build portion coupled to the second motor to rotate about the second axis.

3. The replacement build platform of claim 1, wherein the frame includes a first arm having a first channel and a second arm having a second channel, the first channel and second channel being sized to receive the structure.

4. The replacement build platform of claim 3, wherein the frame includes base that extends between the first arm and second arm.

5. The replacement build platform of claim 3, wherein the frame further includes at least one clip portion coupled to the base, the at least one clip portion being configured to engage the frame and fixedly couple the frame to the structure.

6. The replacement build platform of claim 1, further comprising a processor module operably coupled to the two-axis build portion, the processor module being configured to execute executable computer instructions for receiving at least one input and causing a rotation of the two-axis build portion about at least one of the first axis or the second axis.

7. The replacement build platform of claim 6, wherein the input is at least one distance measurement.

8. The replacement build platform of claim 7, wherein the processor module is further responsive to executable computer instructions for predicting the next state of a machine control code in response to receiving the at least one input.

9. The replacement build platform of claim 8, wherein the predicting of the next state of machine control code is based at least in part on a machine learning model.

10. The replacement build platform of claim 9, wherein the machine learning model is a Hidden Markov Model.

11. The replacement build platform of claim 8, wherein the predicting the next state of machine control code is based on determining an end condition has been achieved based at least in part on the at least one input.

12. The replacement build platform of claim 11, wherein the predicting the next state of machine control code determines a change in phase.

13. The replacement build platform of claim 12, wherein the change of phase is an initialization phase, a calibration phase, and a completion phase.

14. The replacement build platform of claim 1, wherein the planar portion includes a pitch relief region, the pitch relief region defining a pitch clearance area.

15. A build platform for an additive manufacturing system, the build platform comprising:

a planar build portion;

a two-axis build portion rotationally coupled to the planar build portion about a first axis, the two-axis build portion further being configured to rotate about a second axis, the second axis being perpendicular to the first axis;

a first motor coupled to the two-axis build portion to rotate the two-axis build portion about the first axis;

a second motor coupled to the two-axis build platform to rotate the two-axis build portion about the second axis;

wherein the two-axis build portion includes a first build area; and the planar build portion includes a second build area, the first build area and second build area being co-planar when in an initial position.

16. The build platform of claim 15, wherein the first motor and second motor are stepper motors.

17. The build platform of claim 15, wherein:

the planar build portion has an opening sized to receive the two-axis build portion; and the two-axis build portion has a first build area having a circular shape.

18. The build platform of claim 17, wherein the two-axis build portion is centrally located in the planar build portion.

19. The build platform of claim 15, further comprising:

a controller operably coupled to the first motor and second motor;

an energy source operably coupled to the controller, the first motor and the second motor; and wherein the controller and energy source are disposed on a side of the planar build portion opposite the second build area.

20. The build platform of claim 19, wherein the planar build portion includes a mount configured to couple with a vertical axis of an additive manufacturing system.

21. The build platform of claim 15, wherein the planar build portion includes a pitch relief area adjacent the two-axis build portion, the pitch relief area defining a pitch clearance area.

* * * * *